(12) United States Patent
Kim et al.

(10) Patent No.: US 12,113,597 B2
(45) Date of Patent: Oct. 8, 2024

(54) METHOD AND APPARATUS FOR TRANSMITTING AND RECEIVING CHANNEL STATE INFORMATION IN WIRELESS COMMUNICATION SYSTEM

(71) Applicant: LG ELECTRONICS INC., Seoul (KR)

(72) Inventors: Kyuseok Kim, Seoul (KR); Hyungtae Kim, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 240 days.

(21) Appl. No.: 17/760,044

(22) PCT Filed: Feb. 15, 2021

(86) PCT No.: PCT/KR2021/001905
§ 371 (c)(1),
(2) Date: Aug. 3, 2022

(87) PCT Pub. No.: WO2021/162522
PCT Pub. Date: Aug. 19, 2021

(65) Prior Publication Data
US 2023/0056263 A1 Feb. 23, 2023

(30) Foreign Application Priority Data

Feb. 13, 2020 (KR) .................. 10-2020-0017999
Feb. 20, 2020 (KR) .................. 10-2020-0021304
(Continued)

(51) Int. Cl.
*H04B 7/06* (2006.01)
*H04L 5/00* (2006.01)

(52) U.S. Cl.
CPC ......... *H04B 7/0626* (2013.01); *H04L 5/0048* (2013.01)

(58) Field of Classification Search
CPC .... H04B 7/0626; H04B 7/0456; H04B 7/024; H04B 7/0421; H04B 7/063; H04B 7/0632;
(Continued)

(56) References Cited

U.S. PATENT DOCUMENTS

| 2020/0007287 | A1* | 1/2020 | Kakishima | H04L 5/0094 |
| 2020/0178279 | A1* | 6/2020 | Frenne | H04L 5/0051 |
| 2020/0336194 | A1 | 10/2020 | Karjalainen et al. | |

FOREIGN PATENT DOCUMENTS

| EP | 2680477 | 1/2014 |
| EP | 3606142 | 2/2020 |

(Continued)

OTHER PUBLICATIONS

PCT International Application No. PCT/KR2021/001905, International Search Report dated Jun. 2, 2021, 5 pages.
Huawei et al., "CSI measurement enhancement for multi-TRP/panel transmission," R1-1903100, 3GPP TSG RAN WG1 Meeting #96, Mar. 2019, 7 pages.
(Continued)

*Primary Examiner* — Ayanah S George
(74) *Attorney, Agent, or Firm* — LEE, HONG, DEGERMAN, KANG & WAIMEY

(57) ABSTRACT

Disclosed are a method and apparatus for transmitting and receiving channel state information in a wireless communication system. The method for transmitting channel state information (CSI) according to an embodiment of the present disclosure, may comprise the steps of: receiving, from a base station, configuration information related to the CSI, wherein the configuration information includes information about a CSI-RS resource set; receiving a CSI-reference signal (CSI-RS) from the base station; and transmitting the CSI, to the base station, on the basis of the configuration (Continued)

(a)

(b)

information and the CSI-RS. The CSI-RS resource set may include M CSI-RS resource groups (M is a natural number), and the CSI may include N first CSI sets generated on the basis of a single CSI-RS resource in N mutually different CSI-RS resource groups (N≤M, N is a natural number) from among the M CSI-RS resource groups.

16 Claims, 32 Drawing Sheets

(30) Foreign Application Priority Data

| Apr. 9, 2020 | (KR) | .......................... 10-2020-0043653 |
| Jul. 15, 2020 | (KR) | .......................... 10-2020-0087802 |
| Dec. 30, 2020 | (KR) | .......................... 10-2020-0187576 |

(58) Field of Classification Search
CPC .. H04B 7/0639; H04B 17/318; H04B 17/345; H04L 5/0048; H04L 5/0064; H04L 5/0094; H04L 5/005; H04L 5/0057; H04W 24/10; H04W 24/08; Y02D 30/70
See application file for complete search history.

(56) References Cited

FOREIGN PATENT DOCUMENTS

| KR | 2019-0117704 | 10/2019 |
| WO | 2019-160384 | 8/2019 |

OTHER PUBLICATIONS

Spreadtrum Communications, "Discussion on Multi-TRP transmission," R1-1912562, 3GPP TSG RAN WG1 #99, Nov. 2019, 11 pages.
Ericsson, "CSI feedback for multi-TRP," R1-1714286, 3GPP TSG-RAN WG1 #90, Aug. 2017, 9 pages.
Korean Intellectual Property Office Application No. 10-2022-7026657, Office Action dated Apr. 5, 2023, 4 pages.
U.S. Appl. No. 18/110,635, Office Action dated May 10, 2023, 13 pages.
Intel Corporation, "On multi-TRP/multi-panel transmission," 3GPP TSG RAN WG1 Meeting #98b, R1-1910668, Oct. 2019, 15 pages.
Intel Corporation, "Discussion on multi-beam enhancements," 3GPP TSG RAN WG1 #98, R1-1908654, Aug. 2019, 16 pages.
European Patent Office Application Serial No. 21752882.7 Search Report dated Feb. 23, 2024, 10 pages.

* cited by examiner (a) DMRS Type 1

(b) DMRS Type 2

FIG.23

| layer | RI-5 | RI-6 | RI-7 | RI-8 |
|---|---|---|---|---|
| 0 | 0 | 0 | 0 | 0 |
| 1 | 1 | 1 | 1 | 1 |
| 2 | 2 | 2 | 2 | 2 |
| 3 | 3 | 3 | 3 | 3 |
| 4 | 4 | 4 | 4 | 4 |
| 5 |  | 6 | 5 | 5 |
| 6 |  |  | 6 | 6 |
| 7 |  |  |  | 7 |

CDM group 0 (TCI state 1/ TRP 1)
CDM group 1 (TCI state 2/ TRP 2)

(a) DMRS Type 1

| layer | RI-5 | RI-6 | RI-7 | RI-8 |
|---|---|---|---|---|
| 0 | 0 | 0 | 0 | 0 |
| 1 | 1 | 1 | 1 | 1 |
| 2 | 2 | 2 | 2 | 2 |
| 3 | 3 | 3 | 3 | 3 |
| 4 | 6 | 6 | 6 | 6 |
| 5 |  | 8 | 7 | 7 |
| 6 |  |  | 8 | 8 |
| 7 |  |  |  | 9 |

CDM group 0 (TCI state 1/ TRP 1)
CDM group 1 (TTCI state 2/ TRP 2)

(b) DMRS Type 2

METHOD AND APPARATUS FOR TRANSMITTING AND RECEIVING CHANNEL STATE INFORMATION IN WIRELESS COMMUNICATION SYSTEM

CROSS-REFERENCE TO RELATED APPLICATION(S)

This application is the National Stage filing under 35 U.S.C. 371 of International Application No. PCT/KR2021/001905, filed on Feb. 15, 2021, which claims the benefit of earlier filing date and right of priority to Korean Application Nos. 10-2020-0017999 filed on Feb. 13, 2020, 10-2020-0021304 filed on Feb. 20, 2020, 10-2020-0043653 filed on Apr. 9, 2020, 10-2020-0087802 filed on Jul. 15, 2020, and 10-2020-0187576 filed on Dec. 30, 2020, the contents of which are all hereby incorporated by reference herein in their entireties.

TECHNICAL FIELD

The present disclosure relates to a wireless communication system, and in more detail, relates to a method and an apparatus of transmitting and receiving channel state information in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving channel state information.

In addition, an additional technical object of the present disclosure is to provide a method and an apparatus of transmitting and receiving one or more channel state information for a channel state information reference signal (CSI-RS) transmitted from a single transmission reception point (TRP).

In addition, an additional technical object of the present disclosure is to provide a method and an apparatus of transmitting and receiving joint channel state information for a channel state information reference signal (CSI-RS) transmitted from multiple TRPs (transmission reception point).

The technical objects to be achieved by the present disclosure are not limited to the above-described technical objects, and other technical objects which are not described herein will be clearly understood by those skilled in the pertinent art from the following description.

Technical Solution

A method of transmitting channel state information (CSI) in a wireless communication system according to an aspect of the present disclosure may include: receiving configuration information related to the CSI from a base station, wherein the configuration information includes information on a CSI-RS resource set; receiving a CSI-reference signal (CSI-RS) from the base station; and transmitting the CSI to the base station based on the configuration information and the CSI-RS. The CSI-RS resource set may include M (M is a natural number) CSI-RS resource group, and the CSI may include N first CSI sets generated based on a single CSI-RS resource in N different ($N \leq M$, N is a natural number) CSI-RS resource groups among the M CSI-RS resource groups.

A terminal transmitting channel state information (CSI) according to an additional aspect of the present disclosure may include at least one transceiver for transmitting and receiving a wireless signal and at least one processor controlling the at least one transceiver. The at least one processor may be configured to: receive configuration information related to the CSI from a base station, wherein the configuration information includes information on a CSI-RS resource set; receive a CSI-reference signal (CSI-RS) from the base station; and transmit the CSI to the base station based on the configuration information and the CSI-RS. The CSI-RS resource set may include M (M is a natural number) CSI-RS resource group, and the CSI may include N first CSI sets generated based on a single CSI-RS resource in N different ($N \leq M$, N is a natural number) CSI-RS resource groups among the M CSI-RS resource groups.

A method of receiving channel state information (CSI) in a wireless communication system according to an additional aspect of the present disclosure may include: transmitting configuration information related to the CSI to a terminal, wherein the configuration information includes information on a CSI-RS resource set; transmitting a CSI-reference signal (CSI-RS) to the terminal; and receiving the CSI from the terminal. The CSI-RS resource set may include M (M is a natural number) CSI-RS resource group, and the CSI may include N first CSI sets generated based on a single CSI-RS resource in N different ($N \leq M$, N is a natural number) CSI-RS resource groups among the M CSI-RS resource groups.

In at least one non-transitory computer-readable medium storing at least one instruction, the at least one instruction executable by at least one processor may control a device to: receive configuration information related to the CSI from a base station, wherein the configuration information includes information on a CSI-RS resource set; receive a CSI-reference signal (CSI-RS) from the base station; and transmit the CSI to the base station based on the configuration information and the CSI-RS. The CSI-RS resource set may include M (M is a natural number) CSI-RS resource group, and the CSI may include N first CSI sets generated based on a single CSI-RS resource in N different ($N \leq M$, N is a natural number) CSI-RS resource groups among the M CSI-RS resource groups.

A processing apparatus configured to control a terminal for transmitting CSI (channel state information) in a wireless communication system may include at least one processor; and at least one computer memory operably connected to the at least one processor and storing instructions that, based on being executed by the at least one processor, perform operations. The operations may include: receiving configuration information related to the CSI from a base station, wherein the configuration information includes information on a CSI-RS resource set; receiving a CSI-reference signal (CSI-RS) from the base station; and transmitting the CSI to the base station based on the configuration information and the CSI-RS. The CSI-RS resource set may include M (M is a natural number) CSI-RS resource group, and the CSI may include N first CSI sets generated based on a single CSI-RS resource in N different (N≤M, N is a natural number) CSI-RS resource groups among the M CSI-RS resource groups.

Preferably, one or more CSI entries included in the N first CSI sets may be independently determined for each first CSI set and the one or more CSI entries may include at least one of a rank indicator (RI), a precoding matrix indicator (PMI), a layer indicator (LI), a channel quality indicator (CQI) and/or a CSI-RS resource indicator (CRI).

Preferably, the N CSI-RS resource groups may be configured by the configuration information.

Preferably, K (K≤M, K is a natural number) CSI-RS resource groups for reporting the CSI may be determined from the M CSI-RS resource groups, and the CSI may include K second CSI sets generated based on a CSI-RS resource combination in the K CSI-RS resource groups.

Preferably, when a report on the first CSI set based on the single CSI-RS resource and a report on the second CSI set based on the CSI-RS resource combination collide, the report on the second CSI set based on the CSI-RS resource combination may be transmitted with priority.

Preferably, when a report on the first CSI set based on the single CSI-RS resource and a report on the second CSI set based on the CSI-RS resource combination collide, the report on the first CSI set based on the single CSI-RS resource may be transmitted with priority.

Preferably, when a report on the first CSI set based on the single CSI-RS resource and a report on the second CSI set based on the CSI-RS resource combination collide, priority for transmission may be determined based on information included in the first CSI group and information included in the second CSI set.

Preferably, the report on the first CSI set including L1 (layer 1)-SINR (signal to interference and noise ratio) or L1-RSRP (reference signal received power) may be transmitted with priority over the report on the second CSI set that does not include the L1-SINR and the L1-RSRP.

Advantageous Effects

According to an embodiment of the present disclosure, one or more channel state information for a single transmission reception point (TRP) transmission can be obtained/reported.

In addition, according to an embodiment of the present disclosure, optimal channel state information for performing the transmission of multiple TRPs can be obtained/reported.

In addition, according to an embodiment of the present disclosure, as optimum channel state information for performing transmission of multiple TRPs (transmission reception point) is acquired/reported, more suitable link adaptation may be performed.

In addition, according to an embodiment of the present disclosure, as the optimum channel state information for performing transmission of multiple TRPs (transmission reception point) is acquired/reported, performance of a wireless communication system may be improved.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 23 illustrates information on a CDM group and a DMRS port corresponding to each layer based on all RIs according to an embodiment of the present disclosure.

BEST MODE

Figure 1:
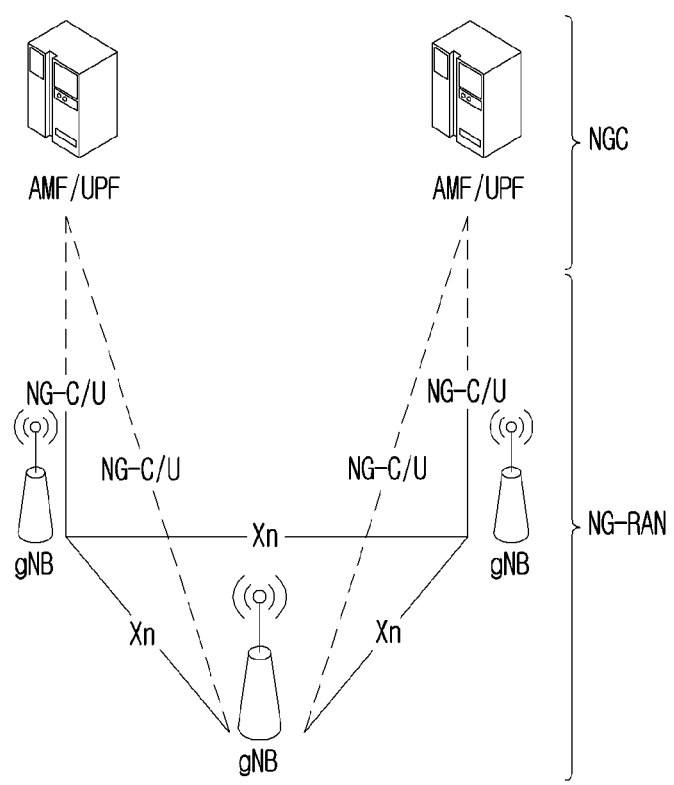
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System).

3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
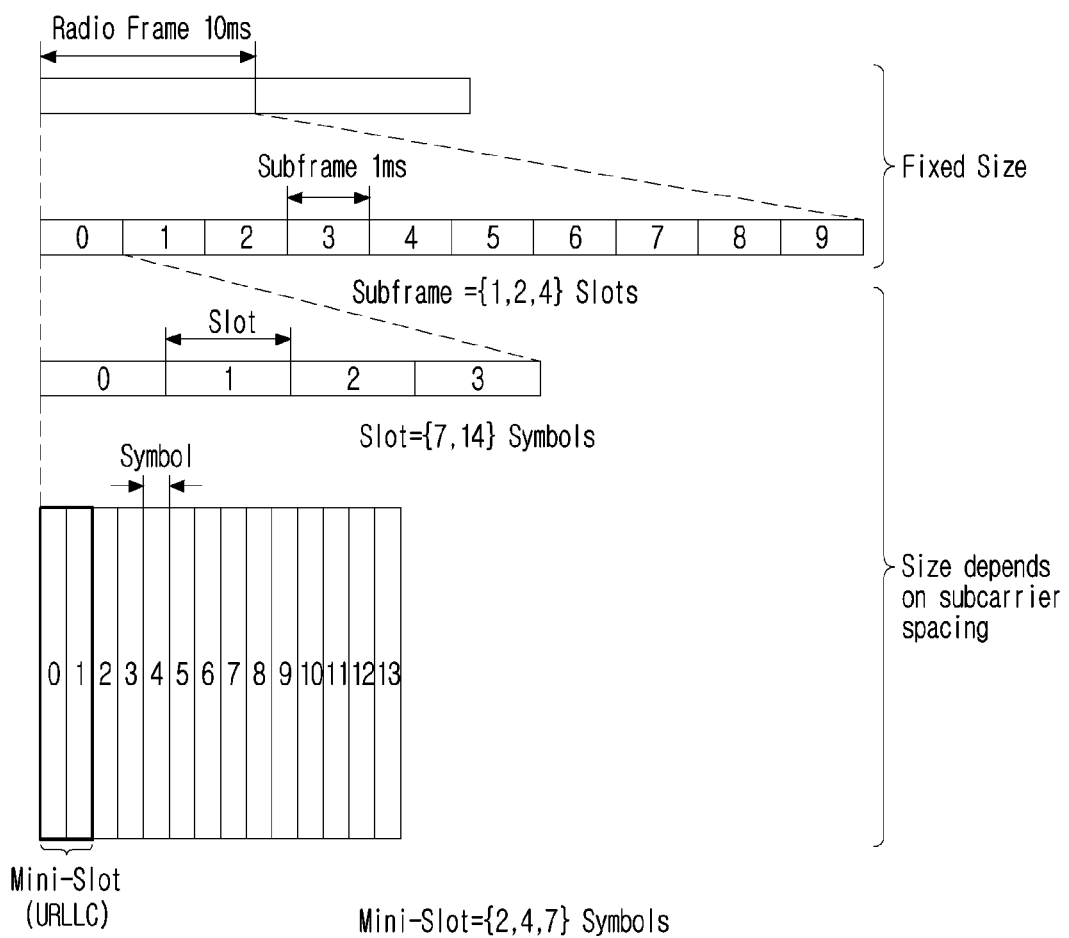
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration Et, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
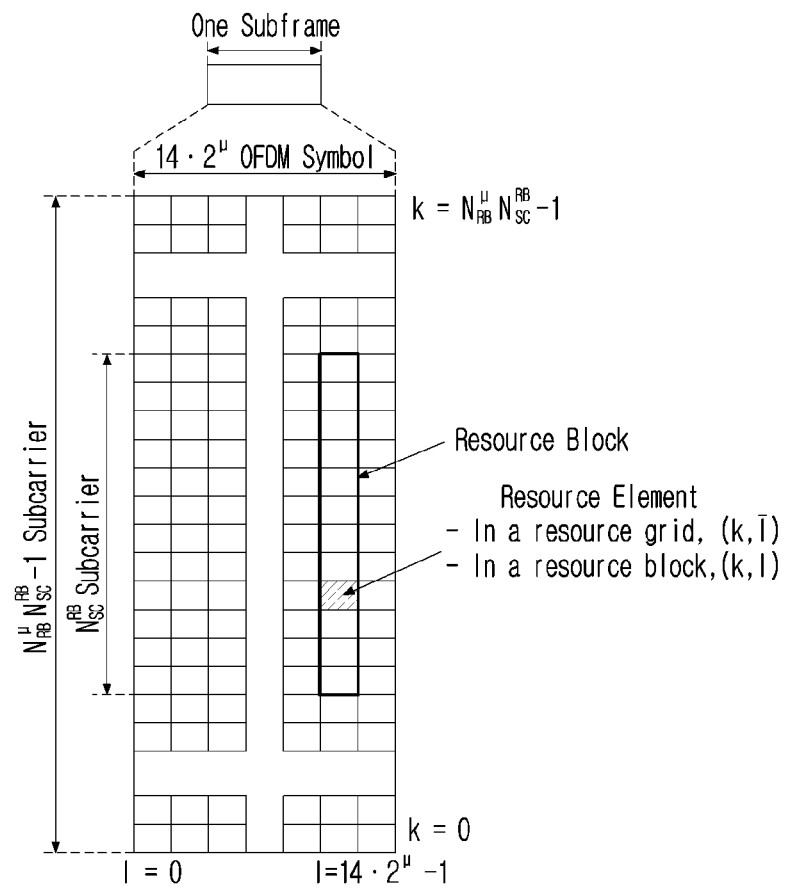
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with 14.29 OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, ..., $N_{RB}^\mu N_{sc}^{RB}-1$ is an index in a frequency domain and l'=0, ..., $2^\mu N_{symb}^{(\mu)}-1$ refers to a position of a symbol in a subframe. When referring to a resource element in a slot, an index pair (k,l) is used. Here, l=0, ..., $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration is identical to 'point A'. A relationship between a common resource block number $n_{CRB}^{\mu}$ and a resource element (k,l) for a subcarrier spacing configuration $\mu$ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
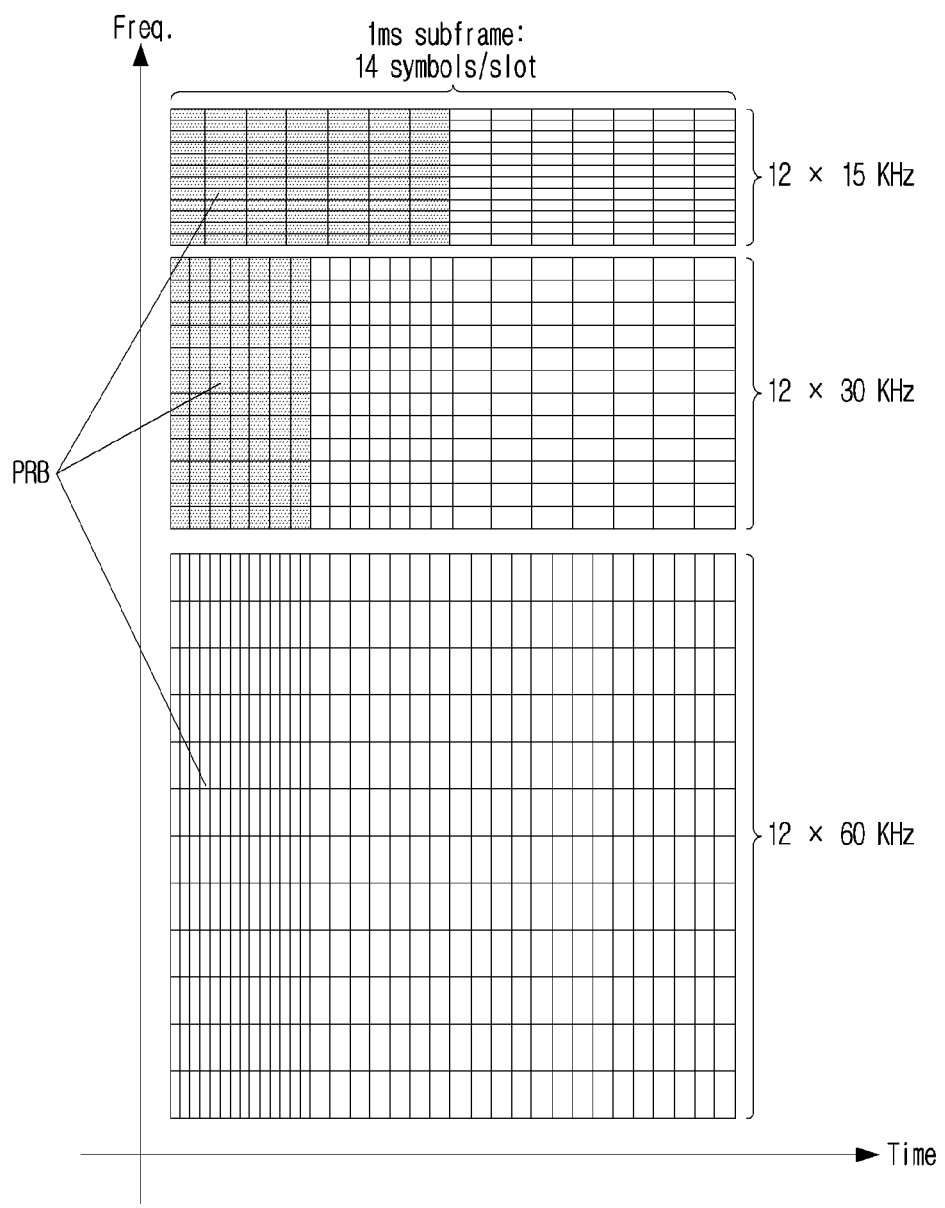
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
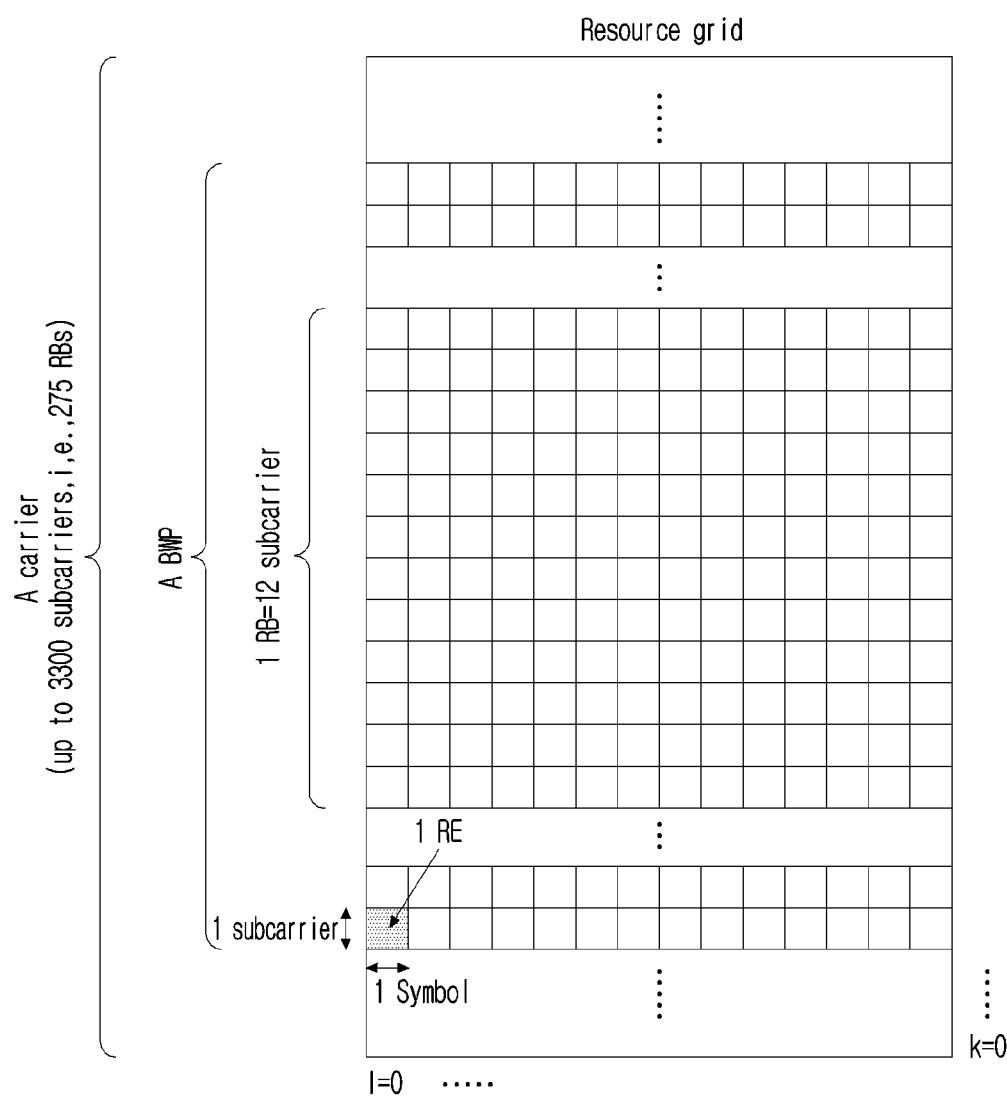
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

For example, when a specific field indicating a BWP (e.g., BWP indicator field) is included in DCI (e.g., DCI format 1_1) for scheduling of a PDSCH, a value of the field may be configured to indicate a specific DL BWP (e.g., active DL BWP) among a set of DL BWPs (pre-) configured for DL reception for a UE. In this case, a UE receiving the DCI may be configured to receive DL data in a specific DL BWP indicated by the corresponding field. And/or, when a specific field indicating a BWP (e.g., BWP indicator field) is included in DCI (e.g., DCI format 0_1) for scheduling of a PUSCH, a value of the field may be configured to indicate a specific UL BWP (e.g., active UL BWP) among a set of UL BWPs (pre-) configured for UL transmission for a UE. In this case, the UE receiving the DCI may be configured to transmit UL data in a specific UL BWP indicated by the corresponding field.

Figure 6:
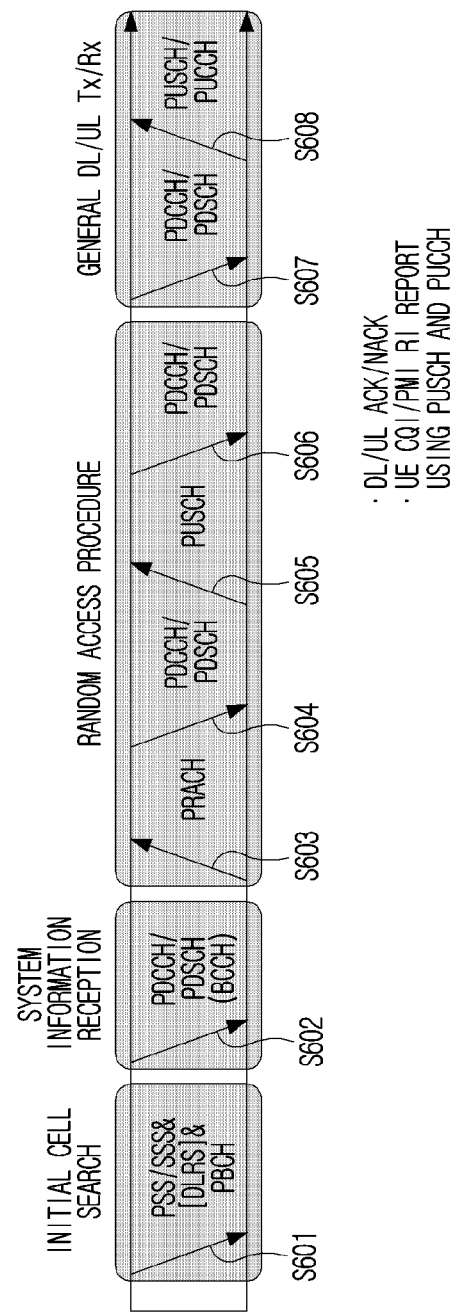
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc.

After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS—resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS—ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resourece setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs)(or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

In addition, MTRP-URLLC may mean that a M TRPs transmit the same transport block (TB) by using different layer/time/frequency. A UE configured with a MTRP-URLLC transmission scheme receives an indication on multiple TCI state(s) through DCI and may assume that data received by using a QCL RS of each TCI state are the same TB. On the other hand, MTRP-eMBB may mean that M TRPs transmit different TBs by using different layer/time/ frequency. A UE configured with a MTRP-eMBB transmission scheme receives an indication on multiple TCI state(s) through DCI and may assume that data received by using a QCL RS of each TCI state are different TBs. In this regard, as UE separately classifies and uses a RNTI configured for MTRP-URLLC and a RNTI configured for MTRP-eMBB, it may decide/determine whether the corresponding M-TRP transmission is URLLC transmission or eMBB transmission. In other words, when CRC masking of DCI received by UE is performed by using a RNTI configured for MTRP-URLLC, it may correspond to URLLC transmission, and when CRC masking of DCI is performed by using a RNTI configured for MTRP-eMBB, it may correspond to eMBB transmission.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/ indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/ mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
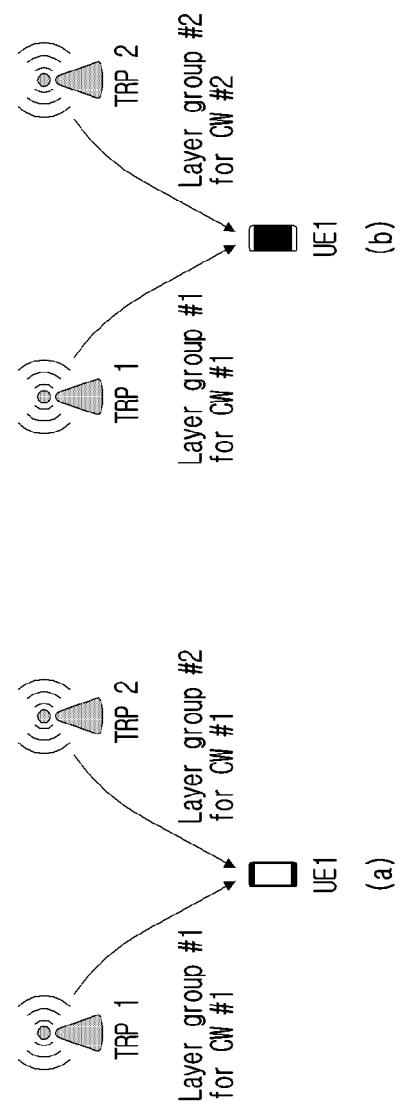
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

A Method of Transmitting and Receiving Channel State Information

According to a CSI (channel state information) framework which is currently defined in Rel-15/16 standards, a terminal may not acquire/report joint CSI for CSI-RS resources transmitted from a different TRP/panel. For example, when TRP 1/2 are assumed, a terminal may acquire/report CSI (e.g., CRI/RI/PMI/CQI, etc.) for each of TRP 1 and TRP 2, but may not acquire/report CSI (e.g., CRI/RI/PMI/CQI, etc.) suitable for multi-TRP transmission by considering TRP1/2 together. Accordingly, an operation which may support multi-TRP transmission (e.g., for NCJT/URLLC) was newly introduced in Rel-16, but there is a disadvantage that random parameters should be applied for link adaptation because a base station does not know the optimum CSI for performing multi-TRP transmission. If a terminal may acquire/report CSI suitable for multi-TRP transmission by considering multi-TRP transmission (e.g., for NCJT/URLLC), system performance may be improved by performing more suitable link adaptation when performing multi-TRP transmission.

In the present disclosure, a method that a terminal may acquire/report CSI suitable for multi-TRP transmission by considering multi-TRP transmission (e.g., for NCJT/URLLC) is proposed.

Hereinafter, in the present disclosure, for convenience of a description, it is assumed that 2 TRPs (e.g., TRP1/TRP2) operate. However, such an assumption does not limit a technical scope of the present disclosure.

A description as a TRP in the present disclosure is for convenience of a description, which may be obviously interpreted as a term such as a panel/a beam, etc.

In the present disclosure, L1 signaling may mean DCI-based dynamic signaling between a base station and a terminal and L2 signaling may mean RRC/MAC CE (control element)-based higher layer signaling between a base station and a terminal.

'CSI-ReportConfig', a higher layer parameter for configuring a CSI reporting method, is defined in TS38.331 standard and some parameters are defined as in the following Table 6. Hereinafter, for convenience of a description, 'CSI-ReportConfig' may be referred to as a reporting setting.

TABLE 6

| ASN1START |
| --- |
| TAG-CSI-REPORTCONFIG-START |
| CSI-ReportConfig ::=          SEQUENCE { |
| reportConfigId                CSI-ReportConfigId, |
| carrier                       ServCellIndex         OPTIONAL, -- Need S |
| resourcesForChannelMeasurement   CSI-ResourceConfigId |
| csi-IM-ResourcesForInterference    CSI-ResourceConfigId              OPTIONAL, -- Need R |
| nzp-CSI-RS-ResourcesForInterference   CSI-ResourceConfigId          OPTIONAL, -- Need R |
| reportConfigType              CHOICE { |
| i)   periodic                 SEQUENCE{ |
| reportSlotConfig              CSI-ReportPeriodicityAndOffset, |
| pucch-CSI-ResourceList           SEQUENCE (SIZE (1..maxNrofBWPs)) OF PUCCH-CSI-Resource |
| ii)   }, |
| iii)   semiPersistentOnPUCCH      SEQUENCE { |
| reportSlotConfig              CSI-ReportPeriodicityAndOffset, |
| pucch-CSI-ResourceList           SEQUENCE (SIZE (1..maxNrofBWPs)) OF PUCCH-CSI-Resource |

In reference to FIG. 6, one reporting setting may include up to 3 'CSI-ResourceConfig's. For convenience, 'CSI-ResourceConfig' may be referred to as a resource setting. According to a time domain behavior of a reporting setting and the number of resource settings configured in a reporting setting, usage of each resource setting is defined in TS38.214 as in the following Table 7.

TABLE 7

For aperiodic CSI, each trigger state configured by using a higher layer parameter 'CSI-AperiodicTriggerState' is associated with one or multiple 'CSI-ReportConfig's and here, each 'CSI-ReportConfig' is linked to periodic, semi-persistent or aperiodic resource setting(s):
When one resource setting is configured, the resource setting (given by a higher layer parameter 'resourcesForChannelMeasurement') is for channel measurement for L1-RSRP (reference signal received power) or for channel and interference measurement for L1-SINR (signal interference noise ratio) computation.
When two resource settings are configured, a first resource setting (given by a higher layer parameter 'resourcesForChannelMeasurement') is for channel measurement and a second resource setting (given by a higher layer parameter 'csi-IM-ResourcesForInterference' or a higher layer parameter 'nzp-CSI-RS-ResourcesForInterference') is for interference measurement performed in CSI-IM (interference measurement) or a NZP CSI-RS.
When three resource settings are configured, a first resource setting (given by a higher layer parameter 'resourcesForChannelMeasurement') is for channel measurement and a second resource setting (given by a higher layer parameter 'csi-IM-ResourcesForInterference') is for CSI-IM based on interference measurement and a third resource setting (given by a higher layer parameter 'nzp-CSI-RS-ResourcesForInterference') is for interference measurement based on a NZP CSI-RS.
For semi-persistent or periodic CSI, each 'CSI-ReportConfig' is linked to periodic or semi-persistent resource setting(s):
When one resource setting (given by a higher layer parameter 'resourcesForChannelMeasurement') is configured, the resource setting is for channel measurement for L1-RSRP or for channel and interference measurement for L1-SINR TABLE 7-continued computation.
When two resource settings are configured, a first resource setting (given by a higher layer parameter 'resourcesForChannelMeasurement') is for channel measurement and a second resource setting (given by a higher layer parameter 'csi-IM-ResourcesForInterference') is for interference measurement performed in CSI-IM (interference measurement). For L1-SINR computation, a second resource setting (given by a higher layer parameter 'csi-IM-ResourcesForInterference' or a higher layer parameter 'nzp-CSI-RS-ResourceForInterference') is used for interference measurement performed in CSI-IM or a NZP CSI-RS.

---

As described above, one resource setting for channel measurement (CM) may be configured for aperiodic (AP) CSI. In addition, one resource setting for CM may be configured for semi-persistent or periodic CSI. As defined in TS 38.214, for a P/SP CSI resource setting, the number of CSI-RS resource sets which may be configured for a resource setting is limited to 1. For an AP CSI resource setting, a plurality of CSI-RS resource sets may be configured, but one resource set of a plurality of resource sets is selected for each reporting setting when configuring a trigger state.

As described above, one resource setting for CM may be configured per reporting setting in current standards. Accordingly, when only one resource setting for CM is configured per reporting setting according to current standards, a method that a terminal may perform CM for each different TRP and interference measurement (IM) generated between different TRPs by using CSI-RS resources defined in one resource setting to acquire and report CSI for multi-TRP transmission is needed. To this end, a method of configuring resource(s)/resource set(s) for CM for a different TRP and a method of configuring/indicating a relation for IM between resource(s)/resource set(s) corresponding to a different TRP are proposed. For example, a different TRP may be classified based on a CORESET group identifier (ID)(or an index)(or a CORESET pool index (CORESET-poolindex)).

Hereinafter, in the present disclosure, a resource set may mean a non-zero power (NZP) CSI-RS resource set, or a resource set may mean a CSI resource set which includes a NZP CSI-RS resource set and/or a CSI-IM (interference measurement) resource set. In addition, hereinafter, in the present disclosure, a resource may mean a NZP CSI-RS resource and may also mean a CSI resource which includes a NZP CSI-RS resource and/or a CSI-IM resource.

Proposal 1: A Method of Configuring Resource(s) Corresponding to a Different TRP to a Terminal in a Single Resource Set Proposal 1-1: A base station may configure resource(s) corresponding to a different TRP to a terminal in a single resource set. Here, the resource set may be a resource set configured in a resource setting for channel measurement in a reporting setting.

A base station may perform an indication/a configuration that such a resource set is a resource set which will be used for CSI computation for multi-TRP transmission through L1/L2 signaling to a terminal. In addition, a base station may indicate/configure how many CSI sets (e.g., N, N is a natural number) should be reported through a corresponding resource set through L1/L2 signaling to a terminal or may be defined by a fixed rule. In addition, a base station may indicate/configure the number of TRPs (e.g., M>=N, M is a natural number) to which resources of a corresponding resource set correspond through L1/L2 signaling to a terminal, or may be defined by a fixed rule. According to a corresponding indication/configuration/rule, resources in a resource set may be classified into M resource groups (sets). When an indication/a configuration is performed as above, N groups of M resource groups may be selected by a terminal for computation/acquisition/reporting of N CSI sets. And, N resource groups and N CSI sets may have a one-to-one corresponding relation and to this end, each CSI set may correspond to a resource group to which a resource utilized for CM belongs.

A terminal may report information on selected resource groups (i.e., CSI) to a base station. Here, for N selected resource groups, resources in a specific group (e.g., a i-th resource group) may be utilized for CM when computing/acquiring/reporting a specific CSI set (e.g., a j-th CSI set) corresponding to the specific group (e.g., a i-th resource group). And, resources in (N−1) groups excluding a specific group applied to CM (e.g., a i-th resource group) may be utilized for IM of the specific CSI set (e.g., a j-th CSI set).

In the above-described proposal, 'configuring resources(s) corresponding to a different TRP in a resource set to a terminal', may be interpreted as a configuration of resources corresponding to a different TCI state in a resource set to a terminal. In addition, it may mean that resources in the same resource set have a CM/IM relation mutually in CSI computation.

Hereinafter, CSI computation for multi-TRP transmission is described.

Figure 8:
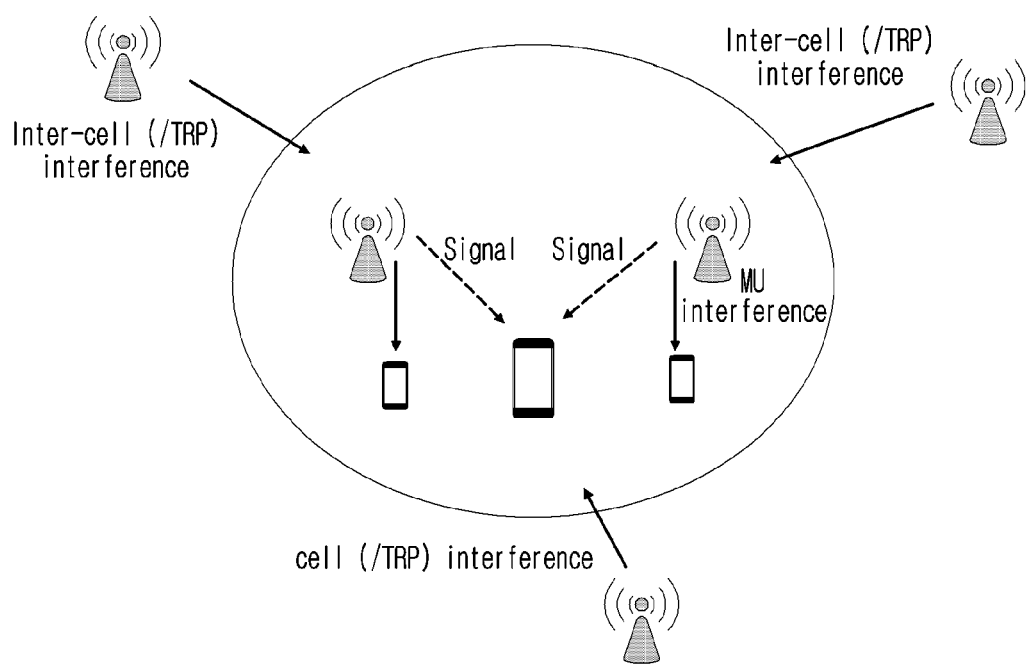
FIG. 8 illustrates an interference signal of a terminal when transmitting multiple TRPs in a wireless communication system to which the present disclosure may be applied.

FIG. 8 illustrates an interference signal of a terminal when transmitting multiple TRPs in a wireless communication system to which the present disclosure may be applied.

In the above-described proposal, 'CSI computation for multi-TRP transmission' may mean the following CM and IM method.

Based on FIG. 8, a reception signal of a terminal may be as in the following Equation.

$$y_{N_{rx} \times 1} = H^1_{N_{rx} \times N_{1,tx}} W^1_{N_{1,tx} \times N_{1,ly}} x^1_{N_{1,ly} \times 1} + H^2_{N_{rx} \times N_{2,tx}} W^2_{N_{2,tx} \times N_{2,ly}} x^2_{N_{2,ly} \times 1} + H^{1,intf}_{N_{rx} \times N_{1,intf}} x^{1,intf}_{N_{1,intf} \times 1} + H^{2,intf}_{N_{rx} \times N_{2,intf}} x^{2,intf}_{N_{2,intf} \times 1} + I_{N_{rx} \times 1} = n_{N_{rx} \times 1}$$

[Equation 3]

In Equation 3, $y_{N_{rx} \times 1}$ may mean a reception signal of a terminal, $H^1_{N_{rx} \times N_{1,tx}}$ may mean a channel of TRP 1, $W^1_{N_{1,tx} \times N_{1,ly}}$ may mean a precoding matrix (PM) of TRP 1, $x^1_{N_{1,ly} \times 1}$ may mean a transmission signal of TRP 1, $H^2_{N_{rx} \times N_{2,tx}}$ may mean a channel of TRP 2, $W^2_{N_{2,tx} \times N_{2,ly}}$ may mean PM of TRP 2, $x^2_{N_{2,ly} \times 1}$ may mean a transmission signal of TRP 2, $H^{1,intf}_{N_{rx} \times N_{1,intf}}$ may mean an interference channel by a multi-user (MU) signal of TRP 1, $x^{1,intf}_{N_{1,intf} \times 1}$ may mean an interference signal by a MU signal of TRP 1, $H^{2,intf}_{N_{rx} \times N_{2,intf}}$ may mean an interference channel by a MU signal of TRP 2, $x^{2,intf}_{N_{2,intf} \times 1}$ may mean an interference signal by a MU signal of TRP 2, $I_{N_{rx} \times 1}$ may mean an overlapped interference signal from an inter-cell (/TRP) and $n_{N_{rx} \times 1}$ may mean a noise of a terminal.

In Equation 3, $N_{rx}$ may mean the number of reception (antenna) ports of a terminal, $N_{1,tx}$ may mean the number of transmission (antenna) ports of TRP 1, $N_{1,ly}$ may mean the number of transmission layers (/ranks) of TRP 1, $N_{2,tx}$ may mean the number of transmission (antenna) ports of TRP 2, $N_{2,ly}$ may mean the number of transmission layers (/ranks) of TRP 2, N1,intf may mean the number of interference layers (/ranks) for a MU signal of TRP 1 and N2,intf may mean the number of interference layers (/ranks) for a MU signal of TRP 2.

According to current standards, a terminal may estimate a channel of TRP 1 by using a CSI-RS transmitted by TRP 1 and measure/calculate CSI (e.g., CRI/RI/PMI/CQI/LI (layer indicator), etc.) for TRP 1 to perform a feedback to a base station. Here, as a base station configures a NZP CSI-RS for CSI-IM and IM to a terminal for more accurate CSI computation/acquisition/reporting, a terminal may measure an effective interference channel caused by a MU signal of TRP 1, an effective interference channel caused by a MU signal of TRP 2, an overlapped interference signal from an inter-cell (/TRP), etc. A terminal may measure a SINR based on a channel of the TRP 1, an interference channel caused by a MU signal of TRP 1 and PM, an interference channel caused by a MU signal of TRP 2, an overlapped interference signal from an inter-cell (/TRP) and a size of a noise. Based on a measured SINR, CSI (e.g., CRI/RI/PMI/CQI/LI, etc.) may be computed/acquired and corresponding CSI may be fed back to a base station.

Meanwhile, in such a process, when a terminal performs multi-TRP transmission (e.g., for NCJT) in computing CSI of TRP 1, a terminal may not measure a size of an interference signal and a size of a signal generated when applying a PMI of TRP 2 and a corresponding PMI. Accordingly, when CSI computed/acquired/reported by a terminal is equivalently applied to multi-TRP transmission in the above-described example, a difference between a SINR of a terminal expected by a base station and an actual SINR may be generated by an influence of an interference signal generated between different TRPs which are not reflected on CSI computation. In addition, it may reduce system performance such as an increase in an error rate/a decrease in the transmission amount, etc. of a reception signal. As a method which may make up for such a disadvantage, 'CSI computation for multi-TRP transmission' in the present disclosure may mean the following operation.

As a base station configures a NZP CSI-RS for CSI-IM and IM to a terminal, a terminal may measure an effective interference channel caused by a MU signal of TRP 1, an effective interference channel caused by a MU signal of TRP 2 and an overlapped interference signal from an inter-cell (/TRP). In addition, as a base station configures a CSI-RS transmitted by TRP 1 and a CSI-RS transmitted by TRP 2 and configures/indicates a relation of two CSI-RSs, a terminal may estimate a channel of TRP 1 and a channel of TRP 2 and estimate an interference channel between different TRPs. A terminal may compute/acquire a combination of $W^1_{N1,tx \times N1,ly}$ and $W^2_{N2,tx \times N2,ly}$ which may maximize a received SINR based on the estimated value (e.g., an estimated value on $H^1_{Nrx \times N1,tx}$, $H^2_{Nrx \times N2,tx}$, $H^{1,intf}_{Nrx \times N1,intf}$ $H^{2,intf}_{Nrx \times N2,intf}$, $I_{Nrx \times 1}$, etc.). And, a terminal may compute CSI for TRP 1 and TRP 2 (e.g., CRI/RI/PMI/CQI/LI), respectively. Alternatively, a terminal may measure at least a size of an interference channel between different TRPs and reflect it on CSI (e.g., CQI, etc.) computation. In addition, in the above-described process, a terminal may perform a joint search for various beam combinations of different TRPs (e.g., a combination by cri-RSRP, ssb-Index-RSRP, cri-SINR, ssb-Index-SINR, etc.). Here, a terminal may compute CQI based on a SINR on which interference between different TRPs which are expected in multi-TRP transmission is reflected, so it may have an advantage that more accurate CQI may be fed back. In addition, covariance matrix values generated by using estimated channel values may be utilized for SINR measurement when computing the CSI. A detailed method thereon is described in 'the following method of SINR computation considering multi-TRP transmission'.

Examples of a method for a base station to indicate/configure a resource set which will be utilized for CSI computation for multi-TRP transmission to a terminal are as follows. The following method may correspond to an example of L1/L2 signaling for performing a proposed operation. But, it is clear that a proposal according to the present disclosure is not limited to the following method.

A1: For each resource set, the operation (i.e., utilized for CSI computation for multi-TRP transmission) may be configured through a specific parameter. Alternatively, for a resource set connected to a specific reporting setting, the operation (i.e., utilized for CSI computation for multi-TRP transmission) may be configured through a specific parameter. A value of M corresponding to the number of resource groups (RG) in a resource set may correspond to an example of the parameter. Here, when a value of M is configured as 2 or more, a terminal may perform CSI computation for the above-proposed multi-TRP transmission. Alternatively, after assuming a fixed value of M (i.e., M may be pre-defined), a parameter in a form such as a flag representing whether the operation (i.e., CSI computation for multi-TRP transmission) is performed may be defined.

A2: The operation may be configured through a specific parameter in a reporting setting. A parameter configuring a CSI entry (e.g., reportQuantity) may correspond to an example of the parameter. Here, when a CSI entry for multi-TRP transmission is included in the parameter (e.g., an index for an RG combination/a hypothesis indicator, etc.), the above-proposed operation (i.e., CSI computation for multi-TRP transmission) may be performed. When it is configured to perform the above-proposed operation, a value of M may be indicated/configured to a terminal based on L1/L2 signaling or may be defined by a fixed rule. For example, a value of M may be configured together in a corresponding reporting setting, or a value of M may be configured in a resource setting/a resource set connected to a corresponding reporting setting.

Hereinafter, a definition of a CSI set is described.

A CSI set may be defined as a value (or a set/information) including one or more CSI entries of CRI/RI/PMI/LI/CQI/L1-SINR/L1-RSRP.

Figure 9:
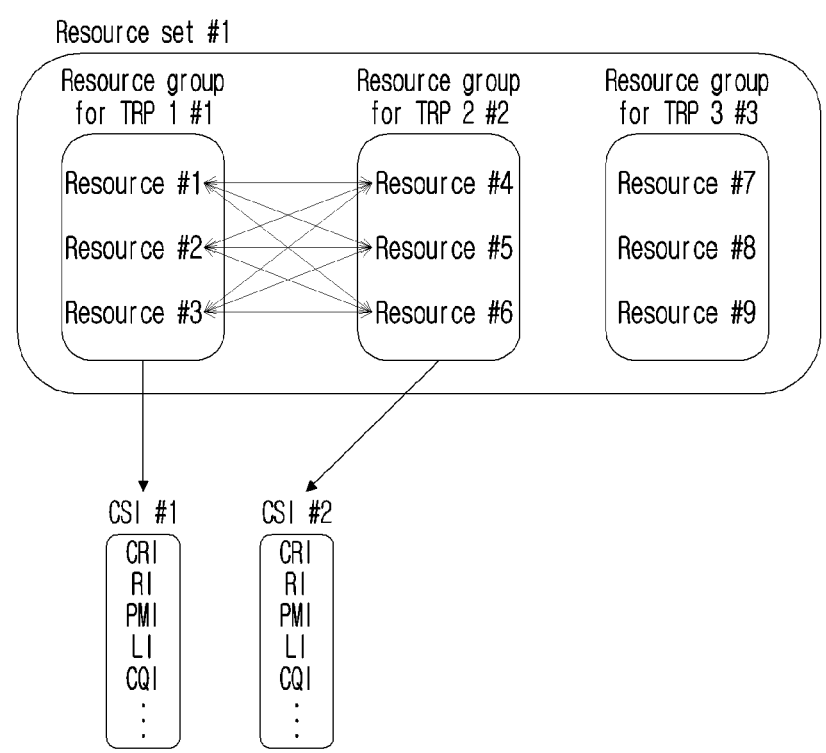
FIG. 9 illustrates a CSI set and a resource group in a resource set according to an embodiment of the present disclosure.

FIG. 9 illustrates a CSI set and a resource group in a resource set according to an embodiment of the present disclosure.

FIG. 9 represents an example of a relation on N (e.g., 2) CSI sets and M (e.g., 3) resource groups configured in a resource set.

FIG. 9 represents an example in which N and M are configured as 2 and 3, respectively. In addition, it represents an example in which a resource for CM in CSI #1, a first CSI set, is included in resource group (RG) #1 and a resource for CM in CSI #2, a second CSI set, is included in resource group (RG) #2. A terminal may use two resources included in a different RG combination to compute CSI of two CSI sets.

For example, a terminal may assume multi-TRP transmission based on TRP #1/#2. In addition, a terminal may assume one resource of resources in RG #1 as a resource for CM for CSI computation of a first CSI set. In addition, a terminal may assume one resource of resources in RG #2 as a resource for CM for CSI computation of a second CSI set. Here, a resource for CM in each CSI set may be utilized as a resource for IM in other CSI set. For example, a resource for CM of resources in RG #1 used for CSI computation of a first CSI set may be used as a resource for IM in a second CSI set and vice versa.

For the operation, CSI computation may be performed for a total of 27 resource combinations including M (e.g., 3), N (e.g., 2) TRP combinations (3 TRP combinations in an example of FIG. 9) and $K_1$ (e.g., 3)×$K_2$ (e.g., 3) resource combinations (9 resource combinations in an example of FIG. 9) to find a TRP combination and a resource combination which are more suitable in multi-TRP transmission. Here, K1 and $K_2$ may mean the total number of resources of an RG that a resource for CM in a first CSI set is included and the total number of resources of an RG that a resource for CM in a second CSI set is included, respectively.

Meanwhile, when a terminal should consider all TRP combinations and all resource combinations as in the example, a disadvantage that complexity of a terminal for CSI computation gets too high may be generated. To supplement such a disadvantage, a base station may perform an indication/a configuration to a terminal through L1/L2 signaling and/or a specific rule between a base station and a terminal may be fixedly applied so that a terminal can consider only specific TRP(s) and/or specific TRP combination(s) and/or specific resource combination(s) in CSI computation. For example, one resource set may include M (M is a natural number) CSI-RS resource groups (here, each CSI-RS resource group may correspond to a separate TRP) and N CSI-RS resource groups may be determined from M CSI-RS resource groups. N CSI sets may be generated based on a combination of CSI-RS resources in N CSI-RS resource groups. Here, N CSI-RS resource groups may correspond to N CSI sets described in the present disclosure (e.g., a one-to-one corresponding relation) and although not specifically mentioned in the present disclosure, a description on each CSI set may be interpreted as a description on each CSI-RS resource group (or each CSI-RS resource pair). In addition, in this case, for generating a n-th (1≤n≤N) CSI set among N CSI sets, a specific CSI-RS resource in a n-th (1≤n≤N) CSI-RS resource group may be used for channel measurement and a CSI-RS resource in remaining CSI-RS resource groups except for a n-th CSI-RS resource group may be used for interference measurement.

Figure 10:
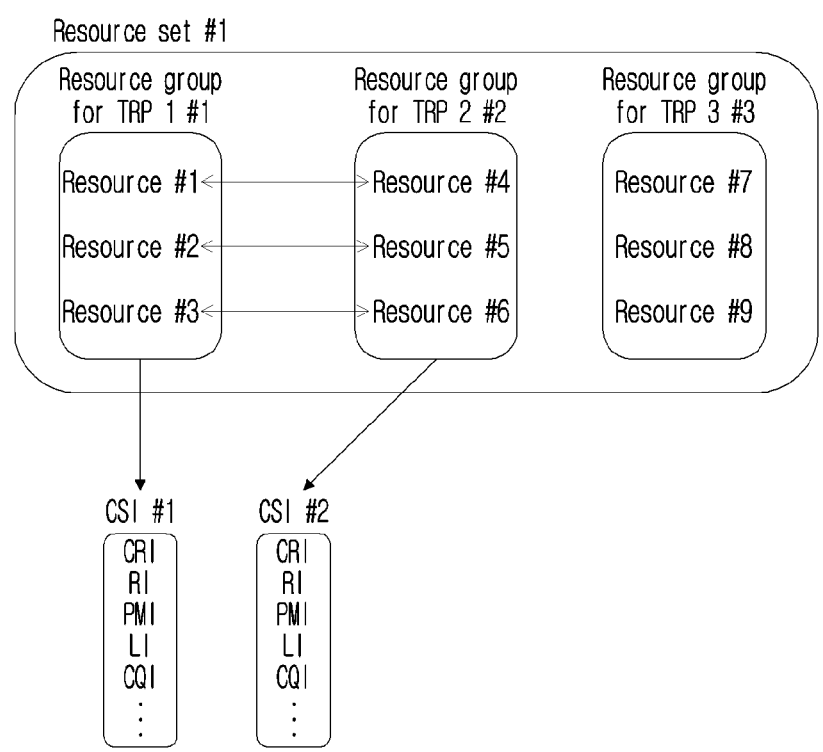
FIG. 10 illustrates a CSI set and a resource group in a resource set according to an embodiment of the present disclosure.

The following FIG. 10 represents an example in which a specific rule is applied between a base station and a terminal so that only a combination of specific resources will be considered in CSI computation.

FIG. 10 illustrates a CSI set and a resource group in a resource set according to an embodiment of the present disclosure.

FIG. 10 illustrates a case in which resources in a different RG may correspond only one to one in ascending order (or descending order). In FIG. 10, a terminal may assume multi-TRP transmission based on TRP #1/#2. In addition, a terminal may assume one resource of resources in RG #1 as a resource for CM for CSI computation of a first CSI set. In addition, a terminal may assume a resource in the same order (or index) as a resource in RG #1 of resources in RG #2 as a resource for CM for CSI computation of a second CSI set. For example, if a terminal uses resource #2 of resources in RG #1 as a resource for CM for CSI computation of a first CSI set, it may use resource #5 of resources in RG #2 as a resource for CM for CSI computation of a second CSI set.

Here, a resource for CM in each CSI set may be utilized as a resource for IM in other CSI set. For example, a resource for CM of resources in RG #1 used for CSI computation of a first CSI set may be used as a resource for IM in a second CSI set and vice versa.

For an operation such as the example, CSI computation may be performed only for a total of 9 resource combinations including 3 TRP combinations and 3 resource combinations, so the computation amount of a terminal may be significantly reduced.

Hereinafter, another definition of a CSI set is described.

An example of the FIGS. 9 and 10 illustrates a case in which the same CSI entry (e.g., CRI/RI/PMI/LI/CQI, etc.) is included in each CSI set. On the other hand, a CSI entry included in each CSI set may be differently defined. And/or, a common CSI entry may be separately defined for a different CSI set.

Figure 11:
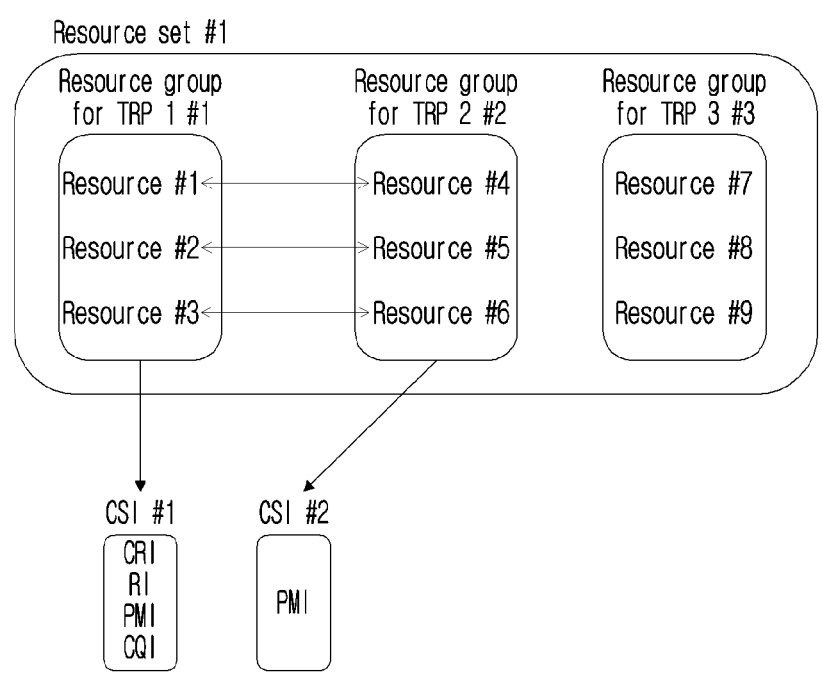
FIGS. 11 and 12 illustrate a CSI set and a resource group in a resource set according to an embodiment of the present disclosure.
Figure 12:
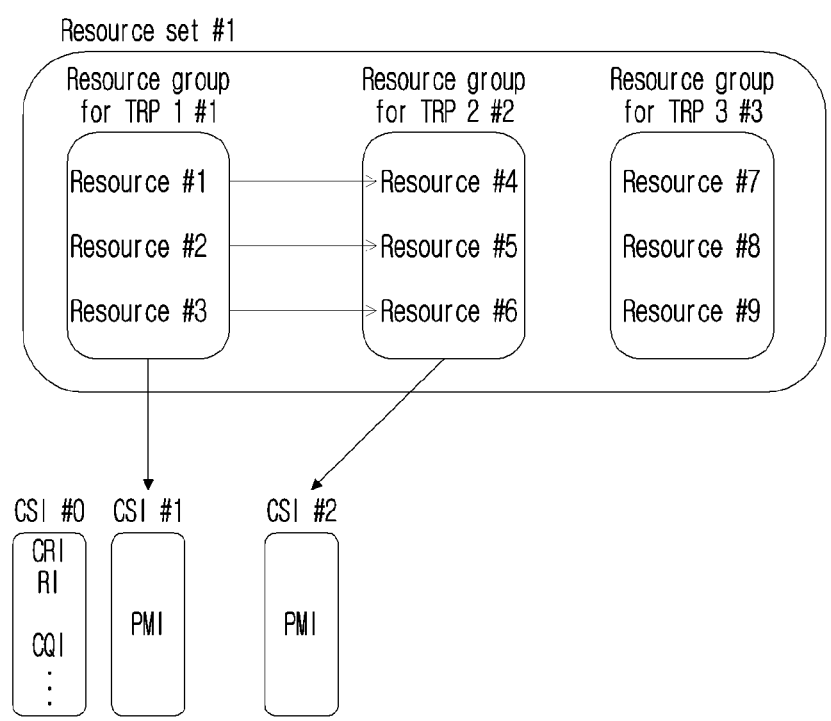

FIGS. 11 and 12 illustrate a CSI set and a resource group in a resource set according to an embodiment of the present disclosure.

FIG. 11 represents an example in which a CSI entry included in each CSI set is differently defined and FIG. 12 represents an example in which a common CSI entry is defined for a different CSI set. In an example of FIG. 11, CRI/RI/CQI included in CSI #1 may be interpreted as a value which is commonly applied to CSI #1/CSI #2. Alternatively, a CSI set which is commonly applied in an example of FIG. 12 (e.g., CSI #0) may be separately defined. For a CSI entry which may be included in a CSI set, the following contents may be applied together. The following method illustrates L1/L2 signaling for performing a proposal that a CSI entry included in each CSI set is differently defined and/or a common CSI entry is defined, but it is not limited to the following method.

CRI: For a different CSI set, a different CRI may be reported respectively. In this case, the different CRI may mean a CRI included in a different resource group (RG).

Alternatively, only one CRI may be reported for a different CSI set. In addition, a combination of resources included in a different RG may be reported based on a corresponding CRI value. In this case, a corresponding CRI value may mean an order (or an index) of resources in each RG. In addition, a bit for CRI reporting may be defined based on the number of resources included in a specific resource group (RG). According to current standards, the number of bits is determined based on the number of resources configured in a resource set, but according to this proposal, there is an advantage that the number of bits for CRI reporting may be saved.

As an example of the method, when a value indicated by the CRI is j, each j-th resource in an RG selected for a CSI set configuration may be selected. Alternatively, a corresponding CRI value may mean an order (or an index) indicating a specific resource, and another resource may be determined based on index information of the specific resource and information of an RG combination selected for a CSI set configuration. For example, when an order in a resource set of the specific resource index is n and an order in an RG is i, a i-th resource in other RG may be selected based on an order in an RG. A detailed description of information on an RG combination selected for a CSI set configuration is described later.

RI: For a different CSI set, a different RI may be reported. Alternatively, only one RI may be reported for a different CSI set, and in this case, both two CSI sets may assume one RI reported above. As such, when only one RI is reported, a degree of freedom for RI selection gets lower, but a feedback overhead for RI reporting may be reduced.

Alternatively, a RI in other CSI set may be defined as a differential value compared with a RI of the specific CSI set based on a RI of a specific CSI set for a different CSI set. For example, when a RI value for a first CSI set is 2 and a RI value for a second CSI set is 4, a terminal may report 2 as a RI value for a first CSI set and report 2 as a RI value for a second CSI set (i.e., a differential value compared with a RI of a first CSI set). In this case, a feedback overhead for RI reporting may be reduced.

In the above-described methods, only a specific RI combination may be limited and defined in CSI reporting. For example, a terminal may report only a RI combination for each CSI set such as 1:1, 1:2, 2:1, 2:2, 2:3, 3:2, 3:3, 3:4, 4:3, 4:4.

Alternatively, a different RI may be reported through a value meaning (indicating) a combination of different RI values. For example, regarding a RI combination such as 1:1, 1:2, 2:1, 2:2, 2:3, 3:2, 3:3, 3:4, 4:3, 4:4, 10 states are assumed. In this case, a terminal may report a different RI value for each CSI set by reporting a state value corresponding to a specific RI combination.

Transmission of 2 Codewords (CW): When a sum of RI values for a different CSI set is equal to or greater than a specific value (e.g., 5), a terminal may report 2 CQIs for 2 CWs. Here, CQI reporting for a different CW is described in detail in the following CQI part.

PMI: For a different CSI set, a different independent PMI value may be reported based on a PM (precoding matrix) defined in standards.

Alternatively, a PMI in other CSI set may be defined as a differential value compared with a PMI of the specific CSI set based on a PMI of a specific CSI set for a different CSI set. For example, PMI index value(s) for a first CSI set may be reported as they are and PMI index value(s) for a second CSI set may be reported as a differential value compared with PMI index value(s) for a first CSI set. In this case, a feedback overhead for PMI reporting may be reduced. The method may assume that an independent PM is applied to a different TRP. The example may assume that an independent PM is applied to each resource corresponding to a different CSI set.

CQI: For a different CSI set, a different independent CQI value may be reported. Here, a SINR assumption for each CQI may be different. For example, for CSI #1, it may be defined as $SINR_1=S_1/(I_{1,Ly1}+I_{1,NCJT2}+I_{1,MU1}+I_{1,MU2}+I_{intf}+N)$ and for CSI #2, it may be defined as $SINR_2=S_2/(I_{2,Ly2}+I_{2,NCJT1}+I_{2,MU1}+I_{2,MU2}+I_{intf}+N)$.

Here, $S_1$ and $S_2$ may mean signal power by a TRP 1 channel and signal power by a TRP 2 channel, respectively. $I_{1,Ly1}$ and $I_{2,Ly2}$ may mean inter-layer interference signal power by a TRP 1 channel and inter-layer interference signal power by a TRP 2 channel, respectively. $I_{1,NCJT2}$ and $I_{2,NCJT1}$ may mean interference signal power of TRP 1 by a TRP 2 channel and interference signal power of TRP 2 by a TRP 1 channel, respectively. $I_{1,MU1}$ and $I_{2,MU2}$ may mean interference signal power of TRP 1 by a MU channel of TRP 1 and interference signal power of TRP 1 by a MU channel of TRP 2, respectively. $I_{1,MU1}$ and $I_{2,MU1}$ may mean interference signal power of TRP 2 by a MU channel of TRP 1 and interference signal power of TRP 2 by a MU channel of TRP 2, respectively. $I_{intf}$ may mean overlapped interference signal power from an inter-cell (/TRP). N may mean a size of a noise.

Meanwhile, when a base station simultaneously transmits a signal from a different TPR (e.g., for NCJT), a reception SINR of a terminal may be defined as $SINR_{NCJT}=(S_1+S_2)/(I_{1,Ly1}+I_{1,NCJT2}+I_{2,Ly2}+I_{2,NCJT1}+I_{1,MU1}+I_{1,MU2}+I_{2,MU1}+I_{2,MU2}+I_{intf}+N)$. As in an example described in the Equations, when a different independent CQI value considers only signal power of a specific TRP, it may have a value different from a CQI in actual multi-TRP transmission (e.g., for NCJT). Accordingly, a base station may indicate/configure a terminal to report a (single) CQI considering multi-TRP transmission (e.g., for NCJT) through L1/L2 signaling or may be defined by a fixed rule. In this case, only one CQI may be reported for a different CSI set. When only one CQI is reported as above, it may mean a CQI for 1CW transmission.

A relation of a transmission layer of a PDSCH/antenna port(s) for a PDSCH (a DMRS)/antenna port(s) for a CSI-RS/a precoder in CQI computation is described:

In current standards, UE assumes that a PDSCH signal in an antenna port set [1000, . . . , 1000+v−1] for v layers is equivalent to a signal corresponding to corresponding symbols transmitted from an antenna port [3000, . . . , 3000+P−1] as in the following Equation 4.

$$\begin{bmatrix} y^{(3000)}(i) \\ \ldots \\ y^{(3000+P-1)}(i) \end{bmatrix} = W(i) \begin{bmatrix} x^{(0)}(i) \\ \ldots \\ x^{(v-1)}(i) \end{bmatrix}$$ [Equation 4]

$x(i)=[x^{(0)}(i) \ldots x^{(v-1)}(i)]^T$ is a vector of PDSCH symbols generated from layer mapping. $P \in \{1, 2, 4, 8, 12, 16, 24, 32\}$ is the number of CSI-RS ports. When only one CSI-RS port is configured, W(i) is 1. When reportQuantity, a higher layer parameter in CSI-ReportConfig that a CQI is reported, is set as 'cri-RI-PMI-CQI' or 'cri-RI-LI-PMI-CQI', W(i) is a precoding matrix corresponding to a reported PMI which is applicable to x(i). When reportQuantity, a higher layer parameter in CSI-ReportConfig that a CQI is reported, is set as 'cri-RI-CQI', W(i) is a precoding matrix corresponding to a procedure described in clause 5.2.1.4.2 of TS38.214. When reportQuantity, a higher layer parameter in CSI-ReportConfig that a CQI is reported, is set as 'cri-RI-i1-CQI', W(i) is a precoding matrix corresponding to i1 reported according to a procedure described in clause 5.2.1.4.2 of TS38.214. A corresponding PDSCH signal transmitted in an antenna port [3000, . . . , 3000+P−1] may have the same ratio of a PDSCH EPRE (Energy Per Resource Element) to a CSI-RS EPRE as a ratio given in clause 5.2.2.3.1 of TS38.214.

In current standards, one resource is assumed in CSI computation and accordingly, it has one RI/PMI. Accordingly, only one RI and PM are considered also in a relation of a transmission layer of a PDSCH/antenna port(s) for a PDSCH (a DMRS)/antenna port(s) for a CSI-RS/a precoder in CQI computation defined in the standards. However, in CSI computation considering multi-TRP transmission, it may have each RI/PMI value for a different CSI-RS resource corresponding to a different CSI set. Accordingly, in this case, a relation between an antenna port for a transmission layer of a PDSCH/a PDSCH (a DMRS) and a CSI-RS port/a RI/a precoder corresponding to a difference resource corresponding to a different CSI set should be defined.

A Method of reporting 1 CQI for transmission of 1 CW

For example, when a sum of RIs corresponding to a different CSI set is equal to or less than 4, 1 CQI for transmission of 1 CW may be reported. In this case, a CQI may be determined based on the following method.

1) For a CSI-RS port and a precoder, an order for CQI computation (or an index, or an order, or mapping) may be defined based on an order of a CSI set (or an index, or an order (e.g., ascending order or descending order)). The following Equation 5 represents an example of the method.

$$\begin{bmatrix} y_{CSI1}^{(3000)}(i) \\ \dots \\ y_{CSI1}^{(3000+P_{CSI1}-1)}(i) \\ y_{CSI2}^{(3000)}(i) \\ \dots \\ y_{CSI2}^{(3000+P_{CSI2}-1)}(i) \end{bmatrix} = \begin{bmatrix} W_{CSI1}(i) & 0 \\ 0 & W_{CSI2}(i) \end{bmatrix} \begin{bmatrix} x^{(0)}(i) \\ \dots \\ x^{(v-1)}(i) \end{bmatrix}$$ [Equation 5]

In Equation 5, $y^{(p)}_{CSI1}(i)$ and $y^{(p)}_{CSI2}(i)$ may mean a symbol transmitted through a p-th CSI-RS port of a resource corresponding to a first CSI set and a symbol transmitted through a p-th CSI-RS port of a resource corresponding to a second CSI set, respectively. $P_{CSI1}$ and $P_{CSI2}$ may mean the number of CSI-RS ports of a resource corresponding to a first CSI set and the number of CSI-RS ports of a resource corresponding to a second CSI set, respectively. $W_{CSI1}(i)$ and $W_{CSI2}(i)$ may mean a PM corresponding to a first CSI set (e.g., a PM selected by a terminal/selected by a rule) and a PM corresponding to a second CSI set (e.g., a PM selected by a terminal/selected by a rule), respectively. 0 may mean a matrix that all elements are configured with 0.

For CSI-RS ports defined in Equation 5, it may be assumed that a signal corresponding to a symbol transmitted from a corresponding antenna port in an order in a vector is the same as a signal transmitted from a [1000, . . . , 1000+v−1] port that a PDSCH is transmitted. Here, symbols mapped to each layer may follow a definition of standards. It may mean a mapping relation between each layer and a DMRS port. In addition, the contents may be equally applied in the following proposal. For example, in CQI computation, UE assumes that a PDSCH signal in an antenna port set [1000, . . . , 1000+v−1] for v layers is equivalent to a signal corresponding to corresponding symbols transmitted in an antenna port [$3000_{CSI1}$, . . . , $3000_{CSI1}+P_{CSI1}-1$, $3000_{CSI2}$, . . . , $3000_{CSI2}+P_{CSI2}-1$]. Here, $x(i)=[x^{(0)}(i) \dots x^{(v-1)}(i)]^T$ is a vector of PDSCH symbols generated from layer mapping.

2) For a CSI-RS port and a precoder, an order for CQI computation (or an index, or an order, or mapping) may be defined based on a RI size of a CSI set (e.g., ascending order or descending order). The following Equation 6 represents an example of the method.

$$\begin{bmatrix} y_{CSIa}^{(3000)}(i) \\ \dots \\ y_{CSIa}^{(3000+P_{CSIa}-1)}(i) \\ y_{CSIb}^{(3000)}(i) \\ \dots \\ y_{CSIb}^{(3000+P_{CSIb}-1)}(i) \end{bmatrix} = \begin{bmatrix} W_{CSIa}(i) & 0 \\ 0 & W_{CSIb}(i) \end{bmatrix} \begin{bmatrix} x^{(0)}(i) \\ \dots \\ x^{(v-1)}(i) \end{bmatrix}$$ [Equation 6]

In Equation 6, $y^{(p)}_{CSIa}(i)$ and $y^{(p)}_{CSIb}(i)$ may mean a symbol transmitted through a p-th CSI-RS port of a resource corresponding to a CSIa set and a symbol transmitted through a p-th CSI-RS port of a resource corresponding to a CSIb set, respectively. $P_{CSIa}$ and $P_{CSIb}$ may mean the number of CSI-RS ports of a resource corresponding to a CSIa set and the number CSI-RS ports of a resource corresponding to a CSIb set, respectively. $W_{CSIa}(i)$ and $W_{CSIb}(i)$ may mean a PM corresponding to a CSIa set (e.g., a PM selected by a terminal/selected by a rule) and a PM corresponding to a CSIb set (e.g., a PM selected by a terminal/selected by a rule), respectively. 0 may mean a matrix that all elements are configured with 0.

In the Equation, for CSIa and CSIb, an order may be determined to satisfy $RI_{CSIa} \geq RI_{CSIb}$ or $RI_{CSIa} \leq RI_{CSIb}$. For example, when a first condition is assumed, for $RI_{CSI1}$, $RI_{CSI2}=2, 1$, CSIa and CSIb may correspond to CSI1 and CSI2, respectively. Meanwhile, when a RI of a different CSI set is the same, an order may be defined based on a method of the 1).

A Method of reporting 2 CQIs for transmission of 2 CWs

For example, when a sum of RIs corresponding to a different CSI set is equal to or greater than 5, 2 CQIs for transmission of 2 CWs may be reported. In this case, each CQI corresponding to a different CW may be determined based on the following method.

1) For a CSI-RS port and a precoder, an order for CQI computation (or an index, or an order, or mapping) may be defined based on an order of a CSI set (or an index, or an order (e.g., ascending order or descending order)). Here, transmission layers may be classified into different layer groups (LG) and a different PM may (sequentially) correspond to a transmission layer of a different LG. For example, a PM in CSI set 1 may (sequentially (e.g., in ascending order/descending order)) correspond to a transmission layer belonging to LG 1 and a PM in CSI set 2 may (sequentially (e.g., in ascending order/descending order)) correspond to a transmission layer belonging to LG 2. The following Equation 7 represents an example of the method.

$$\begin{bmatrix} y_{CSI1}^{(3000)}(i) \\ \dots \\ y_{CSI1}^{(3000+P_{CSI1}-1)}(i) \\ y_{CSI2}^{(3000)}(i) \\ \dots \\ y_{CSI2}^{(3000+P_{CSI2}-1)}(i) \end{bmatrix} =$$ [Equation 7]

$$\begin{bmatrix} W_{CSI1}(i) & 0 \\ 0 & W_{CSI2}(i) \end{bmatrix} \begin{bmatrix} x^{(v_{LG1}^1)}(i) \\ \dots \\ x^{(v_{LG1}^1+RI_{CI1}-1)}(i) \\ x^{(v_{LG2}^1)}(i) \\ \dots \\ x^{(v_{LG2}^1+RI_{CSI2}-1)}(i) \end{bmatrix}$$

In Equation 7, $y^{(p)}_{CSI1}(i)$ and $y^{(p)}_{CSI2}(i)$ may mean a symbol transmitted through a p-th CSI-RS port of a resource corresponding to a first CSI set and a symbol transmitted through a p-th CSI-RS port of a resource corresponding to a second CSI set, respectively. $P_{CSI1}$ and $P_{CSI2}$ may mean the number of CSI-RS ports of a resource corresponding to a first CSI set and the number of CSI-RS ports of a resource corresponding to a second CSI set, respectively. $W_{CSI1}(i)$ and $W_{CSI2}(i)$ may mean a PM corresponding to a first CSI set (e.g., a PM selected by a terminal/selected by a rule) and a PM corresponding to a second CSI set (e.g., a PM selected by a terminal/selected by a rule), respectively. 0 may mean a matrix that all elements are configured with 0.

In Equation 7, $v^1_{LG1}$ and $v^1_{LG2}$ may mean a first layer index of a first LG and a first layer index of a second LG, respectively.

In the method, a transmission layer corresponding to a different LG may be defined based on all RI values and an example may be as follows. For example, for a RI=5/6/7, $v_{LG1}=\{2, 3, 6, 7\}$, $v_{LG2}=\{0, 1, 4, 5\}$ or $v_{LG2}=\{2, 3, 6, 7\}$, $v_{LG1}=\{0, 1, 4, 5\}$ may be defined. In another example, for a RI=6, $v_{LG1}=\{2, 3, 5\}$, $v_{LG2}=\{0, 1, 4\}$ or $v_{LG2}=\{2, 3, 5\}$, $v_{LG1}=\{0, 1, 4\}$ may be defined.

Based on an example of the LG, when a RI value of a different CSI set is different, LG2 may correspond to a CSI set having a larger RI value. In other words, a LG including a layer corresponding a CW having a large RI value for all RI values may correspond to a CSI set having a large RI value.

Alternatively, when a different CSI set has the same RI value, a CSI set and a LG may correspond respectively based on a specific order (e.g., ascending order/descending order).

A reason why a LG may be classified as above is as follows. As described in the following standards, based on TS38.212, when a DMRS port index is indicated to a terminal through DCI, it may be defined to correspond to a transmission layer in an indicated DMRS port order.

For example) Antenna port(s)—4, 5, or 6 bits, here, the number of CDM groups without values of 1, 2, 3 refers to each CDM group {0, {0, 1}, {0, 1, 2}. An antenna port $\{p_0, \ldots, p_{v-1}\}$ is determined according to an order of DMRS port(s).

Meanwhile, when a plurality of TCI states are indicated to a terminal for multi-TRP transmission, each TCI state and DMRS port may be defined in TS38.214 as below so that they can be mapped each other based on a CDM group that a DMRS port is included.

For example) When UE is not indicated by DCI including a DCI field 'Time domain resource assignment' indicating an entry in pdsch-TimeDomainAllocationList including RepNumR16 in PDSCH-TimeDomainResourceAllocation, and when 2 TCI states in a codepoint of a DCI field 'Transmission Configuration Indication' are indicated and DM-RS port(s) in 2 CDM groups in a DCI field 'Antenna Port(s)' are indicated, a first TCI state corresponds to a CDM group of a first antenna port indicated by an antenna port indication table and a second TCI state corresponds to other CDM group.

According to the above-described contents, when a plurality of TCI states are indicated to a terminal for multi-TRP transmission, each TCI state may be mapped to a DMRS port included in a specific CDM group. And, the DMRS port is sequentially mapped to a transmission layer in an order defined in standards. Thereby, when 2 CWs are transmitted, DMRS ports corresponding to a different TCI state may correspond to layers corresponding to a specific CW. In other words, a specific CW may be mapped to a different TRP together without being mapped to a specific TRP.

The following Table 8 represents a mapping relation between each CW/layer/DMRS port/CDM group when 5 layers are transmitted according to current standards. (DMRS Type 1 is illustrated)

TABLE 8

| Codeword (CW) | layer | DMRS port | CDM group |
|---|---|---|---|
| 0 | 0 | 0 | 0 |
|   | 1 | 1 | 0 |

TABLE 8-continued

| Codeword (CW) | layer | DMRS port | CDM group |
|---|---|---|---|
| 1 | 2 | 2 | 1 |
|   | 3 | 3 | 1 |
|   | 4 | 4 | 0 |

As shown in Table 8, for CW1, it may be shown that a DMRS port corresponding to a different CDM group, i.e., corresponding to a different TRP, is mapped. The mapping relation should be able to be reflected when a terminal computes a CQI of a different CW. For example, according to a mapping relation of a layer-DMRS port-CDM group in the table, layer 0, 1, 4 may correspond to TRP 1 and layer 2,3 may correspond to TRP 2. Accordingly, in CQI computation of CW1, a third layer of TRP 1 and a first and second layer of TRP 2 may be a layer of a transmission signal and may be computed as signal power in CQI computation. On the other hand, a first and second layer of TRP 1 corresponding to CW0 may be an interference layer for CW1 and may be computed as interference power in CQI computation for CW1.

As described in an example of Table 8, a layer corresponding to each CW may classify a layer group (LG) based on a mapping relation of a layer-DMRS port-CDM group, i.e., based on a CDM group to which a layer will correspond.

Figure 13:
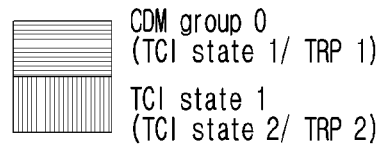
FIG. 13 illustrates information on a CDM group and a DMRS port corresponding to each layer based on all RIs according to an embodiment of the present disclosure.
Figure 13:
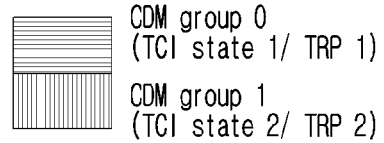

FIG. 13 illustrates information on a CDM group and a DMRS port corresponding to each layer based on all RIs according to an embodiment of the present disclosure.

2) For a CSI-RS port and a precoder, an order for CQI computation (or an index, or an order, or mapping) may be defined based on a RI size of a CSI set (e.g., ascending order or descending order). Here, transmission layers may be classified into different layer groups (LG) and a different PM may (sequentially) correspond to a transmission layer of a different LG. For example, a PM in CSI set 1 may (sequentially (e.g., in ascending order/descending order)) correspond to a transmission layer belonging to LG 1 and a PM in CSI set 2 may (sequentially (e.g., in ascending order/descending order)) correspond to a transmission layer belonging to LG 2. The following Equation 8 represents an example of the method.

$$\begin{bmatrix} y_{CSIa}^{(3000)}(i) \\ \vdots \\ y_{CSIa}^{(3000+P_{CSIa}-1)}(i) \\ y_{CSIb}^{(3000)}(i) \\ \vdots \\ y_{CSIb}^{(3000+P_{CSIb}-1)}(i) \end{bmatrix} = \begin{bmatrix} W_{CSIa}(i) & 0 \\ 0 & W_{CSIb}(i) \end{bmatrix} \begin{bmatrix} x^{(v^1_{LG1})}(i) \\ \vdots \\ x^{(v^1_{LG1}+RI_{CSI1}-1)}(i) \\ x^{(v^1_{LG2})}(i) \\ \vdots \\ x^{(v^1_{LG2}+RI_{CSI2}-1)}(i) \end{bmatrix}$$

[Equation 8]

In Equation 8, $y^{(p)}_{CSIa}(i)$ and $y^{(p)}_{CSIb}(i)$ may mean a symbol transmitted through a p-th CSI-RS port of a resource corresponding to a CSIa set and a symbol transmitted through a p-th CSI-RS port of a resource corresponding to a CSIb set, respectively. $P_{CSIa}$ and $P_{CSIb}$ may mean the number of CSI-RS ports of a resource corresponding to a CSIa set and the number CSI-RS ports of a resource corresponding to a CSIb set, respectively. $W_{CSIa}(i)$ and $W_{CSIb}(i)$ may mean a PM corresponding to a CSIa set (e.g., a PM selected by a terminal/selected by a rule) and a PM corresponding to a CSIb set (e.g., a PM selected by a terminal/selected by a rule), respectively. 0 may mean a matrix that all elements are configured with 0.

In the Equation, for CSIa and CSIb, an order may be determined to satisfy $RI_{CSIa} \geq RI_{CSIb}$ or $RI_{CSIa} \leq RI_{CSIb}$. For example, when a first condition is assumed, for $RI_{CSI1}$, $RI_{CSI2}=3, 2$, CSIa and CSIb may correspond to CSI1 and CSI2, respectively. Meanwhile, when a RI of a different CSI set is the same, an order may be defined based on a method of the 1).

In Equation 8, $v^1_{LG1}$ and $v^1_{LG2}$ may mean a first layer index of a first LG and a first layer index of a second LG, respectively.

In the method, a transmission layer corresponding to a different LG may be defined based on all RI values and an example may be as follows. For example, for a RI=5/7/8, $v_{LG1}=\{2, 3, 6, 7\}$, $v_{LG2}=\{0, 1, 4, 5\}$ or $v_{LG2}=\{2, 3, 6, 7\}$, $v_{LG1}=\{0, 1, 4, 5\}$ may be defined. In another example, for a RI=6, $v_{LG1}=\{2, 3, 5\}$, $v_{LG2}=\{0, 1, 4\}$ or $v_{LG2}=\{2, 3, 5\}$, $v_{LG1}=\{0, 1, 4\}$ may be defined.

Based on an example of the LG, when a RI value of a different CSI set is different, LG2 may correspond to a CSI set having a larger RI value. In other words, a LG including a layer corresponding a CW having a large RI value for all RI values may correspond to a CSI set having a large RI value.

Alternatively, when a different CSI set has the same RI value, a CSI set and a LG may correspond respectively based on a specific order (e.g., ascending order/descending order).

LI (layer indicator): For a different CSI set, a different independent LI value may be reported. Whether a different independent LI value is reported and/or the number of LI values reported in each CSI set may be indicated by L1/L2 signaling and/or may be determined based on a fixed rule. For example, the number of LI values which should be reported may be determined based on the maximum number of PTRS ports configured in a terminal. For example, when the maximum number of PTRS ports is configured as 2, two different LI values may be reported in each CSI set. For example, when N is 2 in the assumption (i.e., there are 2 CSI sets), a LI value of each CSI set and/or the number of bits necessary for reporting a LI value may be determined based on a RI and/or a PMI reported in each CSI set. For example, when it is assumed that a RI value corresponding to a specific CSI set is v, the number of bits necessary for reporting a LI value of the specific CSI set may be determined based on the number of ports configuring a resource corresponding to a corresponding CSI set. For example, it may be determined such as ceil($\log_2$ v)(ceil(x) is the minimum integer which is not smaller than x) or min(2,ceil($\log_2$ v)). In addition, the reported LI value may mean the strongest layer index corresponding to a specific column of a PM corresponding to a PMI of a corresponding CSI set. Meanwhile, when the maximum number of PTRS ports is configured as 1, one LI value may be reported. Alternatively, a LI value selected for a specific CSI set may be reported and a LI value fixed as a specific value for remaining N−1 CSI sets may be reported.

A1. When one LI value is reported for a different CSI set and an independent CQI is reported in a different CSI set: The number of bits necessary for reporting a corresponding LI may be determined based on the largest value of RI values included in all CSI sets (e.g., v) and the number of ports configuring a resource corresponding to a CSI set that the largest RI value is included. For example, it may be determined such as ceil($\log_2$ v)(ceil(x) is the minimum integer which is not smaller than x) or min(2,ceil($\log_2$ v)). Here, a CSI set corresponding to the reported LI value may be determined based on a RI/a CQI included in each CSI set. For example, a CSI set corresponding to the reported LI value may be determined as a CSI set having a larger CQI and/or (when a CQI is the same) may be determined as a CSI set having a larger RI value and/or (when a CQI/a RI is the same) may be determined as a specific CSI set (e.g., a first CSI set). The reported LI value may mean the strongest layer index corresponding to a specific column of a PM corresponding to a PMI of a corresponding CSI set.

A2. When one LI value is reported for a different CSI set and one CQI is reported for a different CSI set: The number of bits necessary for reporting a corresponding LI may be determined based on the largest value of RI values included in all CSI sets (e.g., v) and the number of ports configuring a resource corresponding to a CSI set that the largest RI value is included. For example, it may be determined such as ceil($\log_2$ v)(ceil(x) is the minimum integer which is not smaller than x) or min(2,ceil($\log_2$ v)). Here, a CSI set corresponding to the reported LI value may be determined based on a RI included in each CSI set. For example, the reported LI value may be determined as a CSI set having a larger RI value and/or (when a RI is the same) may be determined as a specific CSI set (e.g., a first CSI set). And/or a CSI set corresponding to the reported LI value may be determined as a CSI set having greater signal power/a larger SINR. The reported LI value may mean the strongest layer index corresponding to a specific column of a PM corresponding to a PMI of a corresponding CSI set.

Meanwhile, when one LI value is reported in the proposal, a variable for reporting whether the LI value is reported by corresponding to which CSI set of a plurality of CSI sets may be defined. For example, a specific CSI set of two CSI sets may be reported through 1-bit information. Alternatively, a rule may be defined so that a reported LI value will correspond to a specific CSI set. For example, when one LI value is reported, it may be defined as corresponding to a first (or a lowest/a highest) CSI set. Here, a terminal may arrange an order of RIs/PMIs, etc. which will be reported in each CSI set based on the LI value. For example, a RI/a PMI, etc. corresponding to the LI value may correspond to a first CSI set and remaining CSI may correspond to remaining CSI sets to report them to a base station.

For the reported RI/PMI, a mutual pair may be defined and a reporting method/the amount of reported information, etc. of a PMI may be determined based on a pairing RI value.

Hereinafter, a method of defining a resource group in a resource set is described.

For M resource groups (RG) in a resource set, each RG may be configured with one or more resources.

Table 9 illustrates a NZP-CSI-RS-RESOURCESET information element which defines a resource set.

TABLE 9

```
ASN1START
TAG-NZP-CSI-RS-RESOURCESET-START
NZP-CSI-RS-ResourceSet :: =      SEQUENCE {
nzp-CSI-ResourceSetId            NZP-CSI-RS-ResourceSetId,
nzp-CSI-RS-Resources             SEQUENCE (SIZE (1..maxNrofNZP-CSI-RS-
ResourcesPerSet)) OF NZP-CSI-RS-ResourceId,
repetition                       ENUMERATED { on, off }        OPTIONAL,
-- Need S
aperiodicTriggeringOffset        INTEGER(0..6)                 OPTIONAL,
-- Need S
trs-Info                         ENUMERATED {true}             OPTIONAL,
-- Need R
...,
[[
aperiodicTriggeringOffset-r16                                  INTEGER(0..31)
OPTIONAL -- Need S
]]
}
TAG-NZP-CSI-RS-RESOURCESET-STOP
-- ASN1STOP
```

As described in Table 9, a resource may be configured in nzp-CSI-RS-Resources. In other words, the resource may be configured in NZP CSI-RS resources. Resources configured in the nzp-CSI-RS-Resources may be classified into M RGs according to a fixed rule and/or L1/L2 signaling of a base station. For example, according to the above-described 'method for a base station to indicate/configure a resource set which will be utilized for CSI computation for multi-TRP transmission to a terminal', a terminal receiving a corresponding indication/configuration may classify a resource in a resource set into M RGs.

A method in which resources configured in nzp-CSI-RS-Resources are classified into M RGs is as in the following example (e.g., A1/A2).

A1: A $M*(n)+i$-th resource in nzp-CSI-RS-Resources may be included in a i-th RG. ($i=0, \ldots, M-1, n=0, 1, \ldots$)

A2: A $M*(i)+n$-th resource in nzp-CSI-RS-Resources may be included in a i-th RG. ($n=0, \ldots, M-1, i=0, 1, \ldots$)

Based on current standards, the maximum number of resources in nzp-CSI-RS-Resources may be configured by a specific parameter. For example, the maximum number of resources (e.g., 64) may be configured according to a maxNrofNZP-CSI-RS-ResourcesPerSet parameter. The maximum number of resources which may be actually configured may be different according to reported information or the reporting quantity (e.g., a parameter, reportQuantity) configured in a reporting setting to which a resource set is connected. For example, when the reporting quantity (e.g., a parameter, reportQuantity) is configured as one of CRI/RI/CQI reporting (cri-RI-CQI), CRI/RI/i1 (some indexes in a PMI) reporting (cri-RI-i1), CRI/RI/i1 (some indexes in a PMI)/CQI reporting (cri-RI-i1-CQI), CRI/RI/PMI/CQI reporting (cri-RI-PMI-CQI), CQI/RI/LI/PMI/CQI reporting (cri-RI-LI-PMI-CQI), up to 8 resources may be configured per resource set. Such a limit considers single TRP transmission, so when multi-TRP transmission is considered, the maximum number of resources which may be configured per resource set may be defined/configured as a value greater than 8. For example, it may be defined as $8*M/8*max(M)$. To this end, the maximum number of resources which may be configured in a resource set may be defined based on specific parameter(s) configured in a resource set (e.g., whether the operation is performed/a value of M/a value of N, etc.) and/or specific parameter(s) configured in a reporting setting to which a resource set is connected (e.g., the reporting quantity (a value of reportQuantity)).

Hereinafter, a method of reporting combination information of resource groups (RG) selected for a CSI set configuration is described.

In the above-described proposal, M resource groups configured with one or more resources in one resource set are defined. According to a proposal, N RGs of M RGs may be selected and here, a terminal should report to a base station which RG combination is used to compute/acquire/report CSI.

Meanwhile, for omitting reporting on such a selected RG, a base station may be indicated/configured to compute/acquire/report CSI for N CSI sets based on N RGs or may be defined by a fixed rule. And, a terminal may not report information on a RG to a base station.

However, although the same number of RGs as CSI sets is configured, there may be a case in which a terminal may determine that performance of single TRP transmission considering a specific TRP is better than that of multi-TRP transmission considering N TRPs. For example, a case in which a CQI considering single TRP transmission is higher than a CQI considering multi-TRP transmission when the total number of ranks is the same/similar may correspond to it. As such when M, the number of RGs configured/included in a resource set, is the same as and greater than N, the number of CSI sets which should be reported, a terminal should report to a base station which RG group is used to report CSI sets. To this end, a terminal may report standard information on N or less RG groups to a base station when reporting N CSI sets. For such reporting, the following method may be applied.

A1: A terminal may report N or less specific RG(s) based on a bitmap configured with M-bits.

A2: A bit field which may indicate Combination(M,N)+ Combination(M,N−1)+ . . . +Combination(M,1) RG combinations may be defined and a terminal may report N or less specific RG(s) based on a corresponding relation between a corresponding bit field and a specific RG combination.

When the number of RGs reported according to the proposal is less than N, CSIs configuring N−1 CSI sets (e.g., CRI/RI/PMI/LI/CQI, etc.) may be fixed as a specific value. Alternatively, information/a size of part 1/2 may be determined based on the number of RGs reported to the base station. Part 1/2 information is defined in TS38.214 and includes the following contents. Part 1 is used to identify the number of information bits in Part 2 with a fixed payload size. Part 1 should be entirely transmitted before Part 2.

In addition to the proposal, for reducing a feedback overhead and complexity of CSI computation of a terminal, it may be defined to compute/acquire/report CSI only for a specific candidate among all RG combination candidates which may be combined with M RGs based on L1/L2 signaling and/or a fixed rule. The following Table 10 to Table 12 represent such an example.

TABLE 10

| Candidates | Reporting |
|---|---|
| RG #1 | on |
| RG #2 | on |
| RG #3 | on |
| RG #1-#2 | on |
| RG #1-#3 | on |
| RG #2-#3 | on |

TABLE 11

| Candidates | Reporting |
|---|---|
| RG #1 | off |
| RG #2 | off |
| RG #3 | off |
| RG #1-#2 | on |
| RG #1-#3 | on |
| RG #2-#3 | on |

TABLE 12

| Candidates | Reporting |
|---|---|
| RG #1 | on |
| RG #2 | off |
| RG #3 | on |
| RG #1-#2 | off |
| RG #1-#3 | on |
| RG #2-#3 | off |

In an example of the Table 10 to Table 12, M and N assume that 3 and 2 are configured, respectively. Table 10 represents an example configured to perform CSI computation/acquisition/reporting for all possible RG combinations. On the other hand, Table 11 and Table 12 represent an example configured not to consider a specific RG combination. Table 11 represents an example configured not to perform CSI computation/acquisition/reporting for single TRP transmission. Table 12 represents an example configured not to perform CSI computation/acquisition/reporting that a TRP corresponding to RG #2 is included. In other words, Table 12 is an example configured not to compute/acquire/report CSI that a TRP corresponding to a specific RG is included. (In other words, it may be configured to compute/acquire/report only CSI that a TRP corresponding to a specific RG is included.) A base station may configure the operation to a terminal through a specific parameter in each reporting setting.

When it is configured to compute/acquire/report CSI only for a specific candidate among all RG combination candidates based on the proposal, a configuration (and/or a size) of a CSI payload may be determined based on the 'specific candidate'. For example, for an example of the Table 10, 3 bits which will indicate a specific RG combination among a total of 6 candidates should be included in a CSI payload.

But, in an example of Table 11 or Table 12, CSI may be computed/acquired/reported only for 3 candidates among a total of 6 candidates, so only 2 bits which will indicate a specific RG combination among 3 candidates may be included in a CSI payload. And/or it may be defined to maintain a size of a CSI payload (i.e., fixed in a specific size) and fixedly report a specific value for a specific payload (e.g., for zero padding).

And/or, when it is configured to compute/acquire/report CSI only for a specific candidate among all RG combination candidates based on the proposal, the number of CPUs (CSI processing unit) used for CSI reporting may be determined based on the 'specific candidate'. For example, for an example of the Table 10, the number of CPUs for CSI computation/acquisition/reporting for a total of 6 candidates should be considered. However, in an example of Table 11 or Table 12, CSI may be computed/acquired/reported only for 3 candidates among a total of 6 candidates, so it may be defined to consider only the number of CPUs for 3 candidates.

Meanwhile, in addition to the proposal, it may be defined to necessarily compute/acquire/report CSI for a specific candidate among all RG combination candidates which may be possible with M RGs based on L1/L2 signaling and/or a fixed rule. For example, a terminal may be defined to compute/acquire/report CSI related to single TRP transmission. In an example of the Table 10, a terminal may compute/acquire CSI based on a resource in RG #1/#2/#3 to compute/acquire/report CSI for single TRP transmission and may report CSI computed/acquired based on a specific resource in a specific RG which is most preferred when assuming single TRP transmission (e.g., the highest SINR/CQI/RI/throughput, etc.) to a base station. CSI for the single TRP transmission may be always reported regardless of CSI for multi-TRP transmission and in addition, CSI for multi-TRP transmission (e.g., for NCJT/URLLC, etc.) may be reported together. In other words, an example of Table 10 may mean a case in which CSI for a single TRP and CSI for multi-TRPs are always reported together to a base station. As above, when a terminal always reports CSI for a single TRP regardless of CSI for multi-TRPs, when a base station may not perform multi-TRP transmission for any reason although multi-TRP transmission is better for a specific terminal, the base station may know CSI suitable for a single TRP for the specific terminal. Accordingly, it may have an advantage that scheduling suitable for the specific terminal may be performed.

And/or, when CSI is necessarily computed/acquired/reported for a specific candidate based on the proposal and at the same time, whether CSI is reported for a specific candidate is variable (selective), a state which may indicate whether the reporting is performed may be defined together in a CSI payload for reporting a specific RG combination. For example, when it is defined/configured to necessarily compute/acquire/report CSI related to single TRP transmission and it is defined/configured to report CSI related to multi-TRP transmission based on selection of a terminal, a state related to 'non-reporting' may be defined in a CSI payload for reporting an RG combination related to multi-TRP transmission. In an example of the Table 10, there are three RG combinations {#1,#2}, {#1,#3}, {#2,#3}, related to multi-TRP transmission, and as a state for 'non-reporting' is added to it, a CSI payload may be configured with 2 bits for a total of 4 states.

And/or, a state related to reporting/partial reporting (e.g., for CSI omission)/non-reporting may be defined by adding or substituting a state for the 'non-reporting'.

A relation between a resource group in a resource set and a CSI-IM/NZP CSI-RS configured in a resource setting for IM is described.

Figure 14:
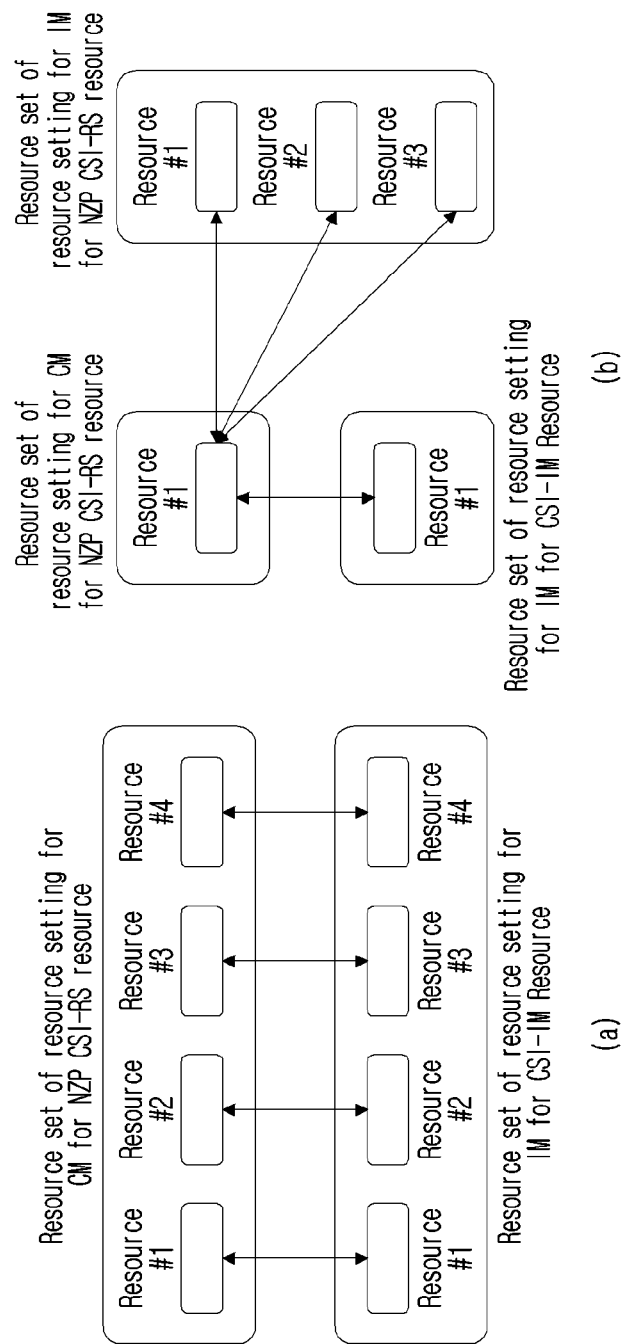
FIG. 14 is a diagram which illustrates a mapping relation with a resource for channel measurement and a resource for interference measurement in a wireless communication system to which the present disclosure may be applied.

FIG. 14 is a diagram which illustrates a mapping relation with a resource for channel measurement and a resource for interference measurement in a wireless communication system to which the present disclosure may be applied.

In reference to FIG. 14(a), as defined in TS 38.214, a NZP CSI-RS resource of a resource setting for CM connected to a reporting setting and a CSI-IM resource for IM are mapped each other in a resource-wise unit in CSI computation. For example, a first NZP CSI-RS resource may be applied together with a first CSI-IM resource in CSI computation and a second NZP CSI-RS resource may be applied together with a second CSI-IM resource in CSI computation.

In reference to FIG. 14(b), when a NZP CSI-RS resource for IM is configured in a reporting setting, only one of a NZP CSI-RS resource of a resource setting for CM and a CSI-IM resource for IM may be configured. And, in CSI computation, a NZP CSI-RS resource, a CSI-IM resource and NZP CSI-RS resource for IM may be applied together.

Meanwhile, when a plurality of resource groups in a resource set are configured according to the proposals, the mapping method defined in current standards may be used as it is for CSI computation. However, in this case, there is a problem that an unnecessary resource may be defined for defining a CSI-IM resource for IM to increase a RS overhead and a NZP CSI-RS resource for IM may not be defined. To supplement it, when a plurality of resource groups are configured in a resource set, for CSI computation, a relation between a resource group in a resource set and a CSI-IM/NZP CSI-RS configured in a resource setting for IM may be defined as follows.

Figure 15:
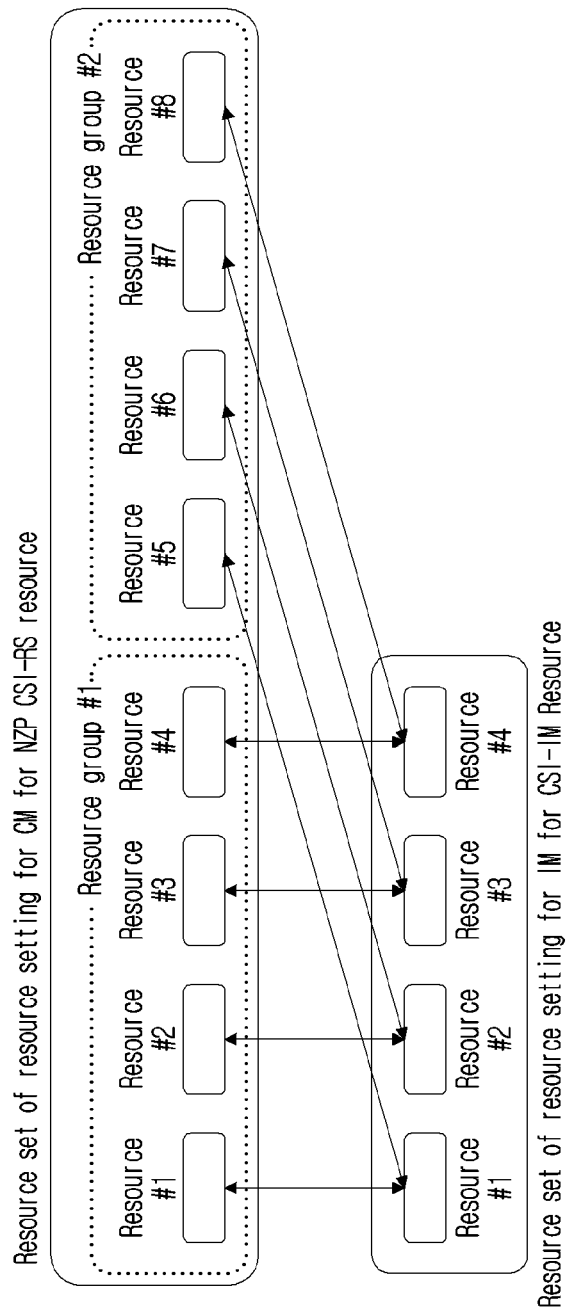
FIGS. 15 to 17 are a diagram which illustrates a mapping relation with a resource for channel measurement and a resource for interference measurement according to an embodiment of the present disclosure.
Figure 16:
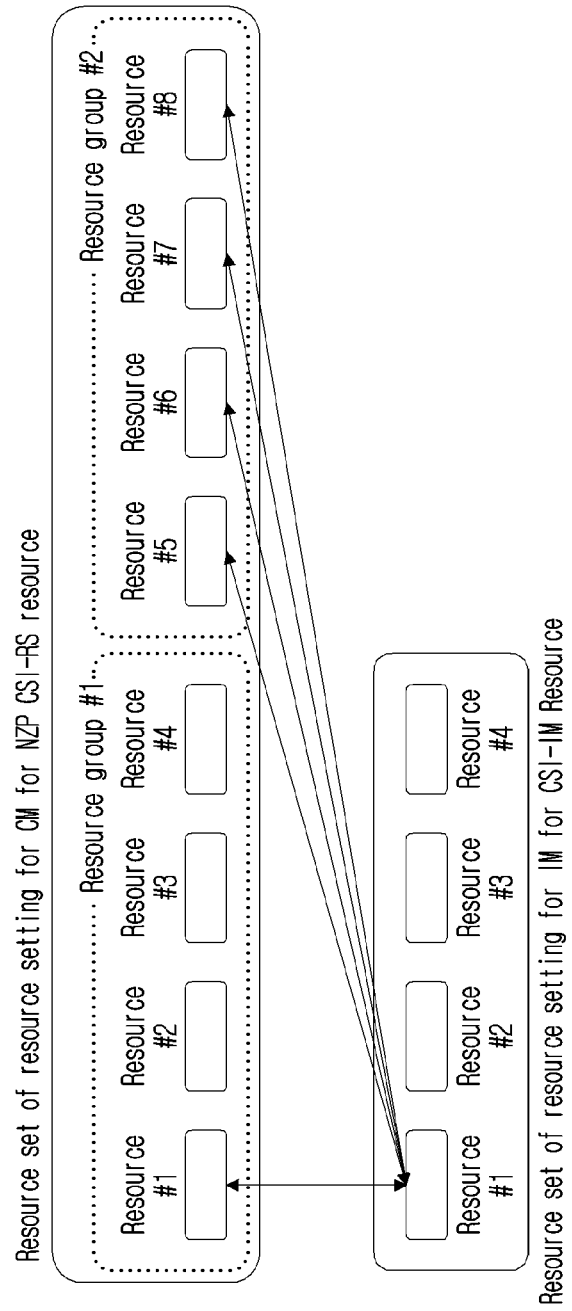
Figure 17:
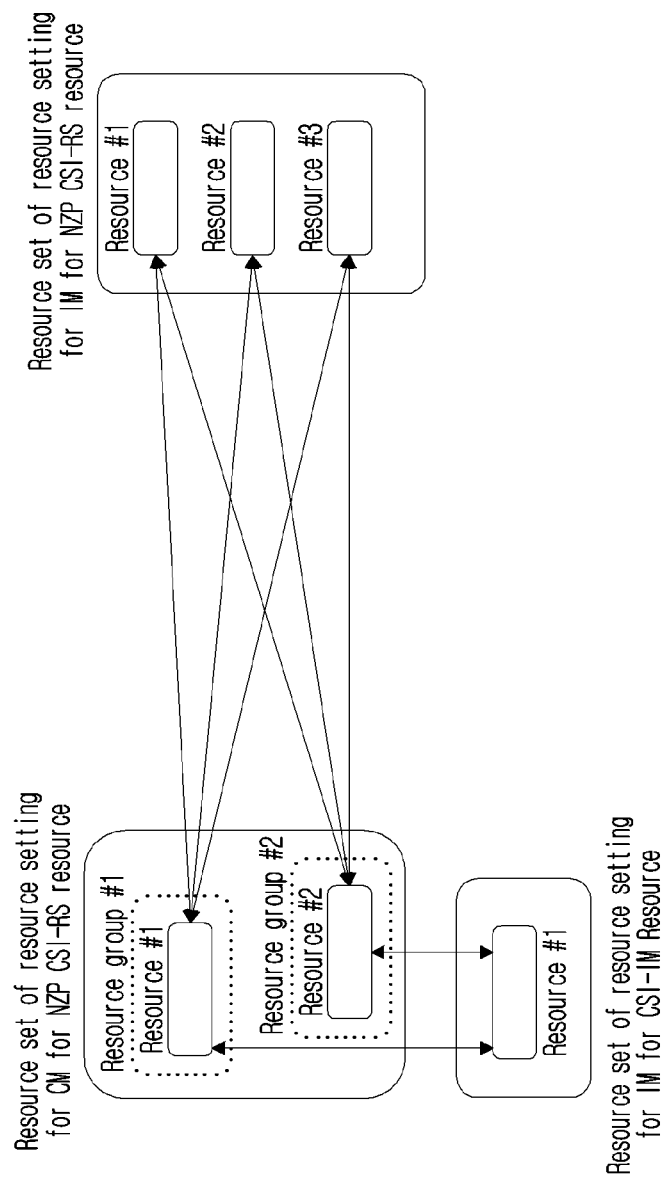

FIGS. 15 to 17 are a diagram which illustrates a mapping relation with a resource for channel measurement and a resource for interference measurement according to an embodiment of the present disclosure.

A CSI-IM resource configured in a resource setting for IM may be mapped to a resource in each resource group in a resource-wise unit.

In reference to FIG. 15, for example, a first NZP CSI-RS resource in a first resource group (RG) may be applied together with a first CSI-IM resource when computing CSI and a second NZP CSI-RS resource in a second RG may be also applied together with a second CSI-IM resource when computing CSI. Likewise, a second NZP CSI-RS resource in a first resource group (RG) may be applied together with a second CSI-IM resource when computing CSI and a second NZP CSI-RS resource in a second RG may be also applied together with a second CSI-IM resource when computing CSI.

Alternatively, in reference to FIG. 16, a CSI-IM resource may be mapped to a specific resource in a specific resource group (RG) (e.g., RG #2 in FIG. 16) in a resource-wise unit. A resource (e.g., resource #1 of RG #1 in FIG. 16) mapped to the CSI-IM resource among resources included in a resource group (e.g., RG #1 in FIG. 16) except for the specific resource group may be mapped to a resource (e.g., resource #1 of CSI-IM resources in FIG. 16) assumed for IM between RGs when performing CSI computation for the specific resource.

When a NZP CSI-RS resource is configured in a resource setting for IM, only one resource in a resource group may be configured and when performing CSI computation, a NZP CSI-RS resource, a CSI-IM resource and NZP CSI-RS resources for IM in each resource group may be applied together. For example, in reference to FIG. 17, when performing CSI computation, resource #1, CSI-IM resource #1 and NZP CSI-RS resource #1 for IM in resource group #1 may be applied together.

Hereinafter, a method of configuring a different QCL-typeD reference resource is described.

The above-described proposal may assume that for resources included in a different resource group (RG), QCL-typeD is not configured or the same QCL-typeD is configured in a resource-wise unit. As described in 'the relation between a resource group in a resource set and a CSI-IM/NZP CSI-RS configured in a resource setting for IM', it may be equally applied to a NZP CSI-RS resource and a CSI-IM resource for IM mapped to resources in each RG.

Meanwhile, a case in which a different QCL-TypeD RS is configured may be supported by considering a frequency band higher than FR 1. For example, when a terminal may be equipped with a plurality of panels and simultaneously receive a signal by using a plurality of reception beams, a terminal may receive PDSCH(s) that a plurality of QCL-TypeD RSs are configured. In this case, a different QCL-typeD RS needs to be configured for resources included in a different RG to acquire/report CSI considering multi-TRP transmission. To this end, a terminal may report relative UE capability to a base station. The UE capability may be a capability which means a terminal may simultaneously receive a signal through a plurality of spatial domain receive filters based on a different QCL-TypeD RS. A base station may configure a different QCL-TypeD RS for resources corresponding to a different RG for CSI computation which considers multi-TRP transmission for a corresponding terminal based on the UE capability. When a different QCL-TypeD RS is configured for resources corresponding to a different RG, a terminal may receive the resource through a plurality of spatial domain receive filters based on a different QCL-TypeD RS (i.e., through a plurality of panels). It may be equally applied to a NZP CSI-RS resource and a CSI-IM resource for IM mapped to resources in each RG described in the 'relation between a resource group in a resource set and a CSI-IM/NZP CSI-RS configured in a resource setting for IM'. In addition, resources corresponding to the different RG are configured with a different QCL-TypeD RS, but may be defined to be transmitted in the same OFDM symbol. In addition, resources corresponding to the different RG may have a one-to-one corresponding relation between different RGs.

Figure 18:
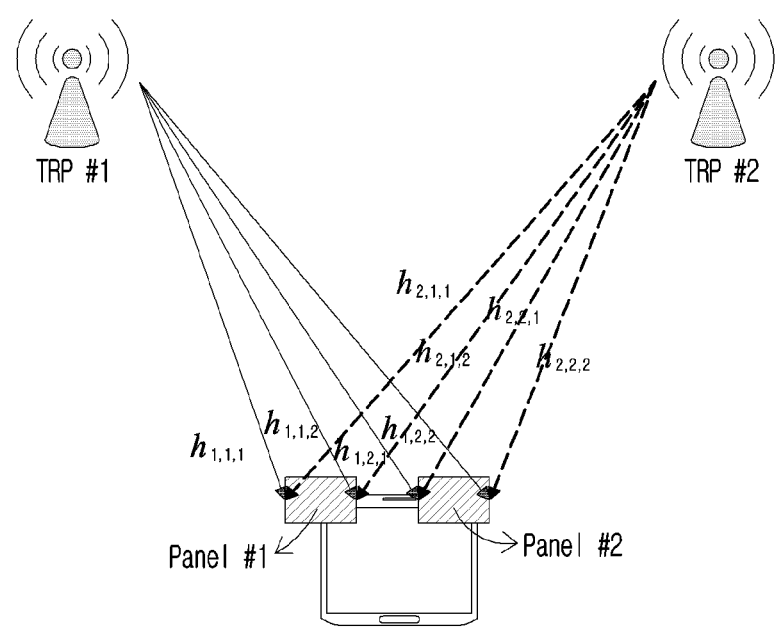
FIG. 18 illustrates an operation which receives CSI-RSs that different multiple QCL type D reference resources are configured according to an embodiment of the present disclosure.

FIG. 18 illustrates an operation which receives CSI-RSs that different multiple QCL type D reference resources are configured according to an embodiment of the present disclosure.

An operation which receives the CSI-RS through a plurality of spatial domain receive filters based on a different QCL-TypeD RS (i.e., through a plurality of panels) may be represented as in the following Equation 9.

$$y_{2\times 1} = \begin{bmatrix} h_{1,1,1} + h_{1,2,1} & h_{2,1,1} + h_{2,2,1} \\ h_{1,1,2} + h_{1,2,2} & h_{2,1,2} + h_{2,2,2} \end{bmatrix} \begin{bmatrix} x_1 \\ x_2 \end{bmatrix} + n_{2\times 1} \qquad \text{[Equation 9]}$$

In Equation 9, $y_{2\times 1}$ may mean a vector of a reception signal and $n_{2\times 1}$ may mean a vector of a noise. $x_1$ may mean a transmission signal of a CSI-RS port of TRP1 and $x_2$ may mean a transmission signal of a CSI-RS port of TRP2. $h_{i,p,j}$ may mean a channel coefficient between a CSI-RS port of a i-th TRP and a j-th reception port of a p-th panel of a terminal. As in the above-described example, a reception beam of panel 1 and panel 2 may be different. It may be an interpretation that a different QCL-TypeD RS is configured for different CSI-RS resources (for CM) considered in CSI computation considering multi-TRP transmission. In other words, it is assumed that a QCL-TypeD RS of resource #a included in RG #1 corresponding to TRP1 is configured as A and a QCL-TypeD RS of resource #b included in RG #2 corresponding to TRP2 is configured as B. And, a situation that two resources respectively correspond to a different CSI set is assumed. In this case, a terminal may simultaneously receive a CSI-RS in a specific resource through a different reception beam. And, a terminal may estimate $h_{1,1,1}+h_{1,2,1}$ and $h_{1,1,2}+h_{1,2,2}$ with a reception signal of each reception port of a terminal through a CSI-RS transmitted by resource #a and estimate $h_{2,1,1}+h_{2,2,1}$ and $h_{2,1,2}+h_{2,2,2}$ with a reception signal of each reception port of a terminal through a CSI-RS transmitted by resource #b.

The Equation 9 assumes a case in which a terminal does not classify a reception antenna port of a different panel. Meanwhile, a terminal may also receive a signal by classifying a reception antenna port of a different panel. The following Equation 10 represents an example for a case in which a terminal receives a signal by classifying a reception antenna port of a different panel.

$$y_{4\times1} = \begin{bmatrix} h_{1,1,1} & h_{2,1,1} \\ h_{1,2,1} & h_{2,2,1} \\ h_{1,1,2} & h_{2,1,2} \\ h_{1,2,2} & h_{2,2,2} \end{bmatrix} \begin{bmatrix} x_1 \\ x_2 \end{bmatrix} + n_{4\times1}$$

[Equation 10]

As in the above-described example, it is assumed that a QCL-TypeD RS of resource #a included in RG #1 corresponding to TRP1 is configured as A and a QCL-TypeD RS of resource #b included in RG #2 corresponding to TRP2 is configured as B. And, a situation that two resources respectively correspond to a different CSI set is assumed. In this case, a terminal may simultaneously receive a CSI-RS in a specific resource through a different reception beam. And, a terminal may estimate $h_{1,1,1}$, $h_{1,2,1}$, $h_{1,1,2}$ and $h_{1,2,2}$ with a reception signal of each reception port of a terminal through a CSI-RS transmitted by resource #a and estimate $h_{2,1,1}$, $h_{2,2,1}$, $h_{2,1,2}$, $h_{2,2,2}$ with a reception signal of each reception port of a terminal through a CSI-RS transmitted by resource #b.

To apply the method, a plurality of different QCL-TypeD RSs may be configured for a CSI-RS resource (based on the UE capability). When a different QCL-TypeD RS is configured for a CSI-RS resource, a terminal may receive the resource through a plurality of reception filters (i.e., spatial domain receive filters) based on a different QCL-TypeD RS. Here, for CSI computation which considers multi-TRP transmission for a corresponding terminal, a plurality of QCL-TypeD RSs configured for resources corresponding to a different RG may be defined to be the same. For example, when a QCL-TypeD RS of resource #a included in RG #1 corresponding to TRP1 is configured as A and B, a QCL-TypeD RS of resource #b included in RG #2 corresponding to TRP2 may be configured as A and B. Such a method may be equally applied to a NZP CSI-RS resource and a CSI-IM resource for IM mapped to resources in each RG described in 'the relation between a resource group in a resource set and a CSI-IM/NZP CSI-RS configured in a resource setting for IM'.

Hereinafter, a CSI processing unit considering CSI for multi-TRP transmission is described.

In TS38.214, a CSI processing unit (CPU) meaning the number of CSI which may be simultaneously computed by a terminal is defined and the number of occupying CPUs is differently defined according to the reporting quantity configured in a reporting setting (e.g., a parameter, reportQuantity). The following Table 13 represents part of a description on a CPU defined in standards.

TABLE 13

UE indicates the number of $N_{CPU}$ for supported simultaneous CSI computation. When UE supports $N_{CPU}$ simultaneous CSI computation, it means possession of $N_{CPU}$ CSI processing units for processing CSI reporting across all configured cells. When L CPUs are occupied for computation of CSI reporting in a given OFDM symbol, UE has $N_{CPU}$-L unoccupied CPUs. When N CSI reporting starts to occupy each CPU in the same OFDM symbol that $N_{CPU}$-L CPUs are not occupied (here, each CSI reporting n = 0, . . . , N − 1 corresponds to $O^{(n)}_{CPU}$), UE is not required to update N-M required CSI reporting with the lowest priority. Here, M is the maximum value satisfying that $0 \leq M \leq N$ is $\Sigma_{n=0}^{M-1} O^{(n)}_{CPU} \leq N_{CPU}$-L.
UE does not expect that an aperiodic CSI trigger state including $N_{CPU}$ reporting setting or more is configured. Processing of CSI reporting occupies the number of CPUs for the number of symbols as follows:
$O_{CPU} = 0$ for CSI reporting having CSI-ReportConfig which has reportQuantity, a higher layer parameter set as 'none', and CSI-RS-ResourceSet that a higher layer parameter, trs-Info, is configured
$O_{CPU} = 1$ for CSI reporting having CSI-ReportConfig which has reportQuantity, a higher layer parameter set as 'cri-RSRP', 'ssb-Index-RSRP', 'cri-SINR', 'ssb-Index-SINR' or 'none' (and CSI-RS-ResourceSet that a higher layer parameter, trs-Info, is not configured)
For CSI reporting having reportQuantity, a higher layer parameter set as 'cri-RI-PMI-CQI', 'cri-RI-i1', 'cri-RI-i1-CQI', 'cri-RI-CQI', or 'cri-RI-LI-PMI-CQI'
If CSI reporting is aperiodically triggered without PUSCH transmission having a transport block or HARQ-ACK or both, when L = 0 CPU is occupied, here, CSI corresponds to single CSI with wideband frequency-granularity and up to 4 CSI-RS ports in a single resource without CSI reporting, and here, codebookType is set as 'typeI-SinglePanel' or reportQuantity is set as 'cri-RI-CQI', whereby $O_{CPU}$ is $N_{CPU}$.
Otherwise, $O_{CPU}$ is $K_s$ and here, $K_s$ is the number of CSI-RS resources in a CSI-RS resource set for channel measurement.

In addition to a definition of Table 13, when CSI considering multi-TRP transmission is introduced, complexity of a terminal may increase compared with the existing operation and accordingly, a new CPU definition for reflecting it may be introduced.

Table 14 illustrates a method of defining the number of CPUs necessary for CSI computation for multi-TRP transmission based on the number of CPUs defined according to a higher layer parameter reportQuantity in current standards. In other words, it may correspond to $O_{CPU}$ in the description of standards.

In the following Table 14, a variety of options are proposed by a combination of A1-1, A1-2, A2-1, A2-2, A3-1, A3-2, B1, B2, but all options are not necessarily used. Only an option according to a combination of any one of them may be used or options according to two or more combinations may be selectively used by a specific condition, etc.

For convenience of a description, 'the CSI considering multi-TRP transmission' may be referred to as MTRP CSI. And, 'CSI considering multi-TRP transmission' may be configured to a terminal through reportQuantity of CSI-ReportConfig. 'CSI considering multi-TRP transmission' may be defined as a value including (joint) cri/RI/PMI/CQI/LI/RSRP/SINR, etc. And/or 'CSI considering multi-TRP transmission' may mean/include a case in which beam/RS pair information is configured. And/or 'CSI considering multi-TRP transmission' may mean/include a case in which a plurality of resource groups are configured in a resource set. And/or 'CSI considering multi-TRP transmission' may mean/include a case in which a plurality of CSI sets are configured to be reported. CSI opposite to the MTRP CSI may be referred to as STRP CSI (i.e., single TRP CSI), which may mean CSI defined previously.

TABLE 14

|  | B1 | B2 |
|---|---|---|
| A1-1. | 1) $K_S + C(M, 2) \times (K_s')^2$ and/or<br>2) $K_S + C(M, 2) \times 2 \times (K_s')^2$ | 1) $C(M, 2) \times (K_s')^2$ and/or<br>2) $C(M, 2) \times 2 \times (K_s')^2$ |
| A1-2. | $K_S + C(M, 2) \times K_s'$ and/or<br>2) $K_S + C(M, 2) \times 2 \times K_s'$ | 1) $C(M, 2) \times K_s'$ and/or<br>2) $C(M, 2) \times 2 \times K_s'$ |
| A2-1. | 1) $K_S + C(M, 2)$ and/or<br>2) $K_S + C(M, 2) \times 2$ | 1) $K_S + C(M, 2)$ and/or<br>2) $K_S + C(M, 2) \times 2$ |
| A2-2. | 1) $K_S + C(M, 2)$ and/or<br>2) $K_S + C(M, 2) \times 2$ | 1) $K_S + C(M, 2)$ and/or<br>2) $K_S + C(M, 2) \times 2$ |
| A3-1. | 1) $K_S + 1$ and/or<br>2) $K_S + 2$ | 1) $K_S + 1$ and/or<br>2) $K_S + 2$ |
| A3-2. | 1) $K_S + 1$ and/or<br>2) $K_S + 2$ | 1) $K_S + 1$ and/or<br>2) $K_S + 2$ |

In Table 14, Ks means the number of all resources included in one resource set. C(M,2) represents the number of combinations that 2 RGs are selected for all resource groups (e.g., M resource groups). Here, 2 is just an example, and it is not limited thereto, and may be generalized to N. Ks' represents the number of resources included in one RG. In Table 14, for convenience, it is assumed that the number of resources in a RG is the same as Ks' for all RGs, but a case in which the number is differently defined may be also considered. Hereinafter, each case is described by referring to Table 14.

A1-1: When all possible CRI combinations for a different RG are computed and here, an operation is performed by independently changing a RI/a PMI, etc. in a resource of each RG (and/or when each CRI combination in each RG combination is computed and an operation is performed by independently changing a RI/a PMI, etc. in each resource)

A1-2: When a specific CRI combination for a different RG (e.g., a combination with a one-to-one corresponding relation, first-first, second-second, . . . ) is computed and here, an operation is performed by independently changing a RI/a PMI, etc. in a resource of each RG (and/or when each CRI combination in each RG combination (a CRI combination is limited based on a specific rule) is computed and an operation is performed by independently changing a RI/a PMI, etc. in each resource)

A2-1: When all possible CRI combinations for a different RG are computed, but after selecting a specific CRI combination for a different RG combination (CSI assuming a single TRP may be used for selection), an operation is performed by independently changing a RI/a PMI, etc. in a selected resource of each RG for a different RG combination (and/or when an operation is performed by independently changing a RI/a PMI, etc. in each resource for a selected CRI combination (e.g., by single TRP CSI(s)) in each RG combination)

A2-2: When a specific CRI combination for a different RG (e.g., a combination with a one-to-one corresponding relation, first-first, second-second, . . . ) is computed, but after selecting a specific CRI combination for a different RG combination (e.g., CSI assuming a single TRP may be used for selection), an operation is performed by independently changing a RI/a PMI, etc. in a selected resource of each RG for a different RG combination (and/or when an operation is performed by independently changing a RI/a PMI, etc. in each resource for a selected CRI combination in each RG combination (a CRI combination is limited based on a specific rule)(e.g., by single TRP CSI(s))

A3-1: When all possible CRI combinations for a different RG are computed, but after selecting a specific CRI combination for all RGs (CSI assuming a single TRP may be used for selection), an operation is performed by independently changing a RI/a PMI, etc. in a resource of each RG (and/or when an operation is performed by independently changing a RI/a PMI, etc. in each resource in each RG for a specific RG combination selected based on a selected CRI combination)

A3-2: When a specific CRI combination for a different RG (e.g., a combination with a one-to-one corresponding relation, first-first, second-second, . . . ) is computed, but after selecting a specific CRI combination for all RGs (e.g., CSI assuming a single TRP may be used for selection), an operation is performed by independently changing a RI/a PMI, etc. in a resource of each RG (and/or when an operation is performed by independently changing a RI/a PMI, etc. in each resource in each RG for a specific RG combination selected based on a selected CRI combination (a CRI combination is limited based on a specific rule)(e.g., by single TRP CSI(s))

B1: When a hypothesis on single TRP transmission is considered

B2: When a hypothesis on single TRP transmission is not considered

In the proposal, for convenience of a description, each case (e.g., A1-1/A1-2/A2-1/A2-2/A3-1/A3-2/B1/B2) is classified, but the number of specific CPUs may be applied without a restriction on the case.

In addition to the proposal, and/or in addition to the existing CPU definition, and/or the following proposal may be considered independently/together.

When CSI of a M-TRP is simultaneously computed, CPU occupancy is assumed as a M-CPU. The 'M-CPU' may mean a method of the above-proposed A1-1/A1-2/A2-1/A2-2/A3-1/A3-2/B1/B2.

When a sum of ranks is equal to or greater than a specific value (e.g., 4), CPU occupancy is assumed as 2. It may mean that it is defined as a double value compared with a method of the above-proposed A1-1/A1-2/A2-1/A2-

2/A3-1/A3-2/B1/B2 and/or is defined as a double value compared with the existing CPU definition. (It may be equally applied in the following proposal.)

When a size of a bandwidth (BW) or a size of a sub-band (SB) configured as a CSI report is equal to or greater than a specific number, CPU occupancy is assumed as 2. It may mean that it is defined as a double value compared with a method of the above-proposed A1-1/A1-2/A2-1/A2-2/A3-1/A3-2/B1/B2 and/or is defined as a double value compared with the existing CPU definition.

In a BM report, CPU occupancy is assumed as the number of TRPs. The 'BM report' may mean a case in which reportQuantity of CSI-ReportConfig is configured as a value including cri-RSRP/ssb-Index-RSRP/cri-SINR/ssb-Index-SINR, etc. 'The number of TRPs' may correspond to the number of resource groups in a resource set. Alternatively, each TRP may be classified according to information on a CORESET group (or a CORESET pool) (e.g., an index, an identifier (ID)) and the 'number of TRPs' may correspond to the number of CORESET groups (pools)/the number of CORESET group IDs/the number of CORESET pool indexes.

When the number of CRI candidate values is greater than the number of resources for CM in N CPU computation, a terminal may recognize it as a CSI report for a mTRP (i.e., multiple TRP) CSI feedback.

Hereinafter, a priority rule for CSI reporting is described.

TS38.214 defines a priority rule for CSI reporting to determine which CSI will be fed back when a channel/a resource for a CSI feedback is overlapped/collides. The following Table 15 illustrates part of a description on a priority rule defined in standards.

RSRP/SINR, etc. And/or the 'CSI considering multi-TRP transmission' may mean/include a case in which beam/RS pair information is configured. And/or the 'CSI considering multi-TRP transmission' may mean/include a case in which a plurality of resource groups are configured in a resource set. And/or the 'CSI considering multi-TRP transmission' may mean/include a case in which a plurality of CSI sets are configured to be reported. CSI opposite to the MTRP CSI may be referred to as STRP CSI (i.e., single TRP CSI), which may mean CSI defined previously.

A1. MTRP CSI may be defined as a higher priority than STRP CSI. The higher priority may mean that when a channel/a resource for a CSI feedback is overlapped/collides, it may be preferentially transmitted. In addition, CSI for BM (beam management) (e.g., for L1-RSRP/L1-SINR) may be defined as the highest priority regardless of MTRP CSI/STRP CSI. In other words, for example, a priority may be defined in an order of CSI for BM (for MTRP/STRP CSI)>MTRP CSI (for non-BM)>STRP CSI (for non-BM). A reason why CSI for BM is defined as the highest priority is that communication may be impossible due to signal quality degradation when BM fails between a base station and a terminal. Accordingly, BM may be smoothly performed by defining CSI for BM as the highest priority. Meanwhile, a reason why MTRP CSI should be defined as a higher priority than STRP CSI is as follows. A base station should transmit a CSI-RS corresponding to a different TRP to a terminal to compute MTRP CSI. In addition, a terminal should compute (joint) CSI by using corresponding RSs, so more complexity/batteries may be required compared with STRP CSI. Accordingly, as CSI is generated based on a lot of resources and complexity of a terminal, it may be desirable to transmit it preferentially. In addition, because it may be considered

TABLE 15

CSI reporting is associated with a priority value,
$Pri_{iCSI}(y, k, c, s) = 2 \cdot N_{Cells} \cdot M_s \cdot y + N_{cells} \cdot M_s \cdot k + M_s \cdot c + s.$
Here, y = 0 for aperiodic CSI reporting transmitted in a PUSCH, y = 1 for semi-persistent CSI reporting transmitted in a PUSCH, y = 2 for semi-persistent CSI reporting transmitted in a PUCCH and y = 3 for periodic CSI reporting transmitted in a PUCCH;
K = 0 for CSI reporting which carries L1-RSRP or L1-SINR and k = 1 for CSI reporting which does not carry L1-RSRP or L1-SINR;
c is a serving cell index and $N_{cells}$ is a value of a higher layer parameter, maxNrofServingCells;
s is reportConfigID and $M_s$ is a value of a higher layer parameter, maxNrofCSI-ReportConfigurations.
When a value of $Pri_{iCSI}(y, k, c, s)$ for first CSI reporting is lower than a value for second CSI reporting, first CSI reporting is preferred over second CSI reporting.
When time occupancy of a physical channel scheduled to carry CSI reporting is overlapped in at least one OFDM symbol and is transmitted in the same carrier, it means that 2 CSI reporting collide. When UE is configured to transmit 2 colliding CSI reporting,
The following rule is applied excepting a case in which a y value of any one is 2 and another y value is 3 if y values are different between 2 CSI reporting: CSI reporting with a higher value of $Pri_{iCSI}(y, k, c, s)$ is not transmitted by UE.
Otherwise, 2 CSI reporting are multiplexed or any one of them is dropped based on the priority values.

In addition to the definition, when CSI considering multi-TRP transmission is introduced, a lot of information may be included compared with CSI defined previously, so a new priority rule may be defined by reflecting it. The following represents a proposal for a priority rule which may be newly defined and an example which applies a proposal based on a priority rule defined in current standards.

The 'CSI considering multi-TRP transmission' may be referred to as MTRP CSI and may be configured to a terminal through reportQuantity of CSI-ReportConfig. In addition, the 'CSI considering multi-TRP transmission' may be defined as a value including (joint) cri/RI/PMI/CQI/LI/ that channel information corresponding to a different TRP is already included in joint CSI itself, an effect of reporting STRP CSI corresponding to each TRP may be obtained by reporting MTRP CSI to a base station.

The following Table 16 represents an example in which the proposal is applied to current standards. Specifically, $Pri_{iCSI}(y,k,c,s)$ may be represented as follows and for k=1 (e.g., MTRP CSI (for non-BM)) and for k=2 (e.g., STRP CSI (for non-BM)), i.e., based on a priority of MTRP CSI/STRP CSI, a value of k may be configured. For example, a priority of each CSI may be in inverse proportion to a value of k. In other words, as a priority is higher, a value of k related to (for) CSI may be smaller.

TABLE 16

CSI reporting is associated with a priority value,
$Pri_{iCSI}(y, k, c, s) = 3 \cdot N_{cells} \cdot M_s \cdot y + N_{cells} \cdot M_s \cdot k + M_s \cdot c + s$.
Here, y = 0 for aperiodic CSI reporting transmitted in a PUSCH, y = 1 for semi-persistent CSI reporting transmitted in a PUSCH, y = 2 for semi-persistent CSI reporting transmitted in a PUCCH and y = 3 for periodic CSI reporting transmitted in a PUCCH;
k = 0 for CSI reporting which carries L1-RSRP or L1-SINR, k = 1 for CSI reporting which does not carry L1-RSRP or L1-SINR, k = 2 for STRP CSI reporting which does not carry L1-RSRP or L1-SINR;
c is a serving cell index and $N_{cells}$ is a value of a higher layer parameter, maxNrofServingCells;
s is reportConfigID and $M_s$ is a value of a higher layer parameter, maxNrofCSI-ReportConfigurations.

A2. For MTRP CSI and STRP CSI, CSI for BM may be defined, respectively. And, CSI for BM may be defined as a higher priority compared with CSI for non-BM and MTRP CSI may be defined as a higher priority compared with STRP CSI. In this case, a priority may be defined in an order of MTRP CSI for BM>STRP CSI for BM>MTRP CSI for non-BM>STRP CSI for non-BM. A reason and an effect are the same as described in the A1. As CSI for BM is classified into MTRP CSI and STRP CSI, it may have an advantage to give a higher priority to MTRP CSI. The following Table 17 represents an example in which the proposal is applied to current standards. Specifically, $Pri_{iCSI}(y,k,c,s)$ may be represented as follows, and for k=0 (e.g., MTRP CSI for BM), for k=1 (e.g., STRP CSI for BM), for k=2 (e.g., MTRP CSI for non-BM), for k=3 (e.g., STRP CSI for non-BM), it may be described as follows. In other words, a value of k may be configured based on a priority determined based on whether of MTRP/STRP and contents of CSI (e.g., whether of CSI for BM or other CSI). For example, a priority of each CSI may be in inverse proportion to a value of k. In other words, as a priority is higher, a value of k related to (for) CSI may be smaller.

Table 17 represents an example in which a proposal of the present disclosure is applied based on a priority rule defined in current standards.

than MTRP CSI in terms of a single TRP, there may be an environment where STRP CSI is preferred. Accordingly, for such a case, STRP CSI may be defined to have a higher priority than MTRP CSI. In this case, for example, an example on a priority of the above-described A1 may be defined in an order of CSI for BM (for MTRP/STRP CSI)>STRP CSI (for non-BM)>MTRP CSI (for non-BM). For example, an example on a priority of the above-described A2 may be defined in an order of STRP CSI for BM>MTRP CSI for BM>STRP CSI for non-BM>MTRP CSI for non-BM.

For example, the above-described priority rule may be pre-defined between a base station (or a TRP) and a terminal, or a base station (or a TRP) may indicate a configuration related to the above-described priority rule to a terminal.

A CSI set is defined by describing the proposal, and for convenience of a description, a CSI set is explicitly classified, but each CSI set may not be explicitly classified when reporting CSI. An operation, etc. that reporting values which may configure a different CSI set (or reporting values which have a mutual mapping relation and are defined as a pair (e.g., RI1-PMI1- . . . , RI2-PMI2- . . . , etc.)) are reported together by corresponding to one reporting setting may be defined.

TABLE 17

CSI reporting is associated with a priority value,
$Pri_{iCSI}(y, k, c, s) = 4 \cdot N_{cells} \cdot M_s \cdot y + N_{cells} \cdot M_s \cdot k + M_s \cdot c + s$.
Here, y = 0 for aperiodic CSI reporting transmitted in a PUSCH, y = 1 for semi-persistent CSI reporting transmitted in a PUSCH, y = 2 for semi-persistent CSI reporting transmitted in a PUCCH and y = 3 for periodic CSI reporting transmitted in a PUCCH;
k = 0 for MTRP CSI reporting which carries L1-RSRP or L1-SINR, k = 1 for STRP CSI reporting which carries L1-RSRP or L1-SINR, k = 2 for MTRP CSI reporting which does not carry L1-RSRP or L1-SINR, k = 3 for STRP CSI reporting which does not carry L1-RSRP or L1-SINR;
c is a serving cell index and $N_{cells}$ is a value of a higher layer parameter, maxNrofServingCells.
s is reportConfigID and $M_s$ is a value of a higher layer parameter, maxNrofCSI-ReportConfigurations.

Meanwhile, an example of the Table 16 or Table 17 corresponds to one example for applying a proposal and it is not limited to the only example for applying a proposal. Accordingly, other examples which may be applied to standards based on a proposal may be possible.

For example, a priority may be determined based on whether of MTRP CSI or STRP CSI/contents of CSI (e.g., cri/RI/PMI/CQI/LI/RSRP/SINR)/the number of MTRPs associated with CSI, etc.

Meanwhile, it is assumed that for the proposed priority rule, MTRP CSI has a higher priority than STRP CSI, but STRP CSI may be also defined to have a higher priority than MTRP CSI. As STRP CSI may have a more accurate value Proposal 2: A Method of Configuring a Resource Set Corresponding to a Different TRP to a Terminal in a Single Resource Setting Proposal 1-1: A base station may configure a resource set corresponding to a different TRP to a terminal in a single resource setting. Here, the resource setting may be a resource setting for channel measurement in a reporting setting.

A base station may perform an indication/a configuration that such a resource setting is a resource setting which will be used for CSI computation for multi-TRP transmission through L1/L2 signaling to a terminal or may be defined by a fixed rule. In addition, a base station may indicate/ configure how many CSI sets (e.g., N, N is a natural number) should be reported through a corresponding resource setting to a terminal through L1/L2 signaling, or may be defined by a fixed rule. In addition, the number of TRPs to which resource sets correspond (e.g., M>=N, M is a natural number) may be defined based on the number of resource sets configured in a corresponding resource setting. When an indication/a configuration is performed as above, N resource sets of M resource groups may be selected by a terminal for computation/acquisition/reporting of N CSI sets. And, N resource sets and N CSI sets may have a one-to-one corresponding relation and to this end, each CSI set may correspond to a resource set to which a resource utilized for CM belongs.

A terminal may report information on selected resource sets (i.e., CSI) to a base station. Here, for N selected resource sets, resources in a specific resource set (e.g., a i-th resource set) may be utilized for CM when computing/acquiring/reporting a specific CSI set (e.g., a j-th CSI set) corresponding to the specific resource set (e.g., a i-th resource set). And, resources in (N-1) resource sets excluding a specific resource set applied to CM (e.g., a i-th resource set) may be utilized for IM of the specific CSI set (e.g., a j-th CSI set).

In the above-described proposal, when a resource set corresponding to a different TRP in a resource setting is configured to a terminal, it may mean that resources included in a different resource set in the same resource setting have a relation of CM/IM each other when performing CSI computation.

In the following contents, when it is described based on a plurality of resource sets in a resource setting for convenience of a description, it may be interpreted as a plurality of resource sets in one trigger state when a time behavior of a resource setting is aperiodically configured.

Hereinafter, CSI computation for multi-TRP transmission is described.

In proposal 2, 'CSI computation for multi-TRP transmission' may have the same meaning as contents of the above-described proposal 1.

Examples of a method for a base station to indicate/configure a resource setting which will be utilized for CSI computation for multi-TRP transmission to a terminal are as follows. The following method may correspond to an example of L1/L2 signaling for performing a proposed operation. But, it is clear that a proposal according to the present disclosure is not limited to the following method.

A1: For each resource setting or a resource setting configured in a specific reporting setting, the operation may be configured through a specific parameter. For example, a parameter in a form such as a flag which represents whether the operation is performed may be defined in a resource setting. Alternatively, when a time behavior for a resource setting is periodically/semi-persistently configured and a plurality of resource sets are configured, a terminal may perform the proposed operation based on a plurality of resource sets configured in a corresponding resource setting. In current standards, when a time behavior for a resource setting is periodically/semi-persistently configured, it is defined to configure only one resource set. Accordingly, when a plurality of resource sets are configured although a time behavior is periodically/semi-persistently configured, it may be utilized under a condition that CSI computation/acquisition/reporting considering multi-TRP transmission is performed. And/or, when a time behavior for a resource setting is aperiodically configured and a plurality of resource sets are configured in one trigger state (e.g., CSI-AperiodicTriggerState/CSI-AssociatedReportConfigInfo), a terminal may perform the proposed operation based on a plurality of resource sets configured in a corresponding trigger state. In current standards, when a time behavior for a resource setting is aperiodically configured, a plurality of resource sets may be configured in a resource setting, but it is defined to connect only one resource set when triggering a specific reporting setting. Accordingly, when a plurality of resource sets are configured in one trigger state although a time behavior is aperiodically configured, it may be utilized under a condition that CSI computation/acquisition/reporting considering multi-TRP transmission is performed.

A2: The operation may be configured through a specific parameter in a reporting setting. A parameter configuring a CSI entry (e.g., reportQuantity) may correspond to an example of the parameter. Here, when a CSI entry for multi-TRP transmission is included in the parameter (e.g., an index for a resource set combination/a hypothesis indicator, etc.), the proposed operation (i.e., CSI computation for multi-TRP transmission) may be performed. When it is configured to perform the proposed operation, a value of M may be indicated/configured to a terminal based on L1/L2 signaling or may be defined by a fixed rule. For example, a value of M may be configured together in a corresponding reporting setting or a value of M may be configured in a resource setting connected to a corresponding reporting settings. Alternatively, it may be determined based on the number of resource sets configured in the resource setting (periodically/semi-persistently) and/or the number of resource sets configured in a trigger state (aperiodically).

Hereinafter, a definition of a CSI set is described.

A CSI set may be defined as a value (or a set/information) including one or more CSI entries of CRI/RI/PMI/LI/CQI/L1-SINR/L1-RSRP.

Figure 19:
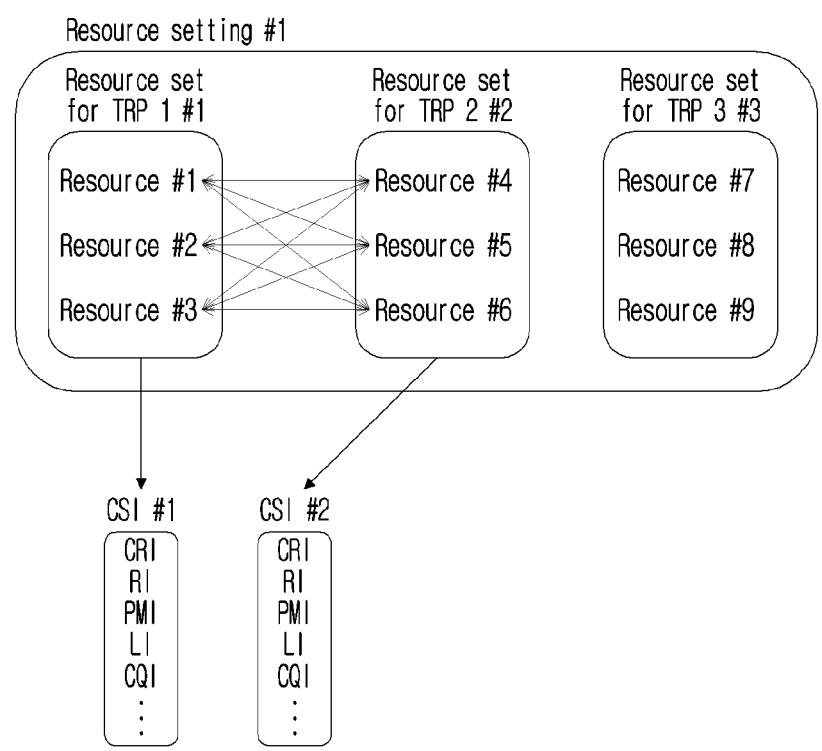
FIG. 19 illustrates a resource set and a CSI set according to an embodiment of the present disclosure.

FIG. 19 illustrates a resource set and a CSI set according to an embodiment of the present disclosure.

FIG. 19 represents an example of a relation on N (e.g., 2) CSI sets and M (e.g., 3) resource sets configured in a resource setting.

FIG. 19 represents an example in which N and M are configured as 2 and 3, respectively. In addition, it represents an example in which a resource set for CM in CSI #1, a first CSI set, is included in set #1 and a resource set for CM in CSI #2, a second CSI set, is included in set #2. A terminal may use two resources included in a different resource set combination to compute CSI of two CSI sets.

For example, a terminal may assume multi-TRP transmission based on TRP #1/#2. In addition, a terminal may assume one resource of resources in resource set (RSS) 1 as a resource for CM for CSI computation of a first CSI set. In addition, a terminal may assume one resource of resources in RSS #2 as a resource for CM for CSI computation of a second CSI set. Here, a resource for CM in each CSI set may be utilized as a resource for IM in other CSI set.

For the operation, CSI computation may be performed for a total of 27 resource combinations including M (e.g., 3), N (e.g., 2) TRP combinations (3 TRP combinations in an example of FIG. 19) and $K_1$ (e.g., 3)×$K_2$ (e.g., 3) resource combinations (9 resource combinations in an example of FIG. 19) to find a TRP combination and a resource combination which are more suitable in multi-TRP transmission. Here, K1 and $K_2$ may mean the total number of resources of a RSS that a resource for CM in a first CSI set is included and the total number of resources of a RSS that a resource for CM in a second CSI set is included, respectively.

Meanwhile, when a terminal should consider all TRP combinations and all resource combinations as in the example, a disadvantage that complexity of a terminal for CSI computation gets too high may be generated. To supplement such a disadvantage, a base station may perform an indication/a configuration to a terminal through L1/L2 signaling and/or a specific rule may be fixedly applied between a base station and a terminal so that a terminal can consider only specific TRP(s) and/or specific TRP combination(s) and/or specific resource combination(s) in CSI computation.

Figure 20:
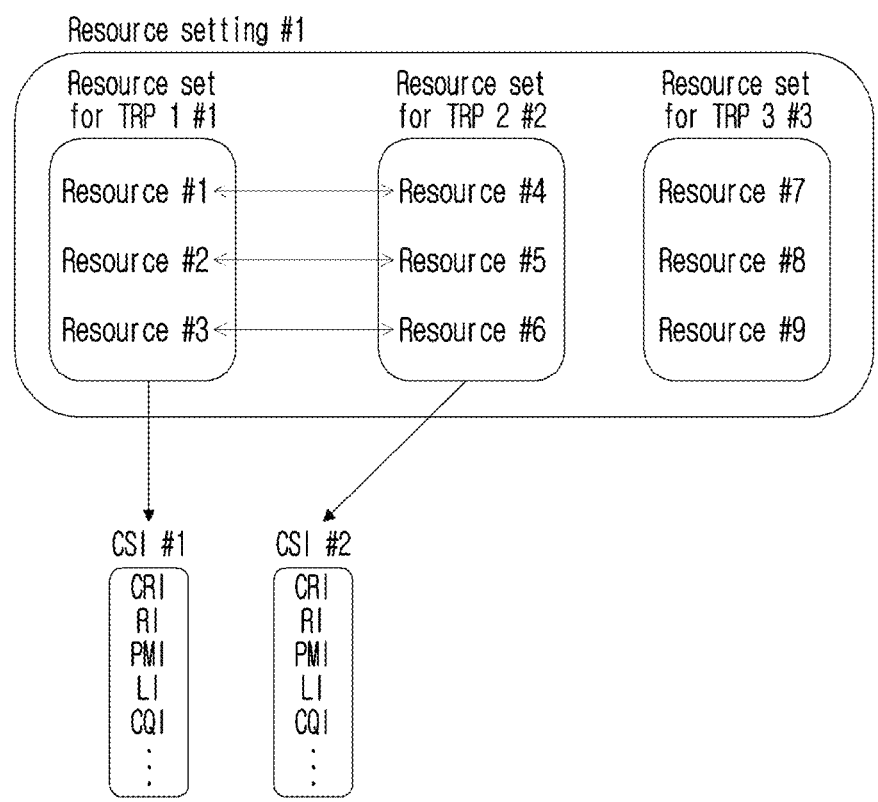
FIG. 20 illustrates a CSI set and a resource group in a resource set according to an embodiment of the present disclosure.

The following FIG. 20 represents an example in which a specific rule is applied between a base station and a terminal so that only a specific resource combination will be considered in CSI computation.

FIG. 20 illustrates a CSI set and a resource group in a resource set according to an embodiment of the present disclosure.

FIG. 20 illustrates a case in which resources in a different RSS may correspond only one to one in ascending order (or descending order). In FIG. 20, a terminal may assume multi-TRP transmission based on TRP #1/#2. In addition, a terminal may assume one resource of resources in RSS #1 as a resource for CM for CSI computation of a first CSI set. In addition, a terminal may assume a resource in the same order (or index) as a resource in RSS 1 of resources in RSS #2 as a resource for CM for CSI computation of a second CSI set. Here, a resource for CM in each CSI set may be utilized as a resource for IM in other CSI set.

For an operation such as the example, CSI computation may be performed only for a total of 9 resource combinations including 3 TRP combinations and 3 resource combinations, so the computation amount of a terminal may be significantly reduced.

Hereinafter, another definition of a CSI set is described.

The example of FIGS. 19 and 20 illustrates a case in which the same CSI entry (e.g., CRI/RI/PMI/LI/CQI, etc.) is included in each CSI set. On the other hand, a CSI entry included in each CSI set may be differently defined. And/or, a common CSI entry may be separately defined for a different CSI set.

Figure 21:
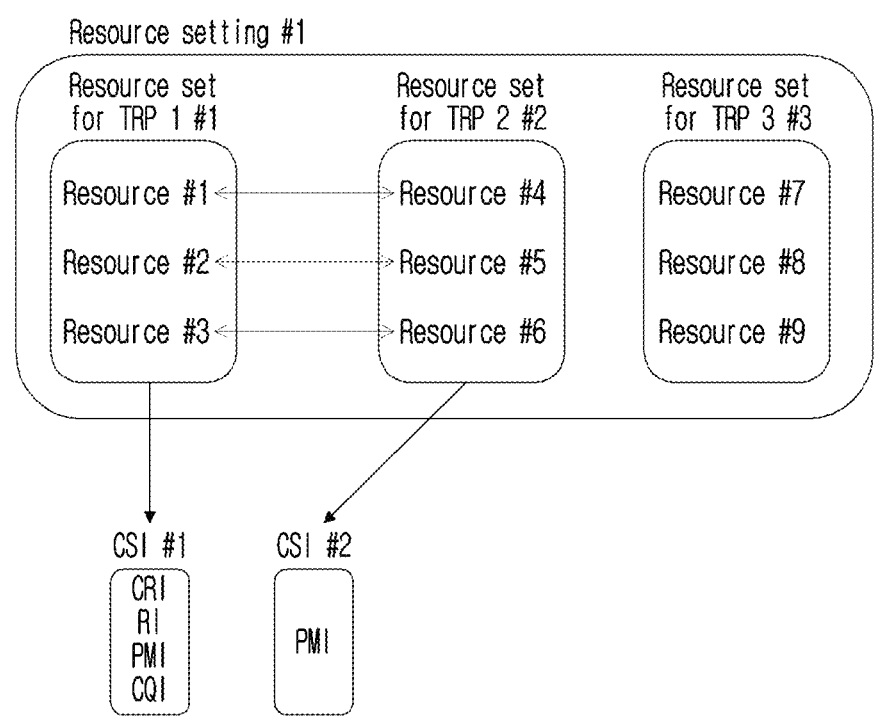
FIGS. 21 and 22 illustrate a CSI set and a resource group in a resource set according to an embodiment of the present disclosure.
Figure 22:
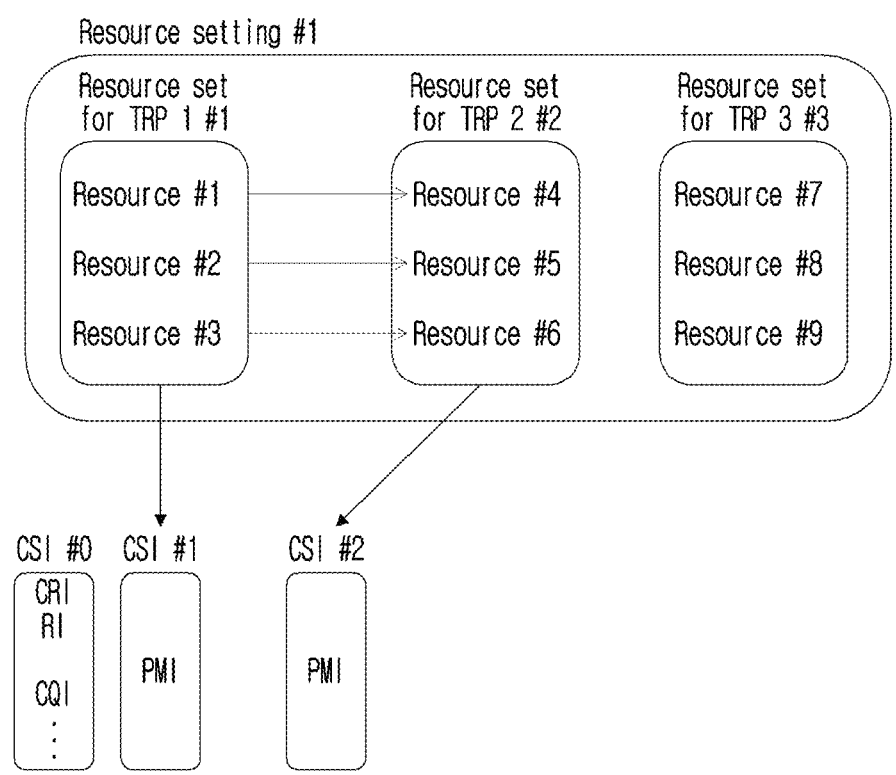

FIGS. 21 and 22 illustrate a CSI set and a resource group in a resource set according to an embodiment of the present disclosure.

FIG. 21 represents an example in which a CSI entry included in each CSI set is differently defined and FIG. 22 represents an example in which a common CSI entry is defined for a different CSI set. In an example of FIG. 21, CRI/RI/CQI included in CSI #1 may be interpreted as a value which is commonly applied to CSI #1/CSI #2. Alternatively, a CSI set which is commonly applied in an example of FIG. 22 may be separately defined. For a CSI entry which may be included in a CSI set, the following contents may be applied together. The following method illustrates L1/L2 signaling for performing a proposal that a CSI entry included in each CSI set is differently defined and/or a common CSI entry is defined, but it is not limited to the following method.

CRI: For a different CSI set, a different CRI may be reported respectively. In this case, the different CRI may mean a CRI included in a different RSS.

Alternatively, only one CRI may be reported for a different CSI set. In addition, a resource combination included in a different RSS may be reported based on a corresponding CRI value. In this case, a corresponding CRI value may mean an order (or an index) of resources in each RSS. In addition, a bit for CRI reporting may be defined based on the number of resources included in a specific RSS. In this case, only one CRI instead of two CRIs may be reported, so there is an advantage of saving the number of bits for CRI reporting.

As an example of the method, when a value indicated by the CRI is j, each j-th resource in a RSS selected for a CSI set configuration may be selected. A detailed description of information on a RSS combination selected for a CSI set configuration is described later.

RI: For a different CSI set, a different RI may be reported.
Alternatively, only one RI may be reported for a different CSI set, and in this case, both two CSI sets may assume one RI reported above. As such, when only one RI is reported, a degree of freedom for RI selection gets lower, but a feedback overhead for RI reporting may be reduced.

Alternatively, for a different CSI set, a RI in other CSI set may be defined as a differential value compared with a RI of the specific CSI set based on a RI of a specific CSI set. For example, when a RI value for a first CSI set is 2 and a RI value for a second CSI set is 4, a terminal may report 2 as a RI value for a first CSI set and report 2 as a RI value for a second CSI set (i.e., a differential value compared with an RI of a first CSI set). In this case, a feedback overhead for RI reporting may be reduced.

In the above-described methods, only a specific RI combination may be limited and defined in CSI reporting. For example, a terminal may report only a RI combination for each CSI set such as 1:1, 1:2, 2:1, 2:2, 2:3, 3:2, 3:3, 3:4, 4:3, 4:4.

Alternatively, a different RI may be reported through a value meaning (indicating) a combination of a different RI value. For example, regarding a RI combination such as 1:1, 1:2, 2:1, 2:2, 2:3, 3:2, 3:3, 3:4, 4:3, 4:4, 10 states are assumed. In this case, a terminal may report a different RI value for each CSI set by reporting a state value corresponding to a specific RI combination.

Transmission of 2 Codewords (CW): When a sum of RI values for a different CSI set is equal to or greater than a specific value (e.g., 5), a terminal may report 2 CQIs for 2 CWs. Here, CQI reporting for a different CW is described in detail in the following CQI part.

PMI: For a different CSI set, a different independent PMI value may be reported based on a PM (precoding matrix) defined in standards.

Alternatively, based on a PMI of a specific CSI set for a different CSI set, a PMI in other CSI set may be defined as a differential value compared with a PMI of the specific CSI set. For example, PMI index value(s) for a first CSI set may be reported as they are and PMI index value(s) for a second CSI set may be reported as a differential value compared with PMI index value(s) of a first CSI set. In this case, a feedback overhead for PMI reporting may be reduced. The example may assume that an independent PM is applied to each resource corresponding to a different CSI set.

CQI: For a different CSI set, a different independent CQI value may be reported. Here, a SINR assumption for each CQI may be different. For example, CSI #1 may be defined as $SINR_1 = S_1/(I_{2,intf} + I_{1,MU1} + I_{1,MU2} + I_{intf} + N)$ and CSI #2 may be defined as $SINR_2 = S_2/(I_{1,intf} + I_{2,MU1} + I_{2,MU2} + I_{intf} + N)$. Here, $S_1$ and $S_2$ may mean signal power by a TRP 1 channel and signal power by a TRP 2 channel, respectively. $I_{1,intf}$ and $I_{2,intf}$ may mean interference signal power by a TRP 1 channel and interference signal power by a TRP 2 channel, respectively. $I_{1,MU1}$ and $I_{2,MU2}$ may mean interference signal power of TRP 1 by a MU channel of TRP 1 and interference signal power of TRP 1 by a MU channel of TRP 2, respectively. $I_{1,MU1}$ and $I_{2,MU1}$ may mean interference signal power of TRP 2 by a MU channel of TRP 1 and interference signal power of TRP 2 by a MU channel of TRP 2, respectively. $I_{intf}$ may mean overlapped interference signal power from an inter-cell (/TRP). N may mean a size of a noise.

Meanwhile, when a base station simultaneously transmits a signal from a different TPR (e.g., for NCJT), a reception SINR of a terminal may be defined as $SINR_{NCJT}=(S_1+S_2)/(I_{1,intf}+I_{2,intf}+I_{1,MU1}+I_{1,MU2}+I_{2,MU1}+I_{2,MU2}+I_{intf}+N)$. As in an example described in the Equations, when a different independent CQI value considers only signal power of a specific TRP, it may have a value different from a CQI in actual multi-TRP transmission (e.g., for NCJT). Accordingly, a base station may indicate/configure a terminal to report a (single) CQI considering multi-TRP transmission (e.g., for NCJT) through L1/L2 signaling or may be defined by a fixed rule. In this case, a terminal may report only one CQI for a different CSI set. When only one CQI is reported as above, it may mean a CQI for 1CW transmission.

A relation of a transmission layer of a PDSCH/antenna port(s) for a PDSCH (a DMRS)/antenna port(s) for a CSI-RS/a precoder in CQI computation (calculation) is described:

In current standards, UE assumes that a PDSCH signal in an antenna port set [1000, . . . , 1000+v−1] for v layers is equivalent to a signal corresponding to corresponding symbols transmitted from an antenna port [3000, . . . , 3000+P−1] as in the following Equation 11.

$$\begin{bmatrix} y^{(3000)}(i) \\ \vdots \\ y^{(3000+P-1)}(i) \end{bmatrix} = W(i) = \begin{bmatrix} x^{(0)}(i) \\ \vdots \\ x^{(v-1)}(i) \end{bmatrix} \quad \text{[Equation 11]}$$

$x(i)=[x^{(0)}(i) \ldots x^{(v-1)}(i)]^T$ is a vector of PDSCH symbols generated from layer mapping. $P \in \{1, 2, 4, 8, 12, 16, 24, 32\}$ is the number of CSI-RS ports.

In current standards, one resource is assumed in CSI computation and accordingly, it has one RI/PMI. Accordingly, also in a relation of a transmission layer of a PDSCH/antenna port(s) for a PDSCH (a DMRS)/antenna port(s) for a CSI-RS/a precoder in CQI computation defined in the standards, only one RI and PM are considered. However, in CSI computation considering multi-TRP transmission, it may have each RI/PMI value for a different CSI-RS resource corresponding to a different CSI set. Accordingly, in this case, a relation between a CSI-RS port/a RI/a precoder corresponding to a different resource corresponding to a different CSI set and an antenna port for a transmission layer of a PDSCH/a PDSCH (a DMRS) should be defined.

A Method of reporting 1 CQI for transmission of 1 CW

For example, when a sum of RIs corresponding to a different CSI set is equal to or less than 4, 1 CQI for transmission of 1 CW may be reported. In this case, a CQI may be determined based on the following method.

1) For a CSI-RS port and a precoder, an order for CQI computation (or an index, or an order, or mapping) may be defined based on an order of a CSI set (or an index, or an order (e.g., ascending order or descending order)). The following Equation 12 represents an example of the method.

$$\begin{bmatrix} y^{(3000)}_{CSI1}(i) \\ \vdots \\ y^{(3000+P_{CSI1}-1)}_{CSI1}(i) \\ y^{(3000)}_{CSI2}(i) \\ \vdots \\ y^{(3000+P_{CSI2}-1)}_{CSI2}(i) \end{bmatrix} = \begin{bmatrix} W_{CSI1}(i) & 0 \\ 0 & W_{CSI2}(i) \end{bmatrix} \begin{bmatrix} x^{(0)}(i) \\ \vdots \\ x^{(v-1)}(i) \end{bmatrix} \quad \text{[Equation 12]}$$

In Equation 12, $y^{(p)}_{CSI1}(i)$ and $y^{(p)}_{CSI2}(i)$ may mean a symbol transmitted through a p-th CSI-RS port of a resource corresponding to a first CSI set and a symbol transmitted through a p-th CSI-RS port of a resource corresponding to a second CSI set, respectively. $P_{CSI1}$ and $P_{CSI2}$ may mean the number of CSI-RS ports of a resource corresponding to a first CSI set and the number of CSI-RS ports of a resource corresponding to a second CSI set, respectively. $W_{CSI1}(i)$ and $W_{CSI2}(i)$ may mean a PM corresponding to a first CSI set (e.g., a PM selected by a terminal/selected by a rule) and a PM corresponding to a second CSI set (e.g., a PM selected by a terminal/selected by a rule), respectively. 0 may mean a matrix that all elements are configured with 0.

For CSI-RS ports defined in Equation 12, it may be assumed that a signal corresponding to a symbol transmitted from a corresponding antenna port in an order of a vector is the same as a signal transmitted from a [1000, . . . , 1000+v−1] port that a PDSCH is transmitted. Here, symbols mapped to each layer may follow a definition of standards. It may mean a mapping relation between each layer and a DMRS port. In addition, the contents may be equally applied in the following proposal. For example, in CQI computation, UE assumes that a PDSCH signal in an antenna port set [1000, . . . , 1000+v−1] for v layers is equivalent to a signal corresponding to corresponding symbols transmitted in an antenna port [$3000_{CSI1}$, . . . , $3000_{CSI1}+P_{CSI1}-1$, $3000_{CSI2}$, . . . , $3000_{CSI2}+P_{CSI2}-1$]. Here, $x(i)=[x^{(0)}(i) \ldots x^{(v-1)}(i)]^T$ is a vector of PDSCH symbols generated from layer mapping.

2) For a CSI-RS port and a precoder, an order for CQI computation (or an index, or an order, or mapping) may be defined based on a RI size of a CSI set (e.g., ascending order or descending order). The following Equation 13 represents an example of the method.

$$\begin{bmatrix} y^{(3000)}_{CSIa}(i) \\ \vdots \\ y^{(3000+P_{CSIa}-1)}_{CSIa}(i) \\ y^{(3000)}_{CSIb}(i) \\ \vdots \\ y^{(3000+P_{CSIb}-1)}_{CSIb}(i) \end{bmatrix} = \begin{bmatrix} W_{CSIa}(i) & 0 \\ 0 & W_{CSIb}(i) \end{bmatrix} \begin{bmatrix} x^{(0)}(i) \\ \vdots \\ x^{(v-1)}(i) \end{bmatrix} \quad \text{[Equation 13]}$$

In Equation 13, $y^{(p)}_{CSIa}(i)$ and $y^{(p)}_{CSIb}(i)$ may mean a symbol transmitted through a p-th CSI-RS port of a resource corresponding to a CSIa set and a symbol transmitted through a p-th CSI-RS port of a resource corresponding to a CSIb set, respectively. $P_{CSIa}$ and $P_{CSIb}$ may mean the number of CSI-RS ports of a resource corresponding to a CSIa set and the number CSI-RS ports of a resource corresponding to a CSIb set, respectively. $W_{CSIa}(i)$ and $W_{CSIb}(i)$ may mean a PM corresponding to a CSIa set (e.g., a PM selected by a terminal/selected by a rule) and a PM corresponding to a CSIb set (e.g., a PM selected by a terminal/selected by a rule), respectively. 0 may mean a matrix that all elements are configured with 0.

In the Equation, for CSIa and CSIb, an order may be determined to satisfy $RI_{CSIa} \geq RI_{CSIb}$ or $RI_{CSIa} \leq RI_{CSIb}$. For example, when a first condition is assumed, CSIa and CSIb may correspond to CSI1 and CSI2, respectively, for $RI_{CSI1}$, $RI_{CSI2}$=2, 1. Meanwhile, when a RI of a different CSI set is the same, an order may be defined based on a method of the 1).

A Method of reporting 2 CQIs for transmission of 2 CWs

For example, when a sum of RIs corresponding to a different CSI set is equal to or greater than 5, 2 CQIs for transmission of 2 CWs may be reported. In this case, each CQI corresponding to a different CW may be determined based on the following method.

1) For a CSI-RS port and a precoder, an order for CQI computation (or an index, or an order, or mapping) may be defined based on an order of a CSI set (or an index, or an order (e.g., ascending order or descending order)). Here, transmission layers may be classified into different layer groups (LG) and a different PM may (sequentially) correspond to a transmission layer of a different LG. For example, a PM in CSI set 1 may (sequentially (e.g., in ascending order/descending order)) correspond to a transmission layer belonging to LG 1 and a PM in CSI set 2 may (sequentially (e.g., in ascending order/descending order)) correspond to a transmission layer belonging to LG 2. The following Equation 14 represents an example of the method.

$$\begin{bmatrix} y_{CSI1}^{(3000)}(i) \\ \vdots \\ y_{CSI1}^{(3000+P_{CSI1}-1)}(i) \\ y_{CSI2}^{(3000)}(i) \\ \vdots \\ y_{CSI2}^{(3000+P_{CSI2}-1)}(i) \end{bmatrix} = \begin{bmatrix} W_{CSI1}(i) & 0 \\ 0 & W_{CSI2}(i) \end{bmatrix} \begin{bmatrix} x^{(v_{LG1}^1)}(i) \\ \vdots \\ x^{(v_{LG1}^1 + RI_{CSI1}-1)}(i) \\ x^{(v_{LG2}^1)}(i) \\ \vdots \\ x^{(v_{LG2}^1 + RI_{CSI2}-1)}(i) \end{bmatrix}$$ [Equation 14]

In Equation 14, $y^{(p)}_{CSI1}(i)$ and $y^{(p)}_{CSI2}(i)$ may mean a symbol transmitted through a p-th CSI-RS port of a resource corresponding to a first CSI set and a symbol transmitted through a p-th CSI-RS port of a resource corresponding to a second CSI set, respectively. $P_{CSI1}$ and $P_{CSI2}$ may mean the number of CSI-RS ports of a resource corresponding to a first CSI set and the number of CSI-RS ports of a resource corresponding to a second CSI set, respectively. $W_{CSI1}(i)$ and $W_{CSI2}(i)$ may mean a PM corresponding to a first CSI set (e.g., a PM selected by a terminal/selected by a rule) and a PM corresponding to a second CSI set (e.g., a PM selected by a terminal/selected by a rule), respectively. 0 may mean a matrix that all elements are configured with 0.

In Equation 14, $v^1_{LG1}$ and $v^1_{LG2}$ may mean a first layer index of a first LG and a first layer index of a second LG, respectively.

In the method, a transmission layer corresponding to a different LG may be defined based on all RI values and an example may be as follows. For example, for a RI is 5/7/8, $v_{LG1}$={2, 3, 6, 7}, $v_{LG2}$={0, 1, 4, 5} or $v_{LG2}$={2, 3, 6, 7}, $v_{LG1}$={0, 1, 4, 5} may be defined. In another example, for a RI=6, $v_{LG1}$={2, 3, 5}, $v_{LG2}$={0, 1, 4} or $v_{LG2}$={2, 3, 5}, $v_{LG1}$={0, 1, 4} may be defined.

Based on an example of the LG, when a RI value of a different CSI set is different, LG2 may correspond to a CSI set having a larger RI value. In other words, a LG including a layer corresponding a CW having a large RI value for all RI values may correspond to a CSI set having a large RI value.

Alternatively, when a different CSI set has the same RI value, a CSI set and a LG may correspond respectively based on a specific order (e.g., ascending order/descending order).

A reason why a LG may be classified as above is as follows. As described in the following standards, based on TS38.212, when a DMRS port index is indicated to a terminal through DCI, it is defined to correspond to a transmission layer in an indicated DMRS port order.

For example) Antenna port(s)—4, 5, or 6 bits, here, the number of CDM groups without values of 1, 2, 3 refers to each CDM group {0, {0,1}, {0, 1, 2}, An antenna port $\{p_0, \ldots, p_{v-1}\}$ is determined according to an order of DMRS port(s).

Meanwhile, when a plurality of TCI states are indicated to a terminal for multi-TRP transmission, each TCI state and DMRS port may be defined in TS38.214 as below so that they can be mapped each other based on a CDM group that a DMRS port is included.

Example) When UE is not indicated as DCI including 'Time domain resource assignment', a DCI field indicating an entry in pdsch-TimeDomainAllocationList including RepNumR16 in PDSCH-TimeDomainResourceAllocation, and 2 TCI states in a codepoint of a DCI field, 'Transmission Configuration Indication' are indicated and DM-RS port(s) in 2 CDM groups in a DCI field, 'Antenna Port(s)', are indicated, a first TCI state corresponds to a CDM group of a first antenna port indicated by an antenna port indication table and a second TCI state corresponds to other CDM group.

According to the above-described contents, when a plurality of TCI states are indicated to a terminal for multi-TRP transmission, each TCI state may be mapped to a DMRS port included in a specific CDM group. And, the DMRS port is sequentially mapped to a transmission layer in an order defined in standards. Thereby, when 2 CWs are transmitted, DMRS ports corresponding to a different TCI state may correspond to layers corresponding to a specific CW. In other words, a specific CW may be mapped to a different TRP together without being mapped to a specific TRP.

The following Table 18 represents a mapping relation between each CW/layer/DMRS port/CDM group when 5 layers are transmitted according to current standards. (DMRS Type 1 is illustrated)

TABLE 18

| Codeword (CW) | Layer | DMRS port | CDM Group |
|---|---|---|---|
| 0 | 0 | 0 | 0 |
|  | 1 | 1 | 0 |
| 1 | 2 | 2 | 1 |
|  | 3 | 3 | 1 |
|  | 4 | 4 | 0 |

As shown in Table 18, for CW1, it may be shown that a DMRS port corresponding to a different CDM group, i.e., corresponding to a different TRP, is mapped. The mapping relation should be able to be reflected when a terminal computes a CQI of a different CW. For example, according to a mapping relation of a layer-DMRS port-CDM group in the table, layer 0, 1, 4 may correspond to TRP 1 and layer 2,3 may correspond to TRP 2. Accordingly, in CQI computation of CW1, a third layer of TRP 1 and a first and second layer of TRP 2 may be a layer of a transmission signal and may be computed as signal power in CQI computation. On the other hand, a first and second layer of TRP 1 corresponding to CW0 may be an interference layer for CW1 and may be computed as interference power in CQI computation for CW1.

As described in an example of Table 18, a layer corresponding to each CW may classify a layer group (LG) based on a mapping relation of a layer-DMRS port-CDM group, i.e., based on a CDM group to which a layer will correspond.

FIG. 23 illustrates information on a CDM group and a DMRS port corresponding to each layer based on all RIs according to an embodiment of the present disclosure.

2) For a CSI-RS port and a precoder, an order for CQI computation (or an index, or an order, or mapping) may be defined based on a RI size of a CSI set (e.g., ascending order or descending order). Here, transmission layers may be classified into different layer groups (LG) and a different PM may (sequentially) correspond to a transmission layer of a different LG. For example, a PM in CSI set 1 may (sequentially (e.g., in ascending order/descending order)) correspond to a transmission layer belonging to LG 1 and a PM in CSI set 2 may (sequentially (e.g., in ascending order/descending order)) correspond to a transmission layer belonging to LG 2. The following Equation 15 represents an example of the method.

$$\begin{bmatrix} y_{CSIa}^{(3000)}(i) \\ \vdots \\ y_{CSIa}^{(3000+P_{CSIa}-1)}(i) \\ y_{CSIb}^{(3000)}(i) \\ \vdots \\ y_{CSIb}^{(3000+P_{CSIb}-1)}(i) \end{bmatrix} = \begin{bmatrix} W_{CSIa}(i) & 0 \\ 0 & W_{CSIb}(i) \end{bmatrix} \begin{bmatrix} x^{(v_{LG1}^1)}(i) \\ \vdots \\ x^{(v_{LG1}^1+RI_{CSI1}-1)}(i) \\ x^{(v_{LG2}^1)}(i) \\ \vdots \\ x^{(v_{LG2}^1+RI_{CSI2}-1)}(i) \end{bmatrix}$$

[Equation 15]

In Equation 15, $y^{(p)}_{CSIa}(i)$ and $y^{(p)}_{CSIb}(i)$ may mean a symbol transmitted through a p-th CSI-RS port of a resource corresponding to a CSIa set and a symbol transmitted through a p-th CSI-RS port of a resource corresponding to a CSIb set, respectively. $P_{CSIa}$ and $P_{CSIb}$ may mean the number of CSI-RS ports of a resource corresponding to a CSIa set and the number CSI-RS ports of a resource corresponding to a CSIb set, respectively. $W_{CSIa}(i)$ and $W_{CSIb}(i)$ may mean a PM corresponding to a CSIa set (e.g., a PM selected by a terminal/selected by a rule) and a PM corresponding to a CSIb set (e.g., a PM selected by a terminal/selected by a rule), respectively. 0 may mean a matrix that all elements are configured with 0.

In the Equation, for CSIa and CSIb, an order may be determined to satisfy $RI_{CSIa} \geq RI_{CSIb}$ or $RI_{CSIa} \leq RI_{CSIb}$. For example, when a first condition is assumed, for $RI_{CSI1}$, $RI_{CSI2=3, 2}$, CSIa and CSIb may correspond to CSI1 and CSI2, respectively. Meanwhile, when a RI of a different CSI set is the same, an order may be defined based on a method of the 1).

In Equation 15, $v^1_{LG1}$ and $v^1_{LG2}$ may mean a first layer index of a first LG and a first layer index of a second LG, respectively.

In the method, a transmission layer corresponding to a different LG may be defined based on all RI values and an example may be as follows. For example, for a RI=5/7/8, $v_{LG1}=\{2, 3, 6, 7\}$, $v_{LG2}=\{0, 1, 4, 5\}$ or $v_{LG2}=\{2, 3, 6, 7\}$, $v_{LG1}=\{0, 1, 4, 5\}$ may be defined. In another example, for a RI=6, $v_{LG1}=\{2, 3, 5\}$, $v_{LG2}=\{0, 1, 4\}$ or $v_{LG2}=\{2, 3, 5\}$, $v_{LG1}=\{0, 1, 4\}$ may be defined.

Based on an example of the LG, when a RI value of a different CSI set is different, LG2 may correspond to a CSI set having a larger RI value. In other words, a LG including a layer corresponding a CW having a large RI value for all RI values may correspond to a CSI set having a large RI value.

Alternatively, when a different CSI set has the same RI value, a CSI set and a LG may correspond respectively based on a specific order (e.g., ascending order/descending order).

LI (layer indicator): For a different CSI set, a different independent LI value may be reported. Whether a different independent LI value is reported and/or the number of LI values reported in each CSI set may be indicated by L1/L2 signaling and/or may be determined based on a fixed rule. For example, the number of LI values which should be reported may be determined based on the maximum number of PTRS ports configured in a terminal. For example, when the maximum number of PTRS ports is configured as 2, two different LI values may be reported in each CSI set. For example, when N is 2 in the assumption (i.e., there are 2 CSI sets), a LI value of each CSI set and/or the number of bits necessary for reporting a LI value may be determined based on a RI and/or a PMI reported in each CSI set. For example, when it is assumed that a RI value corresponding to a specific CSI set is v, the number of bits necessary for reporting a LI value of the specific CSI set may be determined based on the number of ports configuring a resource corresponding to a corresponding CSI set. For example, it may be determined such as ceil($\log_2$ v)(ceil(x) is the minimum integer which is not smaller than x) or min(2,ceil($\log_2$ v)). In addition, the reported LI value may mean the strongest layer index corresponding to a specific column of a PM corresponding to a PMI of a corresponding CSI set. Meanwhile, when the maximum number of PTRS ports is configured as 1, one LI value may be reported. Alternatively, a LI value selected for a specific CSI set may be reported and a LI value fixed as a specific value for remaining N−1 CSI sets may be reported.

A1. When one LI value is reported for a different CSI set and an independent CQI is reported in a different CSI set: The number of bits necessary for reporting a corresponding LI may be determined based on the largest value of RI values included in all CSI sets (e.g., v) and the number of ports configuring a resource corresponding to a CSI set that the largest RI value is included. For example, it may be determined such as ceil($\log_2$ v)(ceil(x) is the minimum integer which is not smaller than x) or min(2,ceil($\log_2$ v)). Here, a CSI set corresponding to the reported LI value may be determined based on a RI/a CQI included in each CSI set. For example, a CSI set corresponding to the reported LI value may be determined as a CSI set having a larger CQI and/or (when a CQI is the same) may be determined as a CSI set having a larger RI value and/or (when a CQI/a RI is the same) may be determined as a specific CSI set (e.g., a first CSI set). The reported LI value may mean the strongest layer index corresponding to a specific column of a PM corresponding to a PMI of a corresponding CSI set.

A2. When one LI value is reported for a different CSI set and one CQI is reported for a different CSI set: The number of bits necessary for reporting a corresponding LI may be determined based on the largest value of RI values included in all CSI sets (e.g., v) and the number of ports configuring a resource corresponding to a CSI set that the largest RI value is included. For example, it may be determined such as ceil($\log_2$ v)(ceil(x) is the minimum integer which is not smaller than x) or min(2,ceil($\log_2$ v)). Here, a CSI set corresponding to the reported LI value may be determined based on a RI included in each CSI set. For example, the reported LI value may be determined as a CSI set having a larger RI value and/or (when a RI is the same) may be determined as a specific CSI set (e.g., a first CSI set). And/or a CSI set corresponding to the reported LI value may be determined as a CSI set having greater signal power/a larger SINR. The reported LI value may mean the strongest layer index corresponding to a specific column of a PM corresponding to a PMI of a corresponding CSI set.

Meanwhile, when one LI value is reported in the proposal, a variable for reporting whether the LI value is reported may be defined by corresponding to which CSI set of a plurality of CSI sets. For example, a specific CSI set of two CSI sets may be reported through 1-bit information. Alternatively, a rule may be defined so that a reported LI value will correspond to a specific CSI set. For example, when one LI value is reported, it may be defined as corresponding to a first (or lowest/highest) CSI set. Here, for a terminal, an order of RIs/PMIs, etc. which will be reported in each CSI set may be arranged based on the LI value. For example, a RI/a PMI, etc. corresponding to the LI value may correspond to a first CSI set and remaining CSI may correspond to remaining CSI sets to report them to a base station.

For the reported RI/PMI, a mutual pair may be defined and a reporting method/the amount of reported information, etc. of a PMI may be determined based on a pairing RI value.

Hereinafter, a method of reporting information on a combination of resource sets (RSS) selected for a CSI set configuration is described.

In the above-described proposal, M resource sets configured with one or more resources are defined in one resource setting. According to a proposal, N RSSs of M RSSs may be selected and here, a terminal should report to a base station which RSS combination is used to compute/acquire/report CSI.

Meanwhile, for omitting reporting on such a selected RSS, a base station may be indicated/configured to compute/acquire/report CSI for N CSI sets based on N RSSs or may be defined by a fixed rule. And, a terminal may not report information on a RSS to a base station.

However, although the same number of RSSs as CSI sets are configured, there may be a case in which a terminal may determine that performance of single TRP transmission considering a specific TRP is better than that of multi-TRP transmission considering N TRPs. For example, it may correspond to a case in which a CQI considering single TRP transmission is higher than a CQI considering multi-TRP transmission when the total number of ranks is the same/similar. As such, when M, the number of RSSs configured/included in a resource setting, is the same as and greater than N, the number of CSI sets which should be reported, a terminal should report to a base station which RSS group is used to report CSI sets. To this end, a terminal may report standard information on N or N or less RSS groups to a base station when reporting N CSI sets. For such reporting, the following method may be applied.

A1: A terminal may report N or less specific RSS(s) based on a bitmap configured with M-bits.

A2: A bit field which may indicate Combination(M,N)+ Combination(M,N−1)+ . . . +Combination(M,1) RSS combinations may be defined and a terminal may report N or less specific RSS(s) based on a corresponding relation between a corresponding bit field and a specific RSS combination.

When the number of RSSs reported according to the proposal is less than N, CSI configuring N−1 CSI sets (e.g., CRI/RI/PMI/LI/CQI, etc.) may be fixed as a specific value. Alternatively, information/a size of part 1/2 may be determined based on the number of RSSs reported to the base station. Information on Part 1/2 is defined in TS38.214 and includes the following contents. Part 1 is used to identify the number of information bits in Part 2 with a fixed payload size. Part 1 should be entirely transmitted before Part 2.

In addition to the proposal, for reducing a feedback overhead and complexity of CSI computation of a terminal, it may be defined to compute/acquire/report CSI only for a specific candidate among all RSS combination candidates which may be combined with M RSSs based on L1/L2 signaling and/or a fixed rule. The following Table 19 to Table 21 represent such an example.

TABLE 19

| Candidates | Reporting |
|---|---|
| RSS #1 | on |
| RSS #2 | on |
| RSS #3 | on |
| RSS #1-#2 | on |
| RSS #1-#3 | on |
| RSS #2-#3 | on |

TABLE 20

| Candidates | Reporting |
|---|---|
| RSS #1 | off |
| RSS #2 | off |
| RSS #3 | off |
| RSS #1-#2 | on |
| RSS #1-#3 | on |
| RSS #2-#3 | on |

TABLE 21

| Candidates | Reporting |
|---|---|
| RSS #1 | on |
| RSS #2 | off |
| RSS #3 | on |
| RSS #1-#2 | off |
| RSS #1-#3 | on |
| RSS #2-#3 | off |

In an example of the Table 19 to Table 21, M and N assume a case in which 3 and 2 are configured, respectively. Table 19 represents an example in which it is configured to perform CSI computation/acquisition/reporting for all possible RG combinations. On the other hand, Table 20 and Table 21 represent an example in which it is configured not to consider a specific RG combination. Table 20 represents an example in which it is configured not to perform CSI computation/acquisition/reporting for single TRP transmission. Table 21 represents an example in which it is configured not to perform CSI computation/acquisition/reporting that a TRP corresponding to RSS #2 is included. In other words, Table 21 is an example in which it is configured not to compute/acquire/report CSI that a TRP corresponding to a specific RSS is included. (In other words, it may be configured to compute/acquire/report only CSI that a TRP corresponding to a specific RSS is included.) A base station may configure the operation to a terminal through a specific parameter in each reporting setting.

When it is configured to compute/acquire/report CSI only for a specific candidate among all RSS combination candidates based on the proposal, a configuration (and/or a size) of a CSI payload may be determined based on the 'specific candidate'. For example, for an example of the Table 19, 3 bits which will indicate a specific RSS combination among a total of 6 candidates should be included in a CSI payload. However, in an example of Table 20 or Table 21, CSI may be computed/acquired/reported only for 3 candidates among a total of 6 candidates, so only 2 bits which will indicate a specific RSS combination among 3 candidates may be included in a CSI payload. And/or it may be defined to maintain a size of a CSI payload (i.e., fixed in a specific size) and fixedly report a specific value for a specific payload (e.g., zero padding).

And/or, when it is configured to compute/acquire/report CSI only for a specific candidate among all RSS combination candidates based on the proposal, the number of CPUs (CSI processing unit) used for CSI reporting may be determined based on the 'specific candidate'. For example, for an example of the Table 19, the number of CPUs for CSI computation/acquisition/reporting for a total of 6 candidates should be considered. However, in an example of Table 20 or Table 21, CSI may be computed/acquired/reported only for 3 candidates among a total of 6 candidates, so it may be defined to consider only the number of CPUs for 3 candidates.

Meanwhile, in addition to the proposal, it may be defined to necessarily compute/acquire/report CSI for a specific candidate among all RSS combination candidates which are possible with M RSSs based on L1/L2 signaling and/or a fixed rule. For example, a terminal may be defined to compute/acquire/report CSI related to single TRP transmission. In an example of the Table 19, a terminal may compute/acquire CSI based on a resource in RSS #1/#2/#3 to compute/acquire/report CSI for single TRP transmission and may report CSI computed/acquired based on a specific resource in a specific RSS which is most preferred when assuming single TRP transmission (e.g., the highest SINR/CQI/RI/throughput, etc.) to a base station. CSI for the single TRP transmission may be always reported regardless of CSI for multi-TRP transmission and in addition, CSI for multi-TRP transmission (e.g., for NCJT/URLLC, etc.) may be reported together. In other words, an example of the Table 19 may mean a case in which CSI for a single TRP and CSI for multi-TRPs are always reported to a base station together. As above, when a terminal always reports CSI for a single TRP regardless of CSI for multi-TRPs, when a base station may not perform multi-TRP transmission for any reason although multi-TRP transmission is better for a specific terminal, the base station may know CSI suitable for a single TRP for the specific terminal. Accordingly, it may have an advantage that scheduling suitable for the specific terminal may be performed.

And/or, when CSI is necessarily computed/acquired/reported for a specific candidate based on the proposal and at the same time, when whether CSI is reported for a specific candidate is variable (selective), a state which may indicate whether the reporting is performed may be defined together in a CSI payload for reporting a specific RSS combination. For example, when it is defined/configured to compute/acquire/report CSI related to single TRP transmission and it is defined/configured to report CSI related to multi-TRP transmission based on selection of a terminal, a state related to 'non-reporting' may be defined in a CSI payload for reporting a RSS combination related to multi-TRP transmission. In an example of the Table 19, there are three RG combinations related to multi-TRP transmission, {#1,#2}, {#1,#3}, {#2,#3}, and as a state for 'non-reporting' is added to it, a CSI payload may be configured with 2 bits for a total of 4 states.

And/or, a state related to reporting/partial reporting (e.g., for CSI omission)/non-reporting may be defined by adding or replacing a state for the 'non-reporting'.

A relation between a resource set in a resource setting and a CSI-IM/NZP CSI-RS configured in a resource setting for IM is described.

In reference to FIG. 14(a), as defined in TS 38.214, a NZP CSI-RS resource of a resource setting for CM connected to a reporting setting and a CSI-IM resource for IM are mapped each other in a resource-wise unit when computing CSI. For example, a first NZP CSI-RS resource may be applied together with a first CSI-IM resource when computing CSI and a second NZP CSI-RS resource may be applied together with a second CSI-IM resource when computing CSI.

By referring to FIG. 14(b) again, when a NZP CSI-RS resource for IM is configured in a reporting setting, only one of a NZP CSI-RS resource of a resource setting for CM and a CSI-IM resource for IM may be configured. And, when computing CSI, a NZP CSI-RS resource, a CSI-IM resource and NZP CSI-RS resources for IM may be applied together.

Meanwhile, when a plurality of resource sets in a resource setting are configured according to the proposals, a relation between resources in a plurality of resource sets in a resource setting and CSI-IM/NZP CSI-RS resources configured in a resource setting for IM needs to be defined for CSI computation, and to this end, it may be defined as follows.

Figure 24:
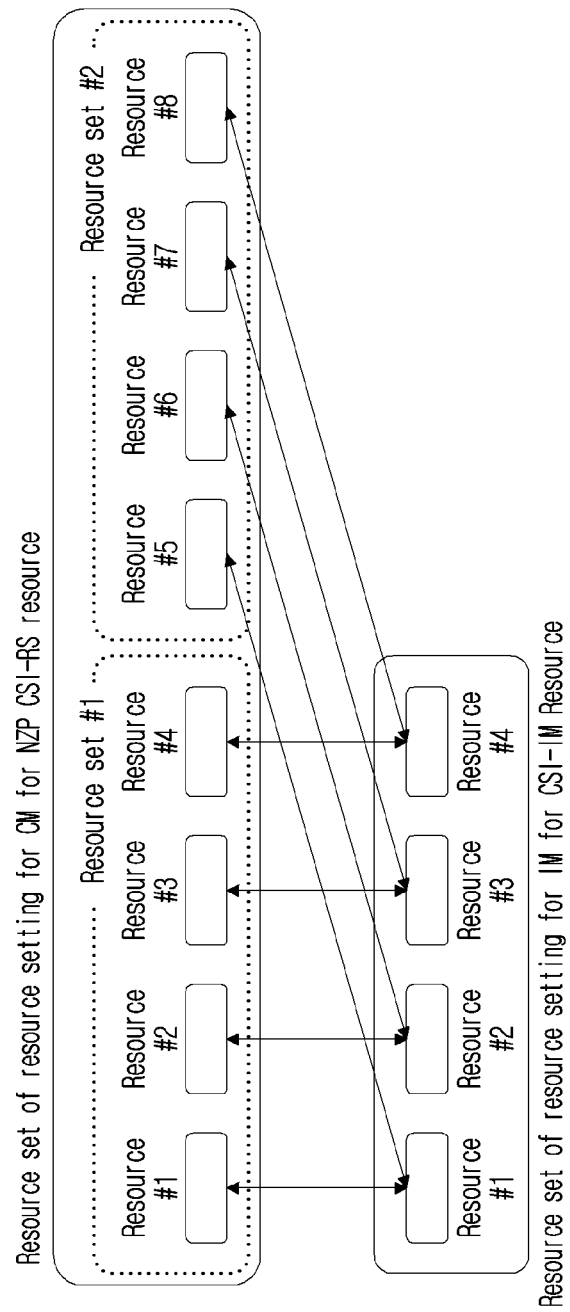
FIGS. 24 to 26 are a diagram which illustrates a mapping relation with a resource for channel measurement and a resource for interference measurement according to an embodiment of the present disclosure.
Figure 25:
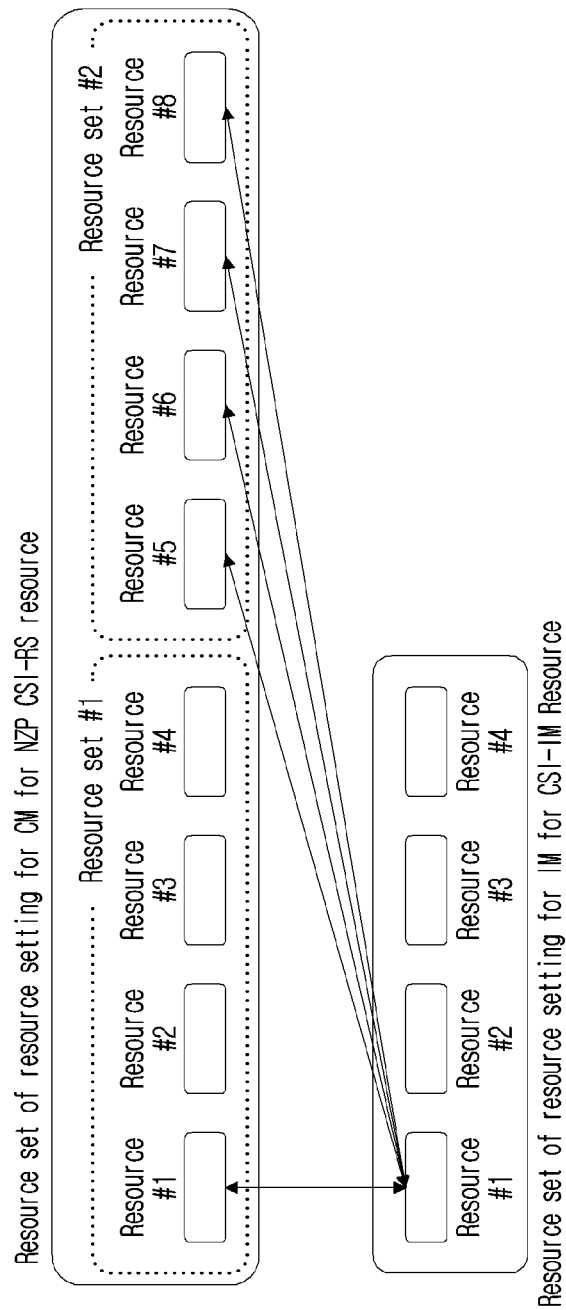
Figure 26:
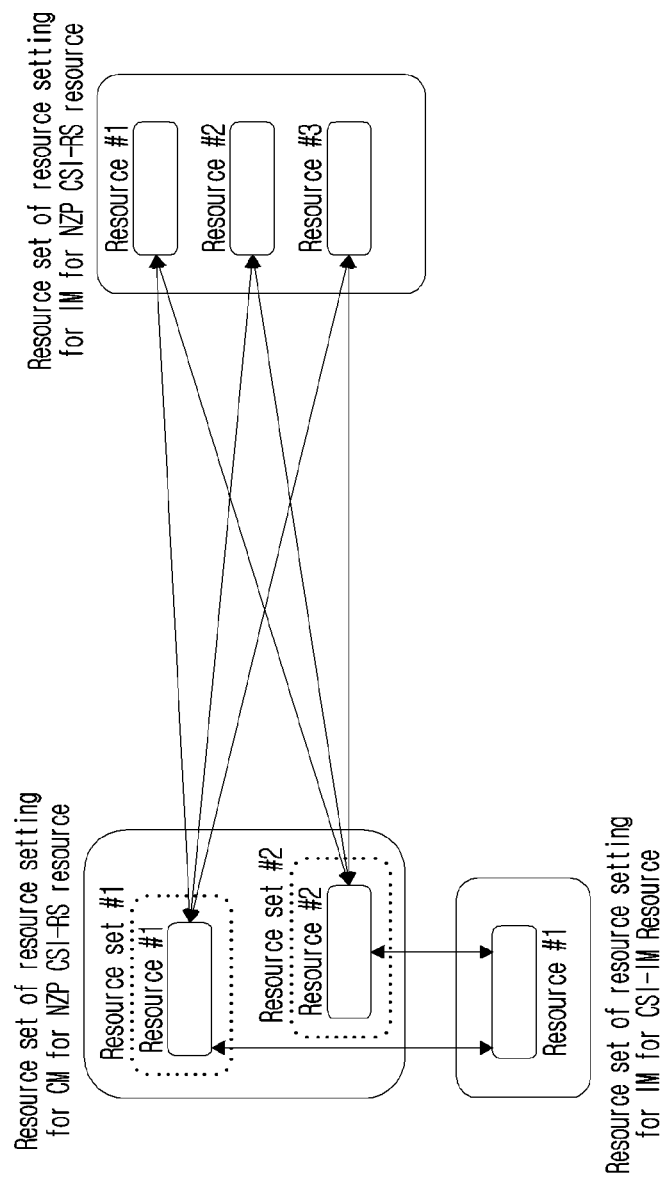

FIGS. 24 to 26 are a diagram which illustrates a mapping relation with a resource for channel measurement and a resource for interference measurement according to an embodiment of the present disclosure.

A CSI-IM resource configured in a resource setting for IM may be mapped to a resource in each resource set (RSS) each other in a resource-wise unit.

In reference to FIG. 24, for example, a first NZP CSI-RS resource in a first RSS may be applied together with a first CSI-IM resource when computing CSI and a first NZP CSI-RS resource in a second RSS may be also applied together with a first CSI-IM resource when computing CSI.

Alternatively, in reference to FIG. 25, a CSI-IM resource may be mapped to a specific resource in a specific RSS (e.g., RSS #2 in FIG. 25) each other in a resource-wise unit. A resource (e.g., resource #1 of RSS #1 in FIG. 25) mapped to the CSI-IM resource among resources included in a RSS except for the specific RSS (e.g., RSS #1 in FIG. 25) may be mapped to a resource (e.g., resource #1 of CSI-IM resources in FIG. 25) assumed for IM between RSSs when performing CSI computation for the specific resource.

When a NZP CSI-RS resource is configured in a resource setting for IM, only one resource in a resource set may be configured and when CSI computation is performed, a NZP CSI-RS resource, a CSI-IM resource and a NZP CSI-RS resource for IM in each resource set may be applied together. For example, in reference to FIG. 26, when performing CSI computation, resource #1, CSI-IM resource #1 and NZP CSI-RS resource #1 for IM in RSS #1 may be applied together.

Hereinafter, a method of configuring a different QCL-typeD reference resource is described.

The above-described proposal may assume that for resources included in a different RSS, QCL-typeD is not configured or the same QCL-typeD is configured in a resource-wise unit. As described in 'the relation between a resource set in a resource setting and a CSI-IM/NZP CSI-RS configured in a resource setting for IM', it may be equally applied to a NZP CSI-RS resource and a CSI-IM resource for IM mapped to resources in each RSS.

Meanwhile, it may be necessary to support a case in which a different QCL-TypeD RS is configured by considering a frequency band higher than FR 1. For example, when a terminal may be equipped with a plurality of panels to simultaneously receive a signal by using a plurality of reception beams, a terminal may receive PDSCH(s) that a plurality of QCL-TypeD RSs are configured. In this case, a different QCL-typeD RS needs to be configured for resources included in a different RSS to acquire/report CSI considering multi-TRP transmission. To this end, a terminal may report relative UE capability to a base station. The UE capability may be a capability which means that a terminal may simultaneously receive a signal through a plurality of spatial domain receive filters based on a different QCL-TypeD RS. A base station may configure a different QCL-TypeD RS for resources corresponding to a different RSS for CSI computation which considers multi-TRP transmission for a corresponding terminal based on the UE capability. When a different QCL-TypeD RS is configured for resources corresponding to a different RSS, a terminal may receive the resource through a plurality of spatial domain receive filters based on a different QCL-TypeD RS (i.e., through a plurality of panels). It may be equally applied to a NZP CSI-RS resource and a CSI-IM resource for IM mapped to resources in each RSS described in 'the relation between a resource set in a resource setting and a CSI-IM/NZP CSI-RS configured in a resource setting for IM'. In addition, resources corresponding to the different RSS are configured with a different QCL-TypeD RS, but may be defined to be transmitted in the same OFDM symbol. In addition, resources corresponding to the different RSS may have a one-to-one corresponding relation between different RSSs.

Figure 27:
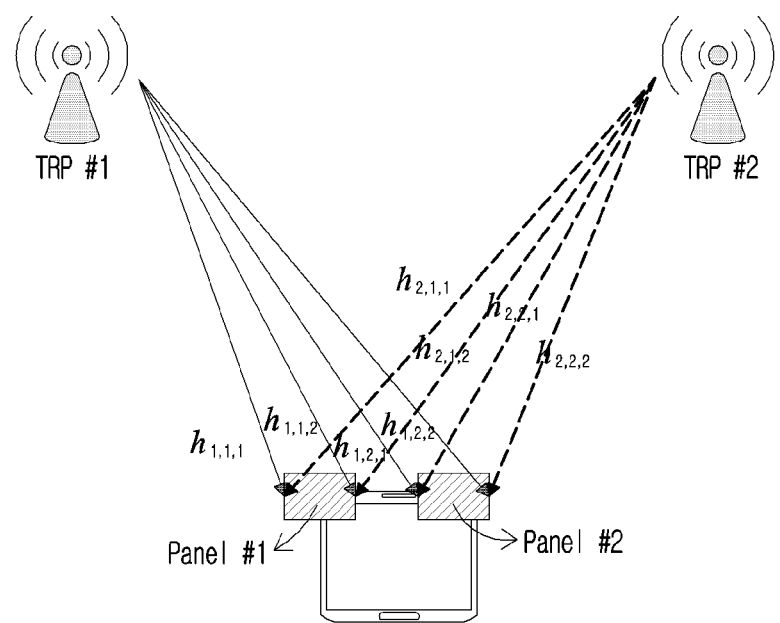
FIG. 27 illustrates an operation which receives CSI-RSs that different multiple QCL type D reference resources are configured according to an embodiment of the present disclosure.

FIG. 27 illustrates an operation which receives CSI-RSs that multiple different QCL type D reference resources are configured according to an embodiment of the present disclosure.

An operation which receives the CSI-RS through a plurality of spatial domain receive filters based on a different QCL-TypeD RS (i.e., through a plurality of panels) may be represented as in the following Equation 16.

$$y_{2\times1} = \begin{bmatrix} h_{1,1,1} + h_{1,2,1} & h_{2,1,1} + h_{2,2,1} \\ h_{1,1,2} + h_{1,2,2} & h_{2,1,2} + h_{2,2,2} \end{bmatrix} \begin{bmatrix} x_1 \\ x_2 \end{bmatrix} + n_{2\times1}$$ [Equation 16]

In Equation 16, $y_{2\times1}$ may mean a vector of a reception signal and $n_{2\times1}$ may mean a vector of a noise. $x_1$ may mean a transmission signal of a CSI-RS port in TRP1 and $x_2$ may mean a transmission signal of a CSI-RS port in TRP2. $h_{i,p,j}$ may mean a channel coefficient between a CSI-RS port of a i-th TRP and a j-th reception port of a p-th panel of a terminal. As in the above-described example, a reception beam of panel 1 and panel 2 may be different each other. There may be an interpretation that a different QCL-TypeD RS is configured for different CSI-RS resources (for CM) which are considered when performing CSI computation considering multi-TRP transmission. In other words, it is assumed that a QCL-TypeD RS of resource #a included in RSS #1 corresponding to TRP1 is configured as A and a QCL-TypeD RS of resource #b included in RSS #2 corresponding to TRP2 is configured as B. And, a situation that two resources respectively correspond to a different CSI set is assumed. In this case, a terminal may simultaneously receive a CSI-RS in a specific resource through a different reception beam. And, a terminal may estimate $h_{1,1,1}+h_{1,2,1}$ and $h_{1,1,2}+h_{1,2,2}$ with a reception signal of each reception port of a terminal through a CSI-RS transmitted by resource #a and estimate $h_{2,1,1}+h_{2,2,1}$ and $h_{2,1,2}+h_{2,2,2}$ with a reception signal of each reception port of a terminal through a CSI-RS transmitted by resource #b.

The Equation 16 assumes a case in which a terminal does not classify a reception antenna port of a different panel. Meanwhile, a terminal may also receive a signal by classifying a reception antenna port of a different panel. The following Equation 17 represents an example for a case in which a terminal receives a signal by classifying a reception antenna port of a different panel.

$$y_{4\times1} = \begin{bmatrix} h_{1,1,1} & h_{2,1,1} \\ h_{1,2,1} & h_{2,2,1} \\ h_{1,1,2} & h_{2,1,2} \\ h_{1,2,2} & h_{2,2,2} \end{bmatrix} \begin{bmatrix} x_1 \\ x_2 \end{bmatrix} + n_{4\times1}$$ [Equation 17]

As in the above-described example, it is assumed that a QCL-TypeD RS of resource #a included in RSS #1 corresponding to TRP1 is configured as A and a QCL-TypeD RS of resource #b included in RSS #2 corresponding to TRP2 is configured as B. And, a situation that two resources respectively correspond to a different CSI set is assumed. In this case, a terminal may simultaneously receive a CSI-RS in a specific resource through a different reception beam. And, a terminal may estimate $h_{1,1,1}$, $h_{1,2,1}$, $h_{1,1,2}$ and $h_{1,2,2}$ with a reception signal of each reception port of a terminal through a CSI-RS transmitted by resource #a and estimate $h_{2,1,1}$, $h_{2,2,1}$, $h_{2,1,2}$, $h_{2,2,2}$ with a reception signal of each reception port of a terminal through a CSI-RS transmitted by resource #b.

To apply the method, a plurality of different QCL-TypeD RSs may be configured for a CSI-RS resource (based on the UE capability). When a different QCL-TypeD RS is configured for a CSI-RS resource, a terminal may receive the resource through a plurality of reception filters (i.e., spatial domain receive filters) based on a different QCL-TypeD RS. Here, for CSI computation which considers multi-TRP transmission for a corresponding terminal, a plurality of QCL-TypeD RSs configured for resources corresponding to a different RSS may be defined to be the same. For example, when a QCL-TypeD RS of resource #a included in RSS #1 corresponding to TRP1 is configured as A and B, a QCL-TypeD RS of resource #b included in RSS #2 corresponding to TRP2 may be configured as A and B. It may be equally applied to a NZP CSI-RS resource and a CSI-IM resource for IM mapped to resources in each RSS described in 'the relation between a resource set in a resource setting and a CSI-IM/NZP CSI-RS configured in a resource setting for IM'.

Hereinafter, a CSI processing unit considering CSI for multi-TRP transmission is described.

In TS38.214, a CSI processing unit (CPU) meaning the number of CSI which may be simultaneously computed by a terminal is defined and the number of occupying CPUs is differently defined according to the reporting quantity configured in a reporting setting (e.g., a parameter, reportQuantity). The following Table 22 represents part of a description on a CPU defined in standards.

TABLE 22

UE indicates the number of $N_{CPU}$ for supported simultaneous CSI computation. When UE supports $N_{CPU}$ simultaneous CSI computation, it means possession of $N_{CPU}$ CSI processing units for processing CSI reporting across all configured cells. When L CPUs are occupied for computation of CSI reporting in a given OFDM symbol, UE has $N_{CPU}$-L unoccupied CPUs. When N CSI reporting starts to occupy each CPU in the same OFDM symbol that $N_{CPU}$-L CPUs are not occupied (here, each CSI reporting n = 0, . . . , N − 1 correspond to $O^{(n)}_{CPU}$), UE is not required to update N-M required CSI reporting with the lowest priority. Here, M is the maximum value satisfying that $0 \leq M \leq N$ is $\Sigma_{n=0}^{M-1} O^{(n)}_{CPU} \leq N_{CPU}$-L.
[2] UE does not expect that an aperiodic CSI trigger state including $N_{CPU}$ reporting setting or more is configured. Processing of CSI reporting occupies the number of CPUs for the number of symbols as follows:
$O_{CPU} = 0$ for CSI reporting having CSI-ReportConfig which has reportQuantity, a higher layer parameter set as 'none', and CSI-RS-ResourceSet that a higher layer parameter, trs-Info, is configured
$O_{CPU} = 1$ for CSI reporting having CSI-ReportConfig which has reportQuantity, a higher layer parameter set as 'cri-RSRP', 'ssb-Index-RSRP', 'cri-SINR', 'ssb-Index-SINR' or 'none', (and CSI-RS-ResourceSet that a higher layer parameter, trs-Info, is not configured)
For CSI reporting having reportQuantity, a higher layer parameter set as 'cri-RI-PMI-CQI', 'cri-RI-i1', 'cri-RI-i1-CQI', 'cri-RI-CQI', or 'cri-RI-LI-PMI-CQI'
If CSI reporting is aperiodically triggered without PUSCH transmission having a transport block or HARQ-ACK or both, when L = 0 CPU is occupied, here, CSI corresponds to single CSI with wideband frequency-granularity and up to 4 CSI-RS ports in a single resource without CSI reporting, and here, codebookType is set as 'typeI-SinglePanel' or reportQuantity is set as 'cri-RI-CQI', whereby $O_{CPU}$ is $N_{CPU}$,
Otherwise, $O_{CPU}$ is $K_s$ and here, $K_s$ is the number of CSI-RS resources in a CSI-RS resource set for channel measurement.

In addition to a definition of Table 22, when CSI considering multi-TRP transmission is introduced, complexity of a terminal may increase compared with the existing operation and accordingly, a new CPU definition for reflecting it may be introduced. Table 23 illustrates a method of defining the number of CPUs necessary for CSI computation for multi-TRP transmission based on the number of CPUs defined according to a higher layer parameter, reportQuantity, in current standards. In other words, it may correspond to $O_{CPU}$ in the description of standards.

In the following Table 14, a variety of options are proposed by a combination of A1-1, A1-2, A2-1, A2-2, A3-1, A3-2, B1, B2, but all options are not necessarily used. Only an option according to a combination of any one of them may be used or options according to two or more combinations may be selectively used by a specific condition, etc.

For convenience of a description, 'the CSI considering multi-TRP transmission' may be referred to as MTRP CSI. And, 'CSI considering multi-TRP transmission' may be configured to a terminal through reportQuantity of CSI-ReportConfig. 'CSI considering multi-TRP transmission' may be defined as a value including (joint) cri/RI/PMI/CQI/LI/RSRP/SINR, etc. And/or 'CSI considering multi-TRP transmission' may mean/include a case in which beam/RS pair information is configured. And/or 'CSI considering multi-TRP transmission' may mean/include a case in which a plurality of resource groups are configured in a resource set. And/or 'CSI considering multi-TRP transmission' may mean/include a case in which a plurality of resource sets are configured in a resource setting. And/or 'CSI considering multi-TRP transmission' may mean/include a case in which it is configured to report a plurality of CSI sets. CSI opposite to the MTRP CSI may be referred to as STRP CSI (i.e., single TRP CSI), which may mean CSI defined previously.

TABLE 23

| | B1 | B2 |
|---|---|---|
| A1-1. | 1) $N_s \times K_S + C(M, 2) \times (K_s')^2$ and/or | 1) $C(M, 2) \times (K_s')^2$ and/or |

TABLE 23-continued

| | B1 | B2 |
|---|---|---|
| | 2) $N_s \times K_S + C(M, 2) \times 2 \times (K_s')^2$ | 2) $C(M, 2) \times 2 \times (K_s')^2$ |
| A1-2. | 1) $N_s \times K_S + C(M, 2) \times K_s'$ and/or | 1) $C(M, 2) \times K_s'$ and/or |
| | 2) $N_s \times K_S + C(M, 2) \times 2 \times K_s'$ | 2) $C(M, 2) \times 2 \times K_s'$ |
| A2-1. | 1) $N_s \times K_S + C(M, 2)$ and/or | 1) $N_s \times K_S + C(M, 2)$ and/or |
| | 2) $N_s \times K_S + C(M, 2) \times 2$ | 2) $N_s \times K_S + C(M, 2) \times 2$ |
| A2-2. | 1) $N_s \times K_S + C(M, 2)$ and/or | 1) $N_s \times K_S + C(M, 2)$ and/or |
| | 2) $N_s \times K_S + C(M, 2) \times 2$ | 2) $N_s \times K_S + C(M, 2) \times 2$ |
| A3-1. | 1) $N_s \times K_S + 1$ and/or | 1) $N_s \times K_S + 1$ and/or |
| | 2) $N_s \times K_S + 2$ | 2) $N_s \times K_S + 2$ |
| A3-2. | 1) $N_s \times K_S + 1$ and/or | 1) $N_s \times K_S + 1$ and/or |
| | 2) $N_s \times K_S + 2$ | 2) $N_s \times K_S + 2$ |

In Table 23, $N_s$ means the number of RSSs (resource set) corresponding to one reporting setting (or trigger state) (for a CSI feedback considering multi-TRP transmission), respectively. Ks means the number of all resources included in one resource set. C(M,2) represents the number of combinations that 2 RSSs are selected for all RSSs (e.g., M RSSs). Here, 2 is just an example, and it is not limited thereto, and may be generalized to N. Ks' represents the number of resources included in one RSS. In Table 23, for convenience, it is assumed that the number of resources in a RSS is the same as Ks' for all RSSs, but a case in which the number is differently defined may be also considered.

Hereinafter, each case is described by referring to Table 23.

- A1-1: When all possible CRI combinations for a different RSS are computed and here, an operation is performed by independently changing a RI/a PMI, etc. in a resource of each RSS (and/or when each CRI combination in each RSS combination is computed and an operation is performed by independently changing a RI/a PMI, etc. in each resource)
- A1-2: When a specific CRI combination for a different RSS (e.g., a combination with a one-to-one corresponding relation, first-first, second-second, . . . ) is computed and here, an operation is performed by independently changing a RI/a PMI, etc. in a resource of each RSS (and/or when each CRI combination in each RSS combination (a CRI combination is limited based on a specific rule) is computed and an operation is performed by independently changing a RI/a PMI, etc. in each resource)
- A2-1: When all possible CRI combinations for a different RSS are computed, but after selecting a specific CRI combination for a different RSS combination (e.g., CSI assuming a single TRP may be used for selection), an operation is performed by independently changing a RI/a PMI, etc. in a selected resource of each RSS for a different RSS combination (and/or when an operation is performed by independently changing a RI/a PMI, etc. in each resource for a selected CRI combination in each RSS combination (e.g., by single TRP CSI(s))
- A2-2: When a specific CRI combination for a different RSS (e.g., a combination with a one-to-one corresponding relation, first-first, second-second, . . . ) is computed, but after selecting a specific CRI combination for a different RSS combination (e.g., CSI assuming a single TRP may be used for selection), an operation is performed by independently changing a RI/a PMI, etc. in a selected resource of each RSS for a different RSS combination (when an operation is performed by independently changing a RI/a PMI, etc. in each resource for a selected CRI combination in each RSS combination (a CRI combination is limited based on a specific rule) (e.g., by single TRP CSI(s))
- A3-1: When all possible CRI combinations for a different RSS are computed, but after selecting a specific CRI combination for all RSSs (e.g., CSI assuming a single TRP may be used for selection), an operation is performed by independently changing a RI/a PMI, etc. in a resource of each RSS (and/or when an operation is performed by independently changing a RI/a PMI, etc. in each resource in each RSS for a specific RSS combination selected based on a selected CRI combination)
- A3-2: When a specific CRI combination for a different RSS (e.g., a combination with a one-to-one corresponding relation, first-first, second-second, . . . ) is computed, but after selecting a specific CRI combination for all RSSs (e.g., CSI assuming a single TRP may be used for selection), an operation is performed by independently changing a RI/a PMI, etc. in a resource of each RSS (and/or when an operation is performed by independently changing a RI/a PMI, etc. in each resource in each RSS for a specific RSS combination selected based on a selected CRI combination (a CRI combination is limited based on a specific rule)(e.g., by single TRP CSI(s))
- B1: When a hypothesis on single TRP transmission is considered
- B2: When a hypothesis on single TRP transmission is not considered In the proposal, for convenience of a description, each case (e.g., A1-1/A1-2/A2-1/A2-2/A3-1/A3-2/B1/B2) is classified, but the number of specific CPUs may be applied without a restriction on the case.

In addition to the proposal, and/or in addition to the existing CPU definition, and/or the following proposal may be considered unilaterally.

When CSI of a M-TRP is simultaneously computed, CPU occupancy is assumed as a M-CPU. The 'M-CPU' may mean a method of the above-proposed A1-1/A1-2/A2-1/A2-2/A3-1/A3-2/B1/B2.

When a sum of ranks is equal to or greater than a specific value (e.g., 4), CPU occupancy is assumed as 2. It may mean that it is defined as a double value compared with a method of the above-proposed A1-1/A1-2/A2-1/A2-2/A3-1/A3-2/B1/B2 and/or it is defined as a double value compared with the existing CPU definition. (It may be equally applied in the following proposal.)

When a size of a bandwidth (BW) configured as a CSI report or a size of a sub-band (SB) is equal to or greater than a specific number, CPU occupancy is assumed as 2. It may mean that it is defined as a double value compared with a method of the above-proposed A1-1/A1-2/A2-1/A2-2/A3-1/A3-2/B1/B2 and/or it is defined as a double value compared with the existing CPU definition.

In BM report, CPU occupancy is assumed as the number of TRPs. The 'BM report' may mean a case in which reportQuantity of CSI-ReportConfig is configured as a value including cri-RSRP/ssb-Index-RSRP/cri-SINR/ssb-Index-SINR, etc. 'The number of TRPs' may correspond to the number of resource sets in a resource setting. Alternatively, each TRP may be classified according to information on a CORESET group (or a CORESET pool) (e.g., an index, an identifier (ID)) and the 'number of TRPs' may correspond to the number of CORESET groups (pools)/the number of CORESET group IDs/the number of CORESET pool indexes.

When the number of CRI candidate values is greater than the number of resources for CM in N CPU computation, a terminal may recognize it as CSI reporting for a mTRP (i.e., multiple TRP) CSI feedback.

When the number of CRI candidate values is greater than the number of resources for CM in N CPU computation, a terminal may recognize it as CSI reporting for a mTRP (i.e., multiple TRP) CSI feedback.

TS38.214 defines a priority rule for CSI reporting to determine which CSI will be fed back when a channel/a resource for a CSI feedback is overlapped/collides. The following Table 24 illustrates part of a description on a priority rule defined in standards.

TABLE 24

CSI reporting is associated with a priority value, $Pri_{iCSI}(y, k, c, s) = 2 \cdot N_{cells} \cdot M_s \cdot y + N_{cells} \cdot M_s \cdot k + M_s \cdot c + s$.

Here, y = 0 for aperiodic CSI reporting transmitted in a PUSCH, y = 1 for semi-

TABLE 24-continued persistent CSI reporting transmitted in a PUSCH, y = 2 for semi-persistent CSI reporting
transmitted in a PUCCH and y = 3 for periodic CSI reporting transmitted in a PUCCH;
K = 0 for CSI reporting which carries L1-RSRP or L1-SINR and k = 1 for CSI
reporting which does not carry L1-RSRP or L1-SINR;
c is a serving cell index and $N_{cells}$ is a value of a higher layer parameter,
maxNrofServingCells;
s is reportConfigID and $M_s$ is a value of a higher layer parameter, maxNrofCSI-
ReportConfigurations.
When a value of $Pri_{iCSI}$(y, k, c, s) for first CSI reporting is lower than a value for second CSI
reporting, first CSI reporting is preferred over second CSI reporting.
When time occupancy of a physical channel scheduled to carry CSI reporting is overlapped
in at least one OFDM symbol and is transmitted in the same carrier, it means that 2 CSI
reporting collide. When UE is configured to transmit 2 colliding CSI reporting,
the following rule is applied excepting a case in which a y value of any one is 2 and
another y value is 3 if y values are different between 2 CSI reporting: CSI reporting with a
higher $Pri_{iCSI}$(y, k, c, s) value is not transmitted by UE.
Otherwise, 2 CSI reporting are multiplexed or any one of them is dropped based on the
priority values.

In addition to the definition, when CSI considering multi-TRP transmission is introduced, a lot of information may be included compared with the existing defined CSI, so a new priority rule may be defined by reflecting it. The following represents a proposal for a priority rule which may be newly defined and an example which applies a proposal based on a priority rule defined in current standards.

The 'CSI considering multi-TRP transmission' may be referred to as MTRP CSI and may be configured to a terminal through reportQuantity of CSI-ReportConfig. In addition, the 'CSI considering multi-TRP transmission' may be defined as a value including (joint) cri/RI/PMI/CQI/LI/RSRP/SINR, etc. And/or the 'CSI considering multi-TRP transmission' may mean/include a case in which beam/RS pair information is configured. And/or the 'CSI considering multi-TRP transmission' may mean/include a case in which a plurality of resource sets (for CM) are configured in a resource setting. And/or the 'CSI considering multi-TRP transmission' may mean/include a case in which a plurality of CSI sets are configured to be reported. CSI opposite to the MTRP CSI may be referred to as STRP CSI (i.e., single TRP CSI), which may mean CSI defined previously.

A1. MTRP CSI may be defined as a higher priority than STRP CSI. The higher priority may mean that when a channel/a resource for a CSI feedback is overlapped/collides, it may be preferentially transmitted. In addition, CSI for BM (beam management) (e.g., for L1-RSRP/L1-SINR) may be defined as the highest priority regardless of MTRP CSI/STRP CSI. For example, a priority may be defined in an order of CSI for BM (for MTRP/STRP CSI)>MTRP CSI (for non-BM)>STRP CSI (for non-BM). A reason why CSI for BM is defined as the highest priority is that communication may be impossible due to signal quality degradation when BM fails between a base station and a terminal. Accordingly, BM may be smoothly performed by defining CSI for BM as the highest priority. Meanwhile, a reason why MTRP CSI should be defined as a higher priority than STRP CSI is as follows. A base station should transmit a CSI-RS corresponding to a different TRP to a terminal to compute MTRP CSI. In addition, a terminal should compute (joint) CSI by using corresponding RSs, so more complexity/batteries may be required compared with STRP CSI. Accordingly, as CSI is generated based on a lot of resources and complexity of a terminal, it may be desirable to transmit it preferentially. In addition, because channel information corresponding to a different TRP may be considered to be already included in joint CSI itself, an effect of reporting STRP CSI corresponding to each TRP may be obtained by reporting MTRP CSI to a base station.

The following Table 25 represents an example in which the proposal is applied to current standards. Specifically, $Pri_{iCSI}$(y,k,c,s) may be represented as follows and for k=1 (e.g., MTRP CSI (for non-BM)) and for k=2 (e.g., STRP CSI (for non-BM)), i.e., based on a priority of MTRP CSI/STRP CSI, a value of k may be configured. For example, a priority of each CSI may be in inverse proportion to a value of k. In other words, as a priority is higher, a value of k related to (for) CSI may be smaller.

TABLE 25

CSI reporting is associated with a priority value,
$Pri_{iCSI}$(y, k, c, s) = 3 · $N_{cells}$ · $M_s$ · y + $N_{cells}$ · $M_s$ · k + $M_s$ · c+s.
Here, y = 0 for aperiodic CSI reporting transmitted in a PUSCH, y = 1 for semi-persistent CSI reporting transmitted in a PUSCH, y = 2 for semi-persistent CSI reporting transmitted in a PUCCH and y = 3 for periodic CSI reporting transmitted in a PUCCH;
k = 0 for CSI reporting which carries L1-RSRP or L1-SINR, k = 1 for CSI reporting which does not carry L1-RSRP or L1-SINR, k = 2 for STRP CSI reporting which does not carry L1-RSRP or L1-SINR;
c is a serving cell index and $N_{cells}$ is a value of a higher layer parameter, maxNrofServingCells;
s is reportConfigID and $M_s$ is a value of a higher layer parameter, maxNrofCSI-ReportConfigurations.

A2. For MTRP CSI and STRP CSI, CSI for BM may be defined, respectively. And, CSI for BM may be defined as a higher priority compared with CSI for non-BM and MTRP CSI may be defined as a higher priority compared with STRP CSI. In this case, a priority may be defined in an order of MTRP CSI for BM>STRP CSI for BM>MTRP CSI for non-BM>STRP CSI for non-BM. A reason and an effect are the same as described in the A1. As CSI for BM is classified into MTRP CSI and STRP CSI, it may have an advantage to give a higher priority to MTRP CSI. The following Table 26 represents an example in which the proposal is applied to current standards. Specifically, $\text{Pri}_{iCSI}(y,k,c,s)$ may be represented as follows, and for k=0 (e.g., MTRP CSI for BM), for k=1 (e.g., STRP CSI for BM), for k=2 (e.g., MTRP CSI for non-BM), for k=3 (e.g., STRP CSI for non-BM), it may be described as follows. In other words, a value of k may be configured based on a priority determined based on whether of MTRP/STRP and contents of CSI (e.g., whether of CSI for BM or other CSI). For example, a priority of each CSI may be in inverse proportion to a value of k. In other words, as a priority is higher, a value of k related to (for) CSI may be smaller Table 26 represents an example in which a proposal of the present disclosure is applied based on a priority rule defined in current standards.

TABLE 26

CSI reporting is associated with a priority value,
$\text{Pri}_{iCSI}(y, k, c, s) = 4 \cdot N_{cells} \cdot M_s \cdot y + N_{cells} \cdot M_s \cdot k + M_s \cdot c + s$.
Here, y = 0 for aperiodic CSI reporting transmitted in a PUSCH, y = 1 for semi-persistent CSI reporting transmitted in a PUSCH, y = 2 for semi-persistent CSI reporting transmitted in a PUCCH and y = 3 for periodic CSI reporting transmitted in a PUCCH;
k = 0 for MTRP CSI reporting which carries L1-RSRP or L1-SINR, k = 1 for STRP CSI reporting which carries L1-RSRP or L1-SINR, k = 2 for MTRP CSI reporting which does not carry L1-RSRP or L1-SINR, k = 3 for STRP CSI reporting which does not carry L1-RSRP or L1-SINR;
c is a serving cell index and $N_{cells}$ is a value of a higher layer parameter, maxNrofServingCells;
s is reportConfigID and $M_s$ is a value of a higher layer parameter, maxNrofCSI-ReportConfigurations.

Meanwhile, an example of the Table 25 or Table 26 corresponds to one example for applying a proposal and it is not limited to the only example for applying a proposal. Accordingly, other examples which may be applied to standards may be possible based on a proposal. For example, a priority may be determined based on whether of MTRP CSI or STRP CSI/contents of CSI (e.g., cri/RI/PMI/CQI/LI/RSRP/SINR)/the number of MTRPs associated with CSI, etc.

Meanwhile, it is assumed that MTRP CSI has a higher priority than STRP CSI regarding the proposed priority rule, but a technical scope of the present disclosure is not limited thereto. STRP CSI may be also defined to have a higher priority than MTRP CSI. As STRP CSI may have a more accurate value than MTRP CSI in terms of a single TRP, there may be an environment where STRP CSI is preferred. Accordingly, for such a case, STRP CSI may be defined to have a higher priority than MTRP CSI. In this case, for example, an example on a priority of the above-described A1 may be defined in an order of CSI for BM (for MTRP/STRP CSI)>STRP CSI (for non-BM)>MTRP CSI (for non-BM). For example, an example on a priority of the above-described A2 may be defined in an order of STRP CSI for BM>MTRP CSI for BM>STRP CSI for non-BM>MTRP CSI for non-BM.

For example, the above-described priority rule may be pre-defined between a base station (or a TRP) and a terminal or a base station (or a TRP) may indicate a configuration related to the above-described priority rule to a terminal.

A CSI set is defined while describing the proposal, and for convenience of a description, a CSI set is explicitly classified, but each CSI set may not be explicitly classified when reporting CSI. An operation, etc. that reporting values which may configure a different CSI set (or reporting values which have a mutual mapping relation and are defined as a pair (e.g., RI1-PMI1- . . . , RI2-PMI2- . . . , etc.)) are reported together by corresponding to one reporting setting may be defined.

Embodiments described in the above-described proposal 1, proposal 2, etc. may be independently applied or may be applied together as a combination of a plurality of embodiments.

Proposals and embodiments described in the proposal 1, proposal 2, etc. assume that a different TRP may be classified in a resource unit or may be classified in a resource set unit. Meanwhile, it may be also possible to classify a TRP in a resource setting unit. In this case, it is possible to apply proposals defined in a resource group unit in a single resource set which may mean a TRP unit in proposal 1 by extending them in a resource setting unit. In addition, it is possible to apply proposals defined in a resource set unit in a single resource setting which may mean a TRP unit in proposal 2 by extending them in a resource setting unit.

Hereinafter, a SINR computation method considering multi-TRP transmission is described.

Based on the example of FIG. 8, when multi-TRP transmission is considered, a reception signal of a terminal is the same as in the above-described Equation 3.

For a reception signal of the terminal, $H^1_{Nrx \times N1,tx}$, $H^2_{Nrx \times N2,tx}$, $H^{1,intf}_{Nrx \times N1,intf}$, $H^{2,intf}_{Nrx \times N2,intf}$ may generate an estimated value of a terminal through a NZP CSI-RS for CM from TRP 1, a NZP CSI-RS for CM from TRP 2, a NZP CSI-RS for IM from TRP 1, a NZP CSI-RS for IM from TRP 2 and CSI-IM for IM. An estimated value for the each channel may be defined as in the following Equation 18.

$$\hat{H}_{N_{rx} \times N_{1,tx}}^{1}, \hat{H}_{N_{rx} \times N_{2,tx}}^{2}, \hat{H}_{N_{rx} \times N_{1,intf}}^{1,intf}, \hat{H}_{N_{rx} \times N_{2,intf}}^{2,intf},$$
$$\hat{I}_{N_{rx} \times 1} \quad \text{[Equation 18]}$$

A SINR which considers multi-TRP transmission (e.g., for NCJT) may be defined as in the following Equation 19 based on an estimated value of the channel and two PMIs selected by a terminal. In Equation 19, a trace may mean a sum of diagonal elements of a matrix and a sum may mean a sum of sizes of all elements of a matrix.

$$\text{SINR}_{NCJT} = \frac{S_1 + S_2}{I_{1,Ly1} + I_{1,NCJT2} + I_{2,Ly2} + I_{2,NCJT1} + I_{1,MU1} + I_{1,MU2} + I_{2,MU1} + I_{2,MU2} + I_{intf} + N} \quad \text{[Equation 19]}$$

$$\hat{H}_{N_{rx} \times N_{1,ly}}^{eff,1} = \hat{H}_{N_{rx} \times N_{1,tx}}^{1} W_{N_{1,tx} \times N_{1,ly}}^{1}$$

$$\hat{H}_{N_{rx} \times N_{2,ly}}^{eff,2} = \hat{H}_{N_{rx} \times N_{2,tx}}^{2} W_{N_{2,tx} \times N_{2,ly}}^{2}$$

-continued $$S_1 = \text{trace}\left((\hat{H}^{eff,1}_{N_{rx}\times N_{1,ly}})^H \hat{H}^{eff,1}_{N_{rx}\times N_{1,ly}}\right)$$

$$S_2 = \text{trace}\left((\hat{H}^{eff,2}_{N_{rx}\times N_{2,ly}})^H \hat{H}^{eff,2}_{N_{rx}\times N_{2,ly}}\right)$$

$$I_{1,Ly1} = \text{sum}\left((\hat{H}^{eff,1}_{N_{rx}\times N_{1,ly}})^H \hat{H}^{eff,1}_{N_{rx}\times N_{1,ly}}\right) - S_1$$

$$I_{2,Ly2} = \text{sum}\left((\hat{H}^{eff,2}_{N_{rx}\times N_{2,ly}})^H \hat{H}^{eff,2}_{N_{rx}\times N_{2,ly}}\right) - S_2$$

$$I_{1,NCJT2} = \text{sum}\left((\hat{H}^{eff,2}_{N_{rx}\times N_{2,ly}})^H \hat{H}^{eff,1}_{N_{rx}\times N_{1,ly}}\right)$$

$$I_{2,NCJT1} = \text{sum}\left((\hat{H}^{eff,1}_{N_{rx}\times N_{1,ly}})^H \hat{H}^{eff,2}_{N_{rx}\times N_{2,ly}}\right)$$

$$I_{1,MU1} = \text{sum}\left((\hat{H}^{1,intf}_{N_{rx}\times N_{1,intf}})^H \hat{H}^{eff,1}_{N_{rx}\times N_{1,ly}}\right)$$

$$I_{1,MU2} = \text{sum}\left((\hat{H}^{2,intf}_{N_{rx}\times N_{2,intf}})^H \hat{H}^{eff,1}_{N_{rx}\times N_{1,ly}}\right)$$

$$I_{2,MU1} = \text{sum}\left((\hat{H}^{1,intf}_{N_{rx}\times N_{1,intf}})^H \hat{H}^{eff,2}_{N_{rx}\times N_{2,ly}}\right)$$

$$I_{2,MU2} = \text{sum}\left((\hat{H}^{2,intf}_{N_{rx}\times N_{2,intf}})^H \hat{H}^{eff,2}_{N_{rx}\times N_{2,ly}}\right)$$

$$I_{intf} = (\hat{I}_{N_{rx}\times 1})^H \hat{I}_{N_{rx}\times 1}$$

$N$: noise variance

Hereinafter, proposals related to multi-TRP beam reporting improvement are described.

In methods proposed in the present disclosure, DL MTRP-URLLC means that multiple TRPs transmit the same data/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is indicated which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be indicated. UE may achieve high reliability because it receives the same data/DCI through resource 1 and resource 2. Such DL MTRP URLLC may be applied to a PDSCH/a PDCCH.

Conversely, UL MTRP-URLLC means that multiple TRPs receive the same data/UCI from UE by using a different layer/time/frequency resource. For example, TRP 1 receives the same data/DCI from UE in resource 1 and TRP 2 receives the same data/DCI from UE in resource 2 and shares received data/DCI through a backhaul link connected between TRPs. UE configured with a UL MTRP-URLLC transmission method transmits the same data/UCI by using a different layer/time/frequency resource. Here, UE is indicated which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be indicated. Such UL MTRP URLLC may be applied to a PUSCH/a PUCCH.

In addition, in methods proposed in the present disclosure, when a specific TCI state (or a TCI) is used (/mapped) in receiving data/DCI/UCI for any frequency/time/space resource, it may mean that a DL estimates a channel from a DMRS by using a QCL type and a QCL RS indicated by a corresponding TCI state in that frequency/time/space resource and receives/demodulates data/DCI to an estimated channel. It may mean that an UL transmits/modulates a DMRS and data/UCI by using a Tx beam and/or Tw power indicated by a corresponding TCI state in that frequency/time/space resource.

The UL TCI state has Tx beam and/or Tx power information of UE and spatial relation information, etc. instead of a TCI state may be configured to UE through other parameter. An UL TCI state may be directly indicated to UL grant DCI or may mean spatial relation information of a SRS resource indicated by a SRI (SRS resource indicator) field of UL grant DCI. Alternatively, it may mean an OL (open loop) Tx power control parameter connected to a value indicated by a SRI field of UL grant DCI (j: an index for open loop parameter Po and a (up to 32 parameter value sets per cell), q_d: an index of a DL RS resource for PL (pathloss) measurement (measurement of up to 4 per cell), 1: a closed loop power control process index (up to 2 processes per cell)).

On the other hand, it is assumed that MTRP-eMBB means that multiple TRPs transmit other data by using a different layer/time/frequency, UE configured with a MTRP-eMBB transmission method is indicated multiple TCI states with DCI and data received by using a QCL RS of each TCI state is different data.

In addition, whether of MTRP URLLC transmission/reception or MTRP eMBB transmission/reception may be understood by UE by separately classifying a RNTI for MTRP-URLLC and a RNTI for MTRP-eMBB and using them. In other words, when CRC masking of DCI is performed by using a RNTI for URLLC, it is considered as URLLC transmission and when CRC masking of DCI is performed by using a RNTI for eMBB, it is considered as eMBB transmission. Alternatively, a base station may configure MTRP URLLC transmission/reception or may configure MTRP eMBB transmission/reception to UE through other new signaling.

In the present disclosure, for convenience of a description, a proposal is applied by assuming cooperative transmission/reception between 2 TRPs, but it may be extended and applied in 3 or more multi-TRP environments and it may be also extended and applied in multi-panel environments. A different TRP may be recognized by UE as a different TCI state and when UE receives/transmits data/DCI/UCI by using TCI state 1, it means that data/DCI/UCI is received/transmitted from/to TRP 1.

A proposal of the present disclosure may be utilized in a situation where MTRP cooperatively transmits a PDCCH (the same PDCCH is repetitively or partitively transmitted) and some proposals may be utilized even in a situation where MTRP cooperatively transmits a PDSCH or cooperatively receives a PUSCH/a PUCCH.

In addition, in the present disclosure, when a plurality of base stations (i.e., MTRP) repetitively transmit the same PDCCH, it may mean the same DCI is transmitted by a plurality of PDCCH candidates and it means that a plurality of base stations repetitively transmit the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception time of DCI, and if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRP) partitively transmit the same PDCCH, it means that one DCI is transmitted by one PDCCH candidate and some resources that that PDCCH candidate is defined are transmitted by TRP 1 and remaining resources are transmitted by TRP 2.

In addition, in the present disclosure, when UE repetitively transmits the same PUSCH so that a plurality of base stations (i.e., MTRP) can receive it, it may mean that the same data is transmitted by a plurality of PUSCHs, and each PUSCH may be optimized for an UL channel of a different TRP and transmitted. For example, UE repetitively transmits the same data through PUSCH 1 and 2 and PUSCH 1 performs transmission by using UL TCI state 1 for TRP 1 and link adaptation such as a precoder/MCS, etc. also performs transmission by a scheduled value which is optimized for a channel of TRP 1. PUSCH 2 performs transmission by using UL TCI state 2 for TRP 2 and link adaptation such as a precoder/MCS, etc. also performs transmission by a scheduled value which is optimized for a channel of TRP 2. PUSCH 1 and 2 which are repetitively transmitted in this case may be transmitted at a different time to be time division multiplexed (TDM), frequency division multiplexed (FDM), spatial division multiplexed (SDM).

In addition, in the present disclosure, when UE partitively transmits the same PUSCH so that a plurality of base stations (i.e., MTRP) will receive it, it means that one data is transmitted by one PUSCH, but a resource allocated to that PUSCH may be partitioned to optimize and transmit it to an UL channel of a different TRP. For example, UE transmits the same data through 10 symbol PUSCHs, transmits 5 previous symbols by using UL TCI state 1 for TRP 1 and also transmits link adaptation such as a precoder/MCS, etc. by a scheduled value which is optimized for a channel of TRP 1. Remaining 5 symbols are transmitted by using UL TCI state 2 for TRP 2 and link adaptation such as a precoder/MCS, etc. is also transmitted by a scheduled value which is optimized for a channel of TRP 2. In the example, transmission for TRP 1 and transmission for TRP 2 are time division multiplexed (TDM) by dividing one PUSCH into time resources, but it may be transmitted by other FDM/SDM method.

Similar to PUSCH transmission, UE may repetitively transmit or partitively transmit the same PUCCH so that a plurality of base stations (i.e., MTRP) can receive a PUCCH.

A proposal of the present disclosure may be extended and applied to a variety of channels such as a PUSCH/a PUCCH/a PDSCH/a PDCCH, etc.

UE may have 2 Rx panels which may simultaneously receive two beams to receive a MTRP PDSCH. For example, UE receives data 1 transmitted from TRP 1 by using panel/beam 1 and at the same time, receives data 2 transmitted from TRP 2 by using panel/beam 2. Here, data 1 may be effectively received only when a beam of TRP 1 received by panel 1 should have high reception strength and a beam of TRP 2 should have low reception strength and data 2 may be effectively received only when a beam of TRP 2 received by panel 2 should have high reception strength and a beam of TRP 1 should have low reception strength.

UE reports reception strength information on candidate beams of TRP 1 and candidate beams of TRP 2 to a base station (it is referred to as beam reporting) and a base station performs MTRP PDSCH transmission by selecting a beam of TRP 1 and a beam of TRP 2 based on it. For example, when a beam candidate that TRP 1 may be transmitted (i.e., a transmission BM (beam management)-RS of TRP 1) is NZP CSIRS 1, 2 (1 port, respectively) and a beam candidate that TRP 2 may be transmitted (i.e., a transmission BM (beam management)-RS of TRP 2) is NZP CSIRS 3, 4 (1 port, respectively), a base station may determine which combination of two beam candidates of TRP 1 corresponding to NZP CSIRS 1, 2 and two beam candidates of TRP 2 corresponding to NZP CSIRS 3, 4 will be effective for MTRP PDSCH transmission. To this end, UE may perform L1-SINR beam reporting using NZP CSIRS 1, 2, 3, 4.

UE may perform beam reporting as follows so that a base station can effectively configure a beam of TRP 1 and a beam of TRP 2.

L1 SINR beam reporting configured for UE may be configured as follows. All (CMR (channel measurement resource), IMR (interference measurement resource)) pair combinations for beam candidates (e.g., BM (beam management)-RS, NZP CSIRS) may be configured. For convenience of a description, a case in which NZP CSIRS 1/2/3/4 are a beam candidate for MTRP transmission is assumed. But such an assumption does not limit a technical scope of the present disclosure.

(CMR, IMR)={(NZP CSIRS 1, NZP CSIRS 3), (NZP CSIRS 1, NZP CSIRS 4), (NZP CSIRS 2, NZP CSIRS 3), (NZP CSIRS 2, NZP CSIRS 4), (NZP CSIRS 3, NZP CSIRS 1), (NZP CSIRS 3, NZP CSIRS 2), (NZP CSIRS 4, NZP CSIRS 1), (NZP CSIRS 4, NZP CSIRS 2)}

UE is configured to report a L1 SINR for the 8 (CMR, IMR) pairs and UE reports a value of 8 L1 SINRs corresponding to each CMR, IMR pair. A base station that a value of a L1 SINR is reported finds pair i and j with $\text{argmax}_{ij}$ (L1-SINR$_{ij}$+L1-SINR$_{ji}$). Here, L1-SINR$_{ij}$ means a SINR measured with (CMR,IMR)=(NZP CSIRS i, NZP CSIRS j). Alternatively, i and j may be found with $\text{argmax}_{ij}$(tput(L1-SINR$_{ij}$)+tput(L1-SINR$_{ji}$)). tput(L1-SINR) means a transmittable throughput for a L1-SINR and for example, it may mean log(1+L1-SINR). Alternatively, i and j were found by a simple sum of a L1-SINR or tput in the Equation, but besides, i and j which maximize the minimum value of L1-SINR$_{ij}$ and L1-SINR$_{ji}$ may be found. In addition, i and j which maximize the minimum value of tput(L1-SINR$_{ij}$) and tput(L1-SINR$_{ji}$) may be found. This method has a disadvantage that a beam reporting overhead is large.

Hereinafter, in a description, for convenience of a description, a case in which NZP CSIRS 1/2/3/4 are a beam candidate for MTRP transmission (e.g., a BM-RS, a NZP CSIRS) is assumed. But such an assumption does not limit a technical scope of the present disclosure.

<Method 1>

L1 SINR beam reporting configured for UE may be configured as follows. A (CMR, IMR) pair may be configured by configuring a NZP CSIRS for a specific TRP as CMR and configuring a NZP CSIRS for other TRP as IMR among beam candidates (e.g., a BM-RS, a NZP CSIRS). The following example is an example in which a NZP CSIRS for TRP 1 (e.g., NZP CSIRS 1/2) is configured as CMR and a NZP CSIRS for TPR 2 (e.g., NZP CSIRS 3/4) is configured as IMR.

(CMR, IMR)={(NZP CSIRS 1, NZP CSIRS 3), (NZP CSIRS 1, NZP CSIRS 4), (NZP CSIRS 2, NZP CSIRS 3), (NZP CSIRS 2, NZP CSIRS 4)}

UE may compute L1-SINR$_{ij}$ by applying a reception beam (i.e., QCL type D) of NZP CSIRS i (i.e., CMR) to CMR and IMR for the (NZP CSIRS i, NZP CSIRS j). And, in addition, L1-SINR$_{ij}$' is found by applying a reception beam/panel (i.e, QCL type D) of NZP CSIRS j (i.e., IMR) to CMR and IMR. As a result, L1-SINR$_{ij}$' means a SINR value when receiving data of TRP 1 by using a reception beam/panel used when receiving data from TRP 2. In other words, it means that as a value of L1-SINR$_{ij}$' is smaller, a reception SINR is larger when receiving data from TRP 2 and that as a value of L1-SINR$_{ij}$' is larger, a reception SINR is larger when receiving data from TRP 1.

UE reports the best N L1-SINR the same as before (the best N L1-SINR means N L1-SINRs with the largest value, reports a i,j pair corresponding to it to CRI and reports a value of L1-SINR). And, UE additionally reports the worst N L1-SINR' (i.e., N L1-SINR's with the smallest value). The best N L1-SINR$_{ij}$ indicates the best beam pair i,j in order when receiving data of TP 1 with a Rx beam in a TP 1 direction and the worst N L1-SINR_ij' indicates the worst beam pair i,j in order when receiving data of TP 1 with a Rx beam in a TP 2 direction. Alternatively, an UL resource may be saved by indicating only a i,j pair corresponding to the worst N L1-SINR$_{ij}$' without reporting a value of L1-SINR$_{ij}$'.

(L1-SINR$_{ij}$')−1 is the same as L1-SINR$_{ji}$. Accordingly, the best N (L1-SINR$_{ij}$')−1 instead of the worst N L1-SINR$_{ij}$' may be reported. In this case, (L1-SINR$_{ij}$')−1 has an advantage that a quantization table for reporting the existing L1-SINR value may be used as it is. Alternatively, a differential value between L1-SINR$_{ij}$ and (L1-SINR')−1 instead of a (L1-SINR$_{ij}$')−1 value may be reported.

Alternatively, the best N L1-SINR$_{ij}$ may be reported and a value of L1-SINR$_{ij}$' and L1-SINR$_{ij}$'−1 corresponding to that ij may be reported together.

Alternatively, UE finds the best N (i,j) pair with large L1-SINR$_{ij}$+(L1-SINR$_{ij}$')−1 and reports L1-SINR$_{ij}$ or (L1-SINR$_{ij}$')−1 corresponding to it or a sum of both. Alternatively, UE finds the best N (i,j) pair with large tput(L1-SINR$_{ij}$)+tput((L1-SINR$_{ij}$')−1) and reports L1-SINR$_{ij}$ or (L1-SINR$_{ij}$')−1 corresponding to it or a sum of both. Alternatively, i and j were found by a simple sum of a L1-SINR or tput in the Equation, but besides, i and j which maximize the minimum value of L1-SINR$_{ij}$ and (L1-SINR$_{ij}$')−1 may be found. i and j which maximize the minimum value of tput(L1-SINR$_{ij}$) and tput((L1-SINR$_{ij}$')−1) may be found and reported and L1-SINR$_{ij}$ or (L1-SINR$_{ij}$')−1 corresponding to it or a sum of both may be reported.

<Method 2>

L1 SINR beam reporting configured for UE may be configured as follows. A (CMR, IMR) pair may be configured by configuring a NZP CSIRS for a specific TRP as CMR and configuring a NZP CSIRS for other TRP as IMR among beam candidates (e.g., a BM-RS, a NZP CSIRS). The following example is an example in which a NZP CSIRS for TRP 1 (e.g., NZP CSIRS 1/2) is configured as CMR and a NZP CSIRS for TPR 2 (e.g., NZP CSIRS 3/4) is configured as IMR.

(CMR, IMR)={(NZP CSIRS 1, NZP CSIRS 3), (NZP CSIRS 1, NZP CSIRS 4), (NZP CSIRS 2, NZP CSIRS 3), (NZP CSIRS 2, NZP CSIRS 4)}

UE computes L1-SINR$_{ij}$ for the (NZP CSIRS i, NZP CSIRS j) and additionally computes and reports L1-ISNR$_{ij}$. L1-ISNR$_{ij}$ means an interference to signal plus noise power ratio that measurement power of IMR is configured as a numerator and measurement power of CMR is configured as a denominator by measuring reception power of CMR and IMR for a reception beam/panel (i.e., QCL type D) of NZP CSIRS j (i.e., IMR). Accordingly, L1-ISNR$_{ij}$ is L1-SINR$_{ji}$.

UE reports the best N L1-SINR the same as before (the best N L1-SINR means N L1-SINRs with the largest value, reports a i and j pair corresponding to it to CRI and reports a value of a L1-SINR) and additionally, reports the best N L1-ISNR. The best N L1-SINR$_{ij}$ indicates the best beam pair i and j in order when receiving data of TP 1 with a Rx beam in a TP 1 direction and the best N L1-ISNR$_{ij}$ indicates the best beam pair i and j in order when receiving data of TP 2 with a Rx beam in a TP 2 direction. Alternatively, an UL resource may be saved by indicating only a i and j pair corresponding to the best N L1-ISNR$_{ij}$ without reporting a value of L1-ISNR$_{ij}$. Alternatively, a differential value between L1-SINR$_{ij}$ and L1-ISNR$_{ij}$ instead of a value of L1-ISNR$_{ij}$ may be reported.

Alternatively, the best N L1-SINR$_{ij}$ may be reported and a value of L1-ISNR$_{ij}$ corresponding to that ij may be reported together.

Alternatively, UE finds the best N (i,j) pair with large L1-SINR$_{ij}$+(L1-ISNR$_{ij}$) and reports L1-SINR$_{ij}$ or (L1-ISNR$_{ij}$) corresponding to it or a sum of both. Alternatively, UE finds the best N (i,j) pair with large tput(L1-SINR$_{ij}$)+tput((L1-ISNR$_{ij}$)) and reports L1-SINR$_{ij}$ or (L1-ISNR$_{ij}$) corresponding to it or a sum of both. Alternatively, in the Equation, i and j were found by a simple sum of L1-SINRs or tputs, but besides, i and j which maximize the minimum value of L1-SINR$_{ij}$ and (L1-ISNRv) or i and j which maximize the minimum value of tput(L1-SINR$_{ij}$) and tput((L1-ISNR$_{ij}$)) are found and reported and L1-SINR$_{ij}$ or (L1-ISNR$_{ij}$) corresponding to it or a sum of both is reported.

<Method 3>

L1 SINR beam reporting configured for UE may be configured as follows.

(CMR, IMR)={Group A (NZP CSIRS 1, NZP CSIRS 3), (NZP CSIRS 3, NZP CSIRS 1), Group B (NZP CSIRS 1, NZP CSIRS 4), (NZP CSIRS 4, NZP CSIRS 1), Group C (NZP CSIRS 2, NZP CSIRS 3), (NZP CSIRS 3, NZP CSIRS 2), Group D (NZP CSIRS 2, NZP CSIRS 4), (NZP CSIRS 4, NZP CSIRS 2)}

A base station may group a CMR and IMR pair and configure it to UE. For example, Group A may be configured as (NZP CSIRS 1, NZP CSIRS 3), (NZP CSIRS 3, NZP CSIRS 1). UE computes L1-SINR values with a CMR, IMR pair belonging to the same group. For example, for Group A, L1-SINR$_{13}$ and L1-SINR$_{31}$ are computed. UE reports the best N (L1-SINR) group based on a SINR value computed thus. A base station may directly signal grouping information or indirectly promise a pair that a resource of CMR and IMR is switched as grouping. For example, as in the above-described example, Group A may directly configure group information as (NZP CSIRS 1, NZP CSIRS 3), (NZP CSIRS 3, NZP CSIRS 1) or may be promised/defined as being grouped as a pair by alternating an order of corresponding measured resources if only a measured resource of a group (e.g., NZP CSIRS 1, NZP CSIRS 3) is configured.

A method of selecting/reporting the best N group is as follows.

First, a L1 SINR value computed by a first (or last) CMR, IMR pair of each group is compared to select the best N group with a large value.

Alternatively, UE compares a sum of L1 SINR values computed by a CMR, IMR pair of each group and selects the best N group with a large value. Alternatively, a L1 SINR computed by a CMR, IMR pair of each group is substituted with tput to find a sum of tput values and select the best N group with a large value. Alternatively, the minimum value of a L1 SINR or tput value computed by a CMR, IMR pair of each group is found to select the best N group with the largest minimum value.

A L1-SINR corresponding to the Best N Group is reported as the following value.

A L1 SINR value computed by a first (or last) CMR, IMR pair of that Best N group may be reported.

Alternatively, all L1 SINR values computed by a CMR, IMR pair of that Best N group may be reported. Here, a L1 SINR value of remaining CMR, IMR pairs may be reported as a differential value based on a L1 SINR value of a specific one of a plurality of CMR, IMR pairs of the Best N group. For example, a difference of a L1 SINR computed by remaining CMR, IMR pairs of a corresponding group may be reported based on a L1 SINR computed by a first CMR, IMR pair of the Best N group.

<Method 4>

L1 SINR beam reporting configured for UE may be configured as follows. A (CMR, IMR) pair may be configured by configuring a NZP CSIRS for a specific TRP as CMR and configuring a NZP CSIRS for other TRP as IMR among beam candidates (e.g., a BM-RS, a NZP CSIRS). The following example is an example in which a NZP CSIRS for TRP 1 (e.g., NZP CSIRS 1/2) is configured as CMR and a NZP CSIRS for TPR 2 (e.g., NZP CSIRS 3/4) is configured as IMR.

(CMR, IMR)={(NZP CSIRS 1, NZP CSIRS 3), (NZP CSIRS 1, NZP CSIRS 4), (NZP CSIRS 2, NZP CSIRS 3), (NZP CSIRS 2, NZP CSIRS 4)}

UE computes L1-SINR$_{ij}$ for the (NZP CSIRS i, NZP CSIRS j) and additionally measures port power of NZP CSIRS j configured as IMR to compute and report L1-RSRP. (it is referred to as IMR based L1-RSRP) Here, power is measured by applying a reception beam/panel (i.e., QCL type D) of NZP CSIRS j (i.e., IMR).

UE reports the best N L1-SINR the same as before (the best N L1-SINR means N L1-SINRs with the largest value, reports a i and j pair corresponding to it to CRI and reports a value of a L1-SINR) and additionally reports the best N IMR based L1-RSRP. Alternatively, an UL resource may be saved by indicating only a i and j pair corresponding to the best N IMR based L1-RSRP without reporting a value of L1-ISNR$_{ij}$.

Alternatively, the best N L1-SINR$_{ij}$ may be reported and a value of IMR based L1-RSRP corresponding to that ij may be reported together.

Alternatively, i and j which maximize the minimum value of L1-SINR$_{ij}$ and/or IMR based L1-RSRP$_{ij}$ is found to report L1-SINR$_{ij}$ or (IMR based L1-RSRP$_{ij}$) corresponding to it. Alternatively, the best N L1-SINR$_{ij}$ is computed and only when a value of IMR based L1-RSRP corresponding to that ij of the best N L1-SINR$_{ij}$ is equal to or greater than a specific threshold value, the best N L1-SINR$_{ij}$ is reported.

In the above-described method (proposal 1/2/3/4, etc.), for convenience of a description, it is described based on CSI/beam computation/reporting of TRP 2, but likewise, CSI/BEAM of TRP 1 may be also computed/reported with an inverse CQI. In addition, for convenience of a description, it is described based on an operation of 2 TRPs (e.g., TRP1/TRP 2), but of course, it may be extended to a plurality of TRP operations.

In the present disclosure, it is described based on a 'TRP', but as described above, "TRP" may be applied by being substituted with an expression such as a panel, a cell, a transmission point (TP), a base station (gNB, etc.), etc. In addition, as described above, a TRP may be classified according to information on a CORESET group (or a CORESET pool) (e.g., an index). In an example, when one terminal is configured to perform transmission and reception with a plurality of TRPs (or cells), it may mean that a plurality of CORESET groups (or CORESET pools) are configured for one terminal. Such a configuration for a CORESET group (or a CORESET pool) may be performed through higher layer signaling (e.g., RRC signaling, etc.). In addition, when a plurality of CORESET groups are configured for one terminal, a corresponding terminal may be configured or defined to receive data by using a multi DCI based M-TRP operation.

Proposal 3: A Method of Defining/Configuring CSI Computation Time for CSI Reporting for Multi-TRP CSI Feedbacks The following Table 27 shows a definition of CSI computation time defined in current standards TS38.214.

TABLE 27

When a CSI request field in DCI triggers CSI reporting(s) in a PUSCH, UE provides CSI reporting which is valid for n-th triggered reporting,
If a first UL symbol carrying corresponding CSI reporting(s) including a timing advance effect starts after symbol $Z_{ref}$, and
If a first UL symbol carrying n-th CSI reporting including a timing advance effect starts after symbol $Z'_{ref}(n)$,
Here, it is defined as a subsequent UL symbol having a CP (cyclic prefix) starting at $T_{proc,\ CSI} = (Z)(2048 + 144) \cdot k2^{-\mu} \cdot T_c + T_{switch}$ after a last symbol of a PDCCH triggering CSI reporting(s) ends, and here, Z'ref(n) is defined as a subsequent UL symbol having a CP starting at $T'_{proc,\ CSI} = (Z')(2048 + 144) \cdot k2^{-\mu} \cdot T_c$ after a last symbol at last time of the following ends:
When an aperiodic CSI-RS resource for channel measurement, aperiodic CSI-IM used for interference measurement, an aperiodic NZP CSI-RS for interference measurement and an aperiodic CSI-RS are used for channel measurement for reporting n-th triggered CSI, $T_{switch}$ is defined in standards.
Z, Z' and µ are defined as follows:
$Z = \max_{m=0,\ldots,M-1}(Z(m))$ and $Z' = \max_{m=0,\ldots,M-1}(Z'(m))$, and here, M is the number of updated CSI reporting(s) and (Z(m),Z'(m)) corresponds to m-th updated CSI reporting and is defined as follows.
For $(Z_1, Z'_1)$ in Table 28, if CSI is triggered without a PUSCH for a transport block or HARQ-ACK or both when L = 0 CPU(CSI processing unit) is occupied, and if CSI to be transmitted is single CSI and corresponds to broadband frequency-granularity, here, CSI corresponds to up to 4 CSI-RS ports in a single resource without CSI reporting and CodebookType is set as 'typeI-SinglePanel', or reportQuantity is set as 'cri-RI-CQI', or TABLE 27-continued For $(Z_1, Z'_1)$ in Table 29, when CSI to be transmitted corresponds to broadband frequency-granularity, here, CSI corresponds to up to 4 CSI-RS ports in a single resource without CSI reporting and CodebookType is set as 'typeI-SinglePanel', or reportQuantity is set as 'cri-RI-CQI', or
For $(Z_1, Z'_1)$ in Table 29, when CSI to be transmitted corresponds to broadband frequency-granularity, here, reportQuantity is set as 'ssb-Index-SINR', or reportQuantity is set as 'cri-SINR', or
For $(Z_3, Z'_3)$ in Table 29, when reportQuantity is set as 'cri-RSRP' or 'ssb-Index-RSRP', here, $\chi_\mu$ follows beamReportTiming, a reported capability of UE, and $KB_1$ follows beamSwitchTiming, a reported capability of UE, or
For $(Z_2, Z'_2)$ in Table 29, otherwise,
$\mu$ in Table 28 and Table 29 corresponds to min ($\mu_{PDCCH}$, $\mu_{CSI-RS}$, $\mu_{UL}$) and here, $\mu_{PDCCH}$ corresponds to a subcarrier spacing of a PDCCH that DCI is transmitted, $\mu_{UL}$ corresponds to a subcarrier spacing of a PUSCH that CSI reporting will be transmitted and $\mu_{CSI-RS}$ corresponds to the minimum subcarrier spacing of an aperiodic CSI-RS triggered by DCI.

Table 28 illustrates CSI computation delay request 1.

TABLE 28

| | $Z_1$ [Symbols] | |
|---|---|---|
| $\mu$ | $Z_1$ | $Z'_1$ |
| 0 | 10 | 8 |
| 1 | 13 | 11 |
| 2 | 25 | 21 |
| 3 | 43 | 36 |

Table 29 illustrates CSI computation delay request 2.

TABLE 29

| | $Z_1$ [Symbols] | | $Z_2$ [Symbols] | | $Z_3$ [Symbols] | |
|---|---|---|---|---|---|---|
| $\mu$ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | min(44, $X_2 + KB_1$) | $X_2$ |
| 3 | 97 | 85 | 152 | 140 | min(97, $X_3 + KB_2$) | $X_3$ |

In the Table 27, the CSI computation time assumes a CSI feedback considering a single TRP. However, for a mTRP CSI feedback, terminal complexity may increase due to an increase in a hypothesis, etc. Accordingly, for a mTRP CSI feedback, a value of Z, Z' may be separately defined by considering an increase in terminal complexity. Methods therefor are proposed below.

Proposal 3-1: For CSI reporting for a mTRP CSI feedback, a CSI computation time may be defined as follows by considering additional time required by a terminal based on a value of a specific parameter (e.g., Z2) related to CSI computation time defined in current standards.

For a value used as a standard in the proposal 3-1, other value defined in current standards except for a value of Z2 may be also used. In other words, any one of values defined in current standards may become a standard value.

Table 30 illustrates CSI computation time for a mTRP CSI feedback according to a method proposed in the present disclosure.

TABLE 30

| | $Z_2$ [Symbols] | |
|---|---|---|
| $\mu$ | $Z_2$ | $Z'_2$ |
| 0 | $40 + X_1$ | $37 + X'_1$ |
| 1 | $72 + X_2$ | $69 + X'_2$ |
| 2 | $141 + X_3$ | $140 + X'_3$ |
| 3 | $152 + X_4$ | $140 + X'_4$ |

In Table 30, $X_1$, $X_2$, $X_3$, $X_4$ and $X'_1$, $X'_2$, $X'_3$, $X'_4$ are an integer equal to or greater than 0 and may be defined by a fixed rule or may be configured/indicated to a terminal based on L1/L2 signaling by a base station and/or a reporting value of a terminal (e.g., an UE capability, etc.)

As an example of a fixed rule, all values of $X_1$, $X_2$, $X_3$, $X_4$ and $X'_1$, $X'_2$, $X'_3$, $X'_4$ may be defined as 0. In this case, a multi-TRP CSI feedback may get an effect which applies the maximum value of CSI computation time defined in current standards.

In addition, (part or all of) values of $X_1$, $X_2$, $X_3$, $X_4$ and $X'_1$, $X'_2$, $X'_3$, $X'_4$ may be defined as the same/a different value. For example, $X_1 = X'_1$, $X_2 = X'_2$, $X_3 = X'_3$, $X_4 = X'_4$ (here, $X1 \neq X_2 \neq X_3 \neq X_4$).

When the proposal is applied, there is an effect which allows a terminal to process CSI computation with high complexity by defining the minimum value as a value equal to or greater than the largest value which is currently defined.

Proposal 3-1: Even when condition n is satisfied, for CSI reporting for a multi-TRP CSI feedback, CSI computation time (e.g., $Z_2$, $Z'_2$) which is large compared with a value of Z, Z' corresponding to condition n may be defined/configured.

In the above, condition 1 (i.e., 1 is included in n) may mean that a condition corresponding to $Z_1$, $Z'_1$ defined in Table 28 is satisfied. For example, based on such a proposal, even when condition 1 is satisfied, for CSI reporting for a multi-TRP CSI feedback, it may be defined as a value larger than $Z_1$, $Z'_1$ in Table 28 (e.g., $Z_2$, $Z'_2$).

In the above, condition 2 may mean that a condition corresponding to $Z_1$, $Z'_1$ defined in Table 29 is satisfied. For example, even when condition 2 is satisfied based on such a proposal, for CSI reporting for a multi-TRP CSI feedback, it may be defined as a value larger than $Z_1$, $Z'_1$ defined in Table 29 (e.g., $Z_2$, $Z'_2$).

In the above, condition 3 may mean that a condition corresponding to $Z_3$, $Z'_3$ defined in Table 29 is satisfied. For example, even when condition 3 is satisfied based on such a proposal, for CSI reporting for a multi-TRP CSI feedback, it may be defined as a value larger than $Z_3$, $Z'_3$ defined in Table 29 (e.g., $Z_2$, $Z'_2$).

As an embodiment of the proposal, a condition "it does not correspond to CSI reporting for a multi-TRP (mTRP) CSI feedback" may be additionally included in condition 1 and/or condition 2 and/or condition 3.

Here, "CSI reporting for a mTRP CSI feedback" may mean at least any one of the following.

When reporting quantity includes quantity for a mTRP CSI feedback; and/or

A plurality of CSI-RS resources (for channel measurement) (and associated IMRs) are configured, 2-1. when reporting of a plurality of CRIs, CQIs, and/or RIs is configured, and/or 2-2. when reporting of a plurality of PMIs (corresponding to a different CSI-RS resource) for the same band (e.g., a subband, a wideband) is configured, and/or 2-3. when joint CQI reporting (computed by considering channels estimated for a plurality of CSI-RS resources) for the same band (e.g., a subband, a wideband) is configured, and/or When it is configured to report CRIs equal to or greater than the number of a plurality of CSI-RS resources (for channel measurement) (e.g., LTE CoMP CSI: CMR={CSIRS1, CSIRS2}, CRI={0, 1, 2}, for CRI=0, joint CQI reporting); and/or When computation dependency between a (CMR,IMR) pair configured for one CSI (CSI1) computation and a (CMR,IMR) pair configured for another CSI (CSI2) computation is configured (e.g., when CSI is computed as CMR of CSI1 is used as IMR of CSI2 and CMR of CSI2 is used as IMR of CSI1); and/or For CSI reporting/a terminal indicated/configured/performing a proposed operation related to mTRP beam reporting improvement, it may be considered as a terminal reporting L1-RSRP/L1-SINR based on mTRP. Accordingly, when a terminal is configured/indicated to perform a proposed operation related to mTRP beam reporting improvement, a terminal may recognize it as a condition for performing a proposal corresponding to condition 2 and/or condition 3 (e.g., applying larger CSI computation time); and/or For CSI reporting/a terminal indicated/configured/performing an operation corresponding to proposal 1/proposal 2 of the present disclosure (an operation extended in a resource setting unit may be also included).

Example 1 to 6 on CSI reporting for the above-described mTRP CSI feedback may be independently applied or may be applied by combining two or more examples.

Example 1 to 6 on CSI reporting for the mTRP CSI feedback may be utilized as an operation of a terminal/a condition for distinguishing from CSI reporting for a single TRP based CSI feedback defined in a previous release in the present disclosure.

Proposal 4: A Method of Defining a CSI Reference Resource for CSI Reporting for a Multi-MRP (mTRP) CSI Feedback The following Table 31 shows a definition of a CSI reference resource defined in current standards TS38.214.

TABLE 31

A CSI reference resource for a serving cell is defined as follows:
In a frequency domain, a CSI reference resource is defined by a group of downlink physical resource blocks corresponding to a band to which derived CSI is related.
In a time domain, a CSI reference resource for CSI reporting is defined by a single downlink slot n-$n_{CSI\_ref}$ in an uplink slot n',
Here, n is floor(n' · $2^{\mu DL}/2^{\mu DL}$) (floor(x) is the maximum integer not greater than x) and $\mu_{DL}$ and $\mu_{UL}$ are a subcarrier spacing configuration for a DL and an UL, respectively,
Here, for periodic and semi-persistent CSI reporting,
when a single CSI-RS/SSB resource is configured for channel measurement, $n_{CSI\_ref}$ is the smallest value which is the same as or greater than 4 · $2^{\mu DL}$ that a slot n-$n_{CSI\_ref}$ corresponds to a valid downlink slot, or
when multiple CSI-RS/SSB resources are configured for channel measurement, $n_{CSI\_ref}$ is the smallest value which is the same as or greater than 5 · $2^{\mu DL}$ that a slot n-$n_{CSI\_ref}$ corresponds to a valid downlink slot.
For aperiodic CSI reporting, when UE is indicated by DCI to report CSI in the same slot as a CSI request, $n_{CSI\_ref}$ is a value corresponding in a valid downlink slot that a reference resource is the same as a corresponding CSI request, and otherwise, $n_{CSI\_ref}$ is the smallest value equal to or greater than floor(Z'/$N^{slot}_{symb}$) that a slot n-$n_{CSI\_ref}$ corresponds to a valid downlink slot, and here, Z' corresponds to a delay requirement.
when a periodic or semi-persistent CSI-RS/CSI-IM or SSB is used for channel/interference measurement, UE does not make an entry to measure a channel/interference in a CSI-RS/CSI-IM/SSB that a last OFDM symbol is received to Z' symbols before transmission time of a first OFDM symbol of aperiodic CSI reporting.
A slot in a serving cell is considered as a valid downlink slot when:
A corresponding slot includes a downlink or a flexible symbol configured by at least one higher layer, and
A corresponding slot does not fall in a measurement gap configured for UE.
When there is not a valid downlink slot for a CSI reference resource corresponding to a CSI reporting setting in a serving cell, CSI reporting on a serving cell is omitted in an uplink slot n'.

For the periodic (P)/semi-persistent (SP) CSI reporting, a value of $n_{CSI\_ref}$ may be separately defined by considering an increase in terminal complexity in case of a mTRP CSI feedback. Proposal 4-1: When P/SP CSI reporting is configured as a multi-TRP (mTRP) CSI feedback, a value of $n_{CSI\_ref}$ for a CSI reference resource definition may be defined as follows. A value of $n_{CSI\_ref}$ is the smallest value which is the same as or greater than X·$2^{\mu}_{DL}$ that a slot n-$n_{CSI\_ref}$ corresponds to a valid downlink slot.

Hereinafter, an example on the X is described.

1. Option 1: X=5+α

Here, a value of α corresponds to an integer equal to or greater than 0 and may be defined by a fixed rule (e.g., α=1) or may be configured/indicated to a terminal based on L1/L2 signaling by a base station and/or a reporting value of a terminal (e.g., an UE capability, etc.). For example, when P/SP CSI reporting is configured as a mTRP CSI feedback (for multiple CSI-RS/SSB resources), X may be defined as 6.

Alternatively, the value of X itself may be defined by a fixed rule (e.g., X=6). Alternatively, a value of X may be configured/indicated to a terminal based on L1/L2 signaling by a base station and/or a reporting value of a terminal (e.g., UE capability, etc.).

As a value of X is defined as the minimum value equal to or greater than the largest value which is currently defined, a terminal may be allowed to process CSI computation with high complexity.

Option 2: When a single CSI-RS/SSB resource is configured for CM to each TRP, X may be defined as $4+\alpha_1$ and when a plurality of CSI-RS/SSB resources are configured for CM to each TRP, X may be defined as $5+\alpha_2$.

The value of $\alpha_1$ and $\alpha_2$ may correspond to an integer equal to or greater than 0 and may be defined by a fixed rule (e.g., Alternatively, a value of X for a single CSI-RS/SSB resource and a value of X for a plurality of CSI-RS/SSB resources may be defined by a fixed rule, respectively (e.g., X=6). Alternatively, a configuration/an indication may be performed to a terminal based on L1/L2 signaling by a base station and/or a reporting value of a terminal (e.g., an UE capability, etc.).

Likewise, a more sophisticated CSI reference resource may be defined based on the number of resources for CM corresponding to each TRP.

In the above, "CSI reporting for a mTRP CSI feedback" may follow an embodiment described in the above-described proposal 3.

The following Table 32 shows a definition of a CSI reference resource defined in current standards TS38.214.

TABLE 32

When it is configured to report a CQI index in a CSI reference resource, UE assumes the following purpose to withdraw a CQI index and when also configured, it is assumed for a PMI and a RI:
2 first OFDM symbols are occupied by control signaling.
The number of PDSCHs and DM-RS symbols is the same as 12.
The same bandwidth part subcarrier spacing configured for PDSCH reception
A bandwidth configured for reporting a corresponding CQI
A reference resource uses a length of CP and subcarrier spacing configured for PDSCH reception.
A resource element is not used by a primary or secondary synchronization signal or a PBCH.
Redundancy version 0
A ratio of a PDSCH EPRE (Energy Per Resource Element) to a CSI-RS EPRE is given in Clause 4.1.
It is assumed that there are no REs allocated for a NZP CSI-RS and a ZP CSI-RS.
It is assumed that the number of front-loaded DM-RS symbols is the same as the maximum front-loaded symbols configured by maxLength, a higher layer parameter in DMRS-DownlinkConfig.
It is assumed that the number of additional DM-RS symbols is the same as additional symbols configured by a higher layer parameter dmrs-AdditionalPosition.
It is assumed that PDSCH symbols do not include a DM-RS.
- It is assumed that a size of PRB bundling is 2PRB.

$\alpha=1$) or may be configured/indicated to a terminal based on L1/L2 signaling by a base station and/or a reporting value of a terminal (e.g., an UE capability, etc.).

The value of $\alpha_1$ and $\alpha_2$ may be defined as the same/a different value.

In the proposal, an expression of "to each TRP" may be interpreted as meaning that a CSI-RS/SSB resource is defined in a predetermined group shape. For example, one or more CSI-RS/SSB resources may correspond to a predetermined group which has the same/a similar feature/to which a common configuration is applied and the group may be interpreted as meaning a specific TRP. For example, each TRP may correspond to each resource group defined in a single resource set in the proposal 1 and each TRP may correspond to each resource set in a single resource setting in the Proposal 2.

In reference to Table 32 and a description related to the Equation 4, an overhead of a PT-RS is not considered in current standards in a definition of a CSI reference resource for CQI/RI/PMI computation. It is because only a single port PT-RS was possible in Rel-15, so it may be assumed that an overhead itself is not large and it will not seriously influence CSI computation. On the other hand, 2 port PT-RSs were introduced in Rel-16 and each PT-RS port is frequency division multiplexed each other for a single terminal, so an overhead resulting from it is relatively large. Accordingly, if it is not considered in CSI computation, a problem that accuracy of CSI is lowered may be generated. Accordingly, a method that a PT-RS overhead may be reflected in CSI computation when 2 port PT-RSs may be applied (or for 2 or more port PT-RSs) is proposed.

Rel-16 includes the same contents as in the following Table 33 regarding 2 port PT-RSs.

TABLE 33

When UE is not indicated as DCI having a DCI field "time domain resource assignment" which indicates an entry in pdschTimeDomainAllocationList including RepNumR16 in PDSCH-TimeDomainResourceAllocation, and when UE is configured as maxNrofPorts, the same higher layer parameter as n2, and when 2 TCI states are indicated by a codepoint of a DCI field 'Transmission Configuration Indication' and DM-RS port(s) in 2 CDM groups in a DCI field "Antenna Port(s)" are indicated, UE receives 2 PT-RS ports associated with a DMRS port with the lowest index among DM-RS ports corresponding to a TCI state which TABLE 33-continued is indicated first/second, respectively.
When UE is configured by RepSchemeEnabler, a higher layer parameter set as
'FDMSchemeA' or 'FDMSchemeB', and when 2 TCI states are indicated by a codepoint of a
DCI field 'Transmission Configuration Indication' and DM-RS port(s) in 1 CDM group in a
DCI field "Antenna Port(s)" are indicated, UE receives a single PT-RS port associated with
a DMRS port with the lowest index among DM-RS antenna ports allocated to a PDSCH and
PT-RS frequency density is determined by the number of PRBs associated with each TCI
state and PT-RS resource element mapping is associated with PRBs allocated per each TCI
state.

Proposal 4-2: A base station may perform a configuration/an indication to consider an overhead of N (e.g., 2) port PT-RSs when defining a CSI reference resource for CSI (e.g., CQI/RI/PMI) computation of a terminal based on an implicit/explicit method. An example of an implicit method)

1. When the maximum number of PT-RS ports is configured as X (e.g., 2) or more to a terminal (e.g., n2 of maxNrofPorts-r16 in PTRS-DownlinkConfig), and/or 2. When CSI reporting is configured as a mTRP CSI feedback, "a mTRP CSI feedback" in the above may follow an embodiment described in Proposal 3, and/or 3. When it is configured/indicated to report a plurality of LI values for single CSI reporting When the cases are satisfied, a terminal may reflect an overhead of N (e.g., 2) port PT-RSs on a CSI reference resource.

Examples of the implicit method may be applied independently or two or more examples may be combined and applied.

An example of an explicit method

1. When a terminal is configured/indicated to reflect an overhead of N port PT-RSs on a CSI reference resource based on L1/L2 signaling As above, when a configuration/an indication is performed, a terminal may reflect an overhead of N (e.g., 2) port PT-RSs on a CSI reference resource.

The implicit method and the explicit method may be applied independently or may be combined and applied.

A condition which may be considered together with the implicit method/explicit method With the condition, when time/frequency density of a PT-RS is equal to or greater than a specific value (e.g., for every N PRBs/every M symbols (e.g., N≤2, M≤1)), proposal 4-2 may be applied. The following method is an example therefor.

1. When a bandwidth configured for CQI reporting corresponding the CSI reporting is included in a specific scope, and/or 1-1. The specific scope may be defined by a fixed rule (e.g., $N_{RB0} \le N_{RB} < N_{RB1}$, $N_{RB0}=X$, $N_{RB1}=Y$). Alternatively, the specific scope may be configured/indicated to a terminal based on L1/L2 signaling (e.g., based on frequencyDensity in PTRS-DownlinkConfig) and/or a reporting value of a terminal (e.g., UE capability, etc.).

2. When a specific CQI condition is satisfied 2-1. As an example of the specific CQI condition, a case in which a modulation order is equal to or greater than M (e.g., 64QAM)/a CQI index is equal to or greater than n/a code rate is equal to or greater than X/efficiency is equal to or greater than X/a SNR (/SINR) is equal to or greater than a specific value may be applicable.

3. Motivation for the method and Application pattern 3-1. A frequency axis pattern/density of a PT-RS may be determined according to a size of a bandwidth scheduled to a terminal. However, when a bandwidth is too small, a PT-RS may not be scheduled and when a bandwidth is too large, frequency axis density may be configured to be low. The two cases may be considered as a case in which an overhead caused by a PT-RS is not large and accordingly, an impact may not be considered in CSI computation. Accordingly, the proposed operation in 4-3 may be applied to a case of frequency density 2 which triggers the largest overhead on a frequency axis.

3-2. A time axis pattern/density of a PT-RS may be determined according to MCS scheduled to a terminal and when MCS is low, time axis density may be configured to be low. Accordingly, a proposed operation may be applied to a case of time density 1 which triggers the largest overhead on a time axis.

3-3. As in example, for frequency density 2/time density 1, an overhead of 28 REs may be generated by 2 port PT-RSs per 2 RBs. It may be approximately represented as 14REs/RBs based on a terminal scheduling bandwidth.

In current standards, the number of additional DMRSs is also included in a definition of a CSI reference resource, and the 14REs/RBs may be considered as an overhead corresponding to one additional DMRS, so it may be considered as a valid overhead which should be considered in CSI computation.

In other words, when the above-described condition is implicitly or explicitly indicated and/or is satisfied, a terminal may be considered as a valid overhead which should be considered when performing CSI computation for 2 port PT-RSs. In other words, a terminal may assume that there are REs (or symbols) of the above-described 2 port PT-RSs in a CSI reference resource and derive a CQI index (and/or a PMI, a RI) based on it.

Time/frequency density of the PT-RS may be configured based on timeDensity and frequencyDensity in a higher layer parameter PTRS-DownlinkConfig. Each of timeDensitys and frequencyDensity may indicate a threshold value ptrs-MCSi (i=1,2,3) and NRB,i (i=0,1), respectively.

Operations in the above-described proposal 1 to 4 may be applied independently and implemented by a wireless communication device. Alternatively, at least one or more of operations in the above-described proposal 1 to 4 may be combined and implemented by a wireless communication device.

Figure 28:
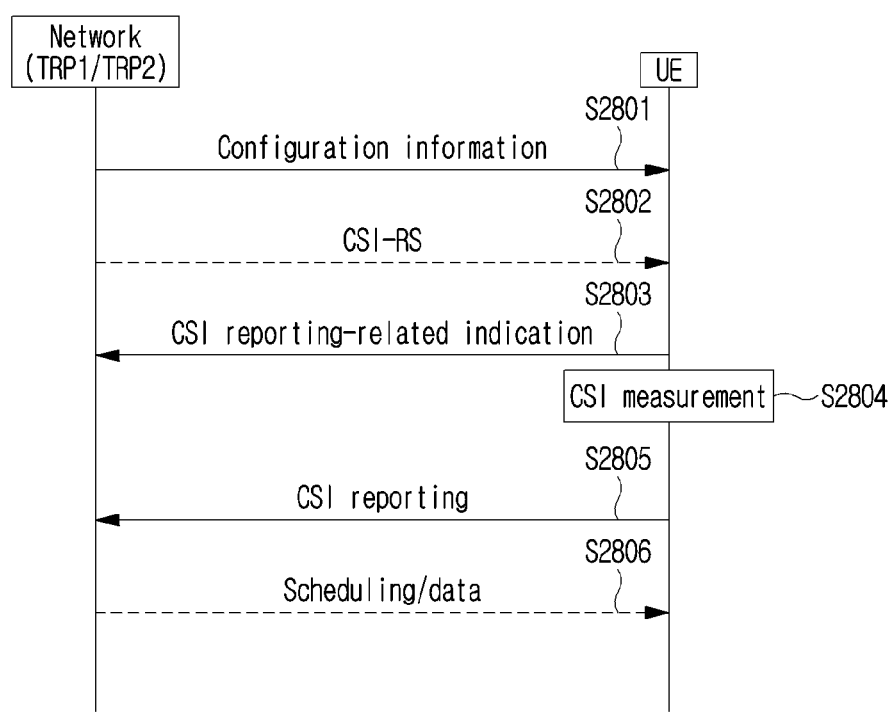
FIG. 28 is a diagram which illustrates a method for transmitting and receiving channel state information according to an embodiment of the present disclosure.

FIG. 28 is a diagram which illustrates a method for transmitting and receiving channel state information according to an embodiment of the present disclosure.

FIG. 28 illustrates signaling between a network (e.g., TRP 1, TRP 2) and UE in a situation of multiple TRPs (i.e., M-TRP, or multiple cells)(hereinafter, all TRPs may be replaced with a cell) that methods proposed in the present disclosure (e.g., proposal 1/proposal 2/proposal 3/proposal 4, etc.) may be applied. Here, UE/a network is just an example, and may be applied by being substituted with a variety of devices as described in FIG. 31 and FIG. 32. FIG. 28 is just for convenience of a description, and it does not limit a scope of the present disclosure. In addition, some step(s) shown in FIG. 28 may be omitted according to a situation and/or a configuration, etc.

In reference to FIG. 28, for convenience of a description, signaling between 2 TRPs and UE is considered, but it goes without saying that a corresponding signaling method may be extended and applied to signaling between a plurality of TRPs and a plurality of UE. In the following description, a network may be one base station including a plurality of TRPs or may be one cell including a plurality of TRPs. In an example, an ideal/non-ideal backhaul may be configured between TRP 1 and TRP 2 configuring a network. In addition, the following description is described based on a plurality of TRPs, but it may be equally extended and applied to transmission through a plurality of panels. In addition, in the present disclosure, an operation that a terminal receives a signal from TRP1/TRP2 may be interpreted/described (or may be an operation) as an operation that a terminal receives a signal from a network (through/with TRP1/2) and an operation that a terminal transmits a signal to TRP1/TRP2 may be interpreted/described (or may be an operation) as an operation that a terminal transmits a signal to a network (through/with TRP1/TRP2) or may be inversely interpreted/described.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information (e.g., an index, an identifier (ID)) on a CORESET group (or a CORESET pool) (e.g., CORESETPoolIndex). In an example, when one terminal is configured to perform transmission and reception with a plurality of TRPs (or cells), it may mean that a plurality of CORESET groups (or CORESET pools) are configured for one terminal. Such a configuration on a CORESET group (or a CORESET pool) may be performed through higher layer signaling (e.g., RRC signaling, etc.). In addition, a base station may generally mean an object which performs transmission and reception of data with a terminal. For example, the base station may be a concept which includes one or more TPs (Transmission Point), one or more TRPs (Transmission and Reception Point), etc. In addition, a TP and/or a TRP may include a panel, a transmission and reception unit, etc. of a base station.

UE may receive a configuration (i.e., configuration information) through/with TRP1 and/or TRP2 from a network (S2801).

Here, the configuration (i.e., configuration information) may include system information (SI) and/or scheduling information and/or a CSI related configuration (e.g., a CSI reporting setting, a CSI-RS resource setting, etc.). In addition, the configuration (i.e., configuration information) may also include information related to a network configuration (i.e., a TRP configuration), resource information (resource allocation) related to multi-TRP based transmission and reception, a configuration related to a priority rule, etc. The configuration (i.e., configuration information) may be transmitted to higher layer signaling (e.g., RRC or MAC CE). In addition, when the configuration information is predefined or preconfigured, a corresponding step may be omitted.

For example, the configuration (i.e., configuration information) may include CORESET-related configuration information (e.g., ControlResourceSet IE) as described in the above-described methods (e.g., proposal 1/proposal 2/proposal 3/proposal 4, etc.). The CORESET-related configuration information may include a CORESET-related ID (e.g., controlResourceSetID), an index of a CORESET pool for a CORESET (e.g., CORESETPoolIndex), a time/frequency resource configuration of a CORESET, TCI information related to a CORESET, etc. CORESETPoolIndex corresponding to each TRP may be differently configured. For example, the configuration information may include a PT-RS related configuration (e.g., PhaseTrackingRS/PTRS-DownlinkConfig/timedensity/frequencydensity, etc.).

For example, the configuration (i.e., configuration information) may include configuration/indication values for CSI computation/acquisition/reporting considering multi-TRP transmission based on the above-described proposal (e.g., proposal 1/proposal 2/proposal 3/proposal 4, etc.).

For example, as in the proposal 1, a plurality of resource groups (a plurality of resources when only 1 resource is configured in a group) may be configured in one resource set (or resource setting) based on the configuration (i.e., configuration information). In addition, the number of TRPs to which resources in one resource set correspond (i.e., the number of TRPs (a value of M, M may be equal to or greater than 1), etc.) may be configured based on the configuration (i.e., configuration information). In addition, N resource groups may be configured based on the configuration (i.e., configuration information). In addition, a resource candidate and/or a combination of resource candidates among the M resources may be configured based on the configuration (i.e., configuration information). In addition, specific TRP(s) and/or specific TRP combination(s) and/or specific resource combination(s) which may be used for CSI computation may be configured based on the configuration (i.e., configuration information). In addition, the number of CSI which should be reported by UE (i.e., the number of CSI sets (a value of N), etc.) may be configured based on the configuration (i.e., configuration information). In addition, the configuration (i.e., configuration information) may include information on quantity of CSI which should be reported by UE. In addition, the configuration (i.e., configuration information) may include information on a CSI-IM (interference measurement) resource set for interference measurement.

For example, as in the proposal 2, a plurality of resource sets may be configured in one resource setting based on the configuration (i.e., configuration information). In addition, the number of TRPs to which resource sets in one resource setting correspond (i.e., the number of TRPs (a value of M, M may be equal to or greater than 1), etc.) may be configured based on the configuration (i.e., configuration information). In addition, N resource sets may be configured based on the configuration (i.e., configuration information). In addition, a resource set candidate and/or a combination of resource set candidates among the M resource sets may be configured based on the configuration (i.e., configuration information). In addition, specific TRP(s) and/or specific TRP combination(s) and/or specific resource set combination(s) which may be used for CSI computation may be configured based on the configuration (i.e., configuration information). In addition, the number of CSI which should be reported by UE (i.e., the number of CSI sets (a value of N), etc.) may be configured based on the configuration (i.e., configuration information). In addition, the configuration (i.e., configuration information) may include information on quantity of CSI which should be reported by UE. In addition, the configuration (i.e., configuration information) may include information on a CSI-IM (interference measurement) resource set for interference measurement.

In addition, besides, the configuration (i.e., configuration information) may include information necessary for performing an operation in the above-described proposal 1 to proposal 4.

For example, in the above-described step S2801, an operation which transmits and receives the configuration (i.e., configuration information) may be implemented by a device in FIG. 31 and FIG. 32 which will be described after. For example, in reference to FIG. 31, one or more processors 102 may control one or more transceivers 106 and/or one or more memories 104, etc. to receive the configuration and one or more transceivers 106 may receive the configuration from a network.

UE may receive a RS (e.g., an SSB/a CSI-RS/a TRS/a PT-RS) for measuring a channel state through/with TRP1 and/or TRP2 from a network (S2802). For example, when a RS is received through/with multiple TRPs, information on a relation between RSs may be received.

Here, UE may receive a RS in a resource which is configured based on a configuration (i.e., configuration information) received in the step S2801.

UE may receive an indication on CSI reporting through/with TRP1 and/or TRP2 from a network (S2803). For example, for aperiodic CSI reporting, the indication may be performed by CSI reporting triggering DCI. Alternatively, for semi-persistent CSI reporting/periodic CSI reporting, step S2803 may be omitted. In addition, step S2802 and step S2803 may be reversed or may be merged into one step.

For example, a RS for measuring the channel state in the above-described step S2802 and/or step S2803 and/or an operation which transmits and receives an indication on triggering of CSI reporting may be implemented by a device in FIG. 31 and FIG. 32 which will be described after. For example, in reference to FIG. 31, one or more processors 102 may control one or more transceivers 106 and/or one or more memories 104, etc. to receive an indication on triggering of CSI reporting and/or a RS for measuring the channel state and one or more transceivers 106 may receive an indication on triggering of CSI reporting and/or a RS for measuring the channel state from a network.

UE may perform CSI measurement based on information configured from a network and the RS (e.g., a configuration in step S2801, information by DCI, etc.) S2804.

Here, UE may perform CSI measurement considering multi-TRP transmission.

For example, the above-described proposals (e.g., proposal 1/proposal 2/proposal 3/proposal 4, etc.) may be based when UE performs CSI measurement.

For example, CSI for one TRP may be computed by considering a RS, etc. of other TRP. For example, an entry of CSI per TRP (e.g., CRI/RI/PMI/LI/CQI, etc.) may be differently configured. For example, CSI for one TRP may be determined/computed based on CSI for other TRP. For example, UE may perform CSI measurement considering multi-TRP transmission based on a CSI-related time behavior/a resource setting, etc.

For example, based on the proposal 1, a case in which only one resource is configured in each resource group is assumed.

M (M is a natural number) CSI-RS resources may be selected from a CSI-RS resource set configured by configuration information in step S2801. N (N≤M, N is a natural number) CSI-RS resources for reporting the CSI may be selected from the M CSI-RS resources. In addition, by configuration information in step S2801, a CSI-RS resource candidate and/or a combination of CSI-RS resource candidates among the M CSI-RS resources may be configured and the N CSI-RS resources may be selected from the CSI-RS resource candidate and/or the combination of CSI-RS resource candidate. Here, the CSI may include N CSI sets generated based on the N CSI-RS resources. Each of the N CSI sets may be generated based on any one CSI-RS resource of the N CSI-RS resources for channel measurement and remaining N−1 CSI-RS resources for interference measurement.

In another example, based on the proposal 1, one resource set may include M (M is a natural number) CSI-RS resource groups (here, each CSI-RS resource group may correspond to a separate TRP) and N CSI-RS resource groups may be determined from M CSI-RS resource groups by the configuration information or a pre-determined rule. Here, the CSI may include N CSI sets generated based on a CSI-RS resource combination in the N CSI-RS resource groups. A n-th (1≤n≤N) CSI set among N CSI sets may be generated based on a specific CSI-RS resource for channel measurement in a n-th (1≤n≤N) CSI-RS resource group and a CSI-RS resource in remaining CSI-RS resource groups for interference measurement except for the n-th CSI-RS resource group. In other words, for generating a n-th (1≤n≤N) CSI set, a specific CSI-RS resource in a n-th (1≤n≤N) CSI-RS resource group may be used for channel measurement and a specific CSI-RS resource in remaining CSI-RS resource groups except for the n-th CSI-RS resource group may be used for interference measurement.

In addition, CSI may include N CSI sets generated based on a single CSI-RS resource in N (N≤M, N is a natural number) different CSI-RS resource groups among the M CSI-RS resource groups. In other words, CSI may include one or more CSI sets for a single TRP.

In addition, for the N CSI-RS resources (or resource groups) or CSI-RS resource combinations in N CSI-RS resource groups, a reference signal in a QCL (quasi co-location) type for a different spatial Rx parameter may be configured.

In addition, configuration information in step S2801 may include information on a CSI-IM (interference measurement) resource (or resource set) for interference measurement and a specific CSI-RS resource combination in the N CSI-RS resource groups may be mapped to the same CSI-IM resource.

In addition, a layer indicator (LI) may be independently derived/reported for the N CSI sets by the CSI. In other words, a LI may be independently reported per N CSI-RS resource combinations (or CSI-RS resource groups). Here, the number of derived/reported LIs may be determined based on the maximum number of ports of phase tracking reference signals (PTRS) configured in the terminal. In addition, when the number of CSI processing units (CPU) necessary for computing the CSI is computed (counted), a CSI set based on a single CSI resource and a CSI set based on a CSI-RS resource combination may be separately considered. For example, the CSI may include a first CSI set based on a single CSI resource in the CSI-RS resource set and/or a second CSI set based on a CSI-RS resource combination in the CSI-RS resource set. In this case, the number of CSI processing units (CPU) necessary for computing the second CSI set and the number of CPUs necessary for computing the first CSI set may be separately determined. In addition, when a CSI-RS resource set includes M (M is a natural number) CSI-RS resource groups, the number of CPUs necessary for computing the second CSI set may be determined based on the number of CSI-RS resources included in a CSI-RS resource group or based on the number of CSI-RS resource combinations which may be combined from the M CSI-RS resource groups (or two times the number of combinable CSI-RS resource combinations). In addition, based on N' CSI-RS resource combinations in the N (N≤M, N is a natural number) CSI-RS resource groups being configured from the M CSI-RS resource groups, the number of CPUs necessary for computing a second CSI set may be determined based on the number of N' CSI-RS resource combinations in the N CSI-RS resource groups (or two times the number of N' CSI-RS resource combinations in N CSI-RS resource groups).

In addition, CSI reporting based on the CSI-RS resource combination (i.e., CSI reporting for multi-TRP transmission) collides with CSI reporting based on a single CSI-RS resource (i.e., CSI reporting for single TRP transmission), CSI reporting based on the CSI-RS resource combination may be preferentially transmitted. Alternatively, conversely, CSI reporting based on a single CSI-RS resource may be preferentially transmitted. In addition, a priority for transmission may be determined based on information included in CSI based on the CSI-RS resource combination and information included in CSI based on a single CSI-RS resourced. Here, such a priority rule may be configured by a configuration in the step S2801.

In addition, for example, CSI computation time may be determined for CSI measurement on mTRPs (e.g., TRP1/TRP2) based on a method described in the above-described proposal #3. In the example, CSI computation time for CSI reporting based on the CSI-RS resource combination may be determined by adding additional time based on a parameter value related to CSI computation time configured for CSI reporting based on a single CSI-RS resource.

For example, a CSI reference resource may be determined for CSI measurement on mTRPs (e.g., TRP1/TRP2) based on a method described in the above-described proposal #4. For example, a CSI reference resource may be defined by considering an overhead of N (e.g., 2) port PT-RSs. In other words, in the example, for deriving the CSI, it may be assumed that there is a resource element for a port of 2 or more PTRSs in a CSI reference resource. For example, whether a CSI reference resource will be determined may be implicitly/explicitly indicated by considering an overhead of N (e.g., 2) port PT-RSs. The indication may be based on the maximum number of PT-RS ports/the number of LI values to be reported/a scope of a bandwidth/a CQI-related parameter/PT-RS-related time density (timedensity)/frequency density (frequencedensity), etc.

For example, an operation which measures the channel state information in the above-described step S2804 may be implemented by a device in FIG. 31 and FIG. 32 which will be described after. For example, in reference to FIG. 31, one or more processors 102 may control one or more transceivers 106 and/or one or more memories 104, etc. to perform the channel state measurement.

UE may report CSI through/with TRP1 and/or TRP2 to a network (S2805).

For example, the CSI reporting operation may be performed based on a description in the above-described CSI reporting. For example, as described in the above-described proposal (proposal 1/proposal 2/proposal 3/proposal 4, etc.), the CSI may be MTRP CSI or STRP CSI. For example, a channel/a resource for the CSI feedback may be overlapped/collide, and in this case, CSI may be reported in descending order of a priority based on a priority rule described in the above-described proposal (proposal 1/2). For example, the priority rule may be based on whether of MTRP CSI or STRP CSI/contents of CSI (e.g., CRI/RI/PMI/CQI/LI/RSRP/SINR)/the number of MTRPs associated with CSI, etc. In an example, MTRP CSI may have a higher priority than STRP CSI. In an example, BM-related CSI may have a higher priority than other CSI. In an example, a priority may be determined in an order of BM-related MTRP CSI, BM-related STRP CSI, non-BM MTRP CSI, non BM STRP CSI. For example, dropping/puncturing/rate matching may be performed for CSI with a low priority.

For example, an operation which transmits and receives CSI in the above-described step S2805 may be implemented by a device in FIG. 31 and FIG. 32 which will be described after. For example, in reference to FIG. 31, one or more processors 102 may control one or more transceivers 106 and/or one or more memories 104, etc. to report the CSI and one or more transceivers 106 may transmit the CSI to a network.

UE may receive data scheduling information and/or data/a RS (for data decoding) based on scheduling information through/with TRP1 and/or TRP2 from a network S2806. In this case, data scheduling and precoding which will be applied to data may be determined/calculated by a base station based on CSI, etc. reported by a terminal, but it may not consider only CSI reported by a terminal.

For example, an operation which transmits and receives the data scheduling information and/or data/a RS based on data scheduling information in the above-described step S2806 may be implemented by a device in FIG. 31 and FIG. 32 which will be described after. For example, in reference to FIG. 31, one or more processors 102 may control one or more transceivers 106 and/or one or more memories 104, etc. to receive the data scheduling information and/or data/a RS based on scheduling information and one or more transceivers 106 may receive the data scheduling information and/or data/a RS based on data scheduling information from a network.

As mentioned above, the above-described signaling and operation between a network and UE (e.g., proposal 1/proposal 2/proposal 3/proposal 4 and FIG. 28) may be implemented by a device (e.g., FIGS. 31 and 32) which will be described after.

Figure 31:
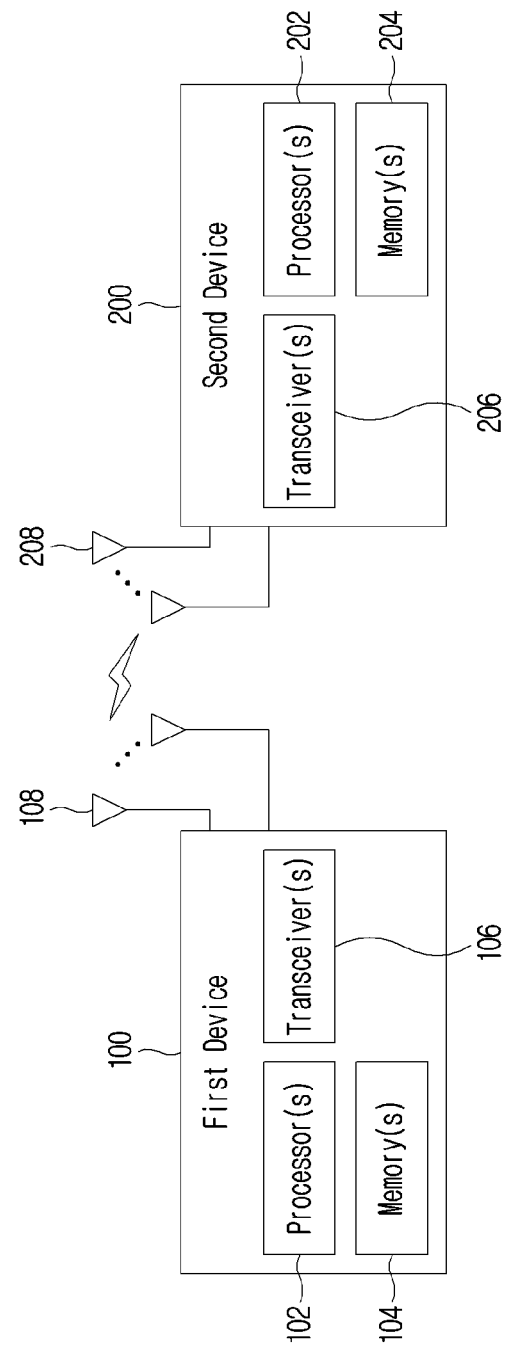
FIG. 31 is a diagram which illustrates a block diagram of a wireless communication device according to an embodiment of the present disclosure.
Figure 32:
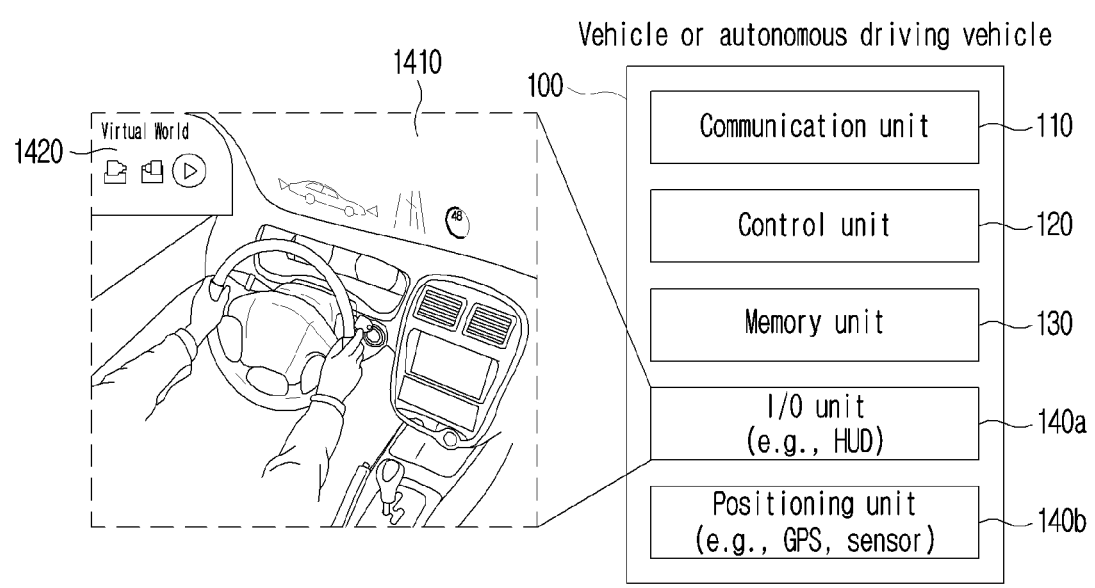
FIG. 32 illustrates a vehicle device according to an embodiment of the present disclosure.

For example, the above-described signaling and operation between a network and UE (e.g., proposal 1/proposal 2/proposal 3/proposal 4 and FIG. 28) may be processed by one or more processors (102, 202) in FIG. 31 to 32 and the above-described Network side/UE signaling and operation (e.g., proposal 1/proposal 2/proposal 3/proposal 4 and FIG. 28) may be stored in a memory (e.g., one or more memories 104, 204 in FIG. 31) in a command/program (e.g., an instruction, an executable code) shape for driving at least one processor in FIGS. 31 to 32 (e.g., 102, 202).

Figure 29:
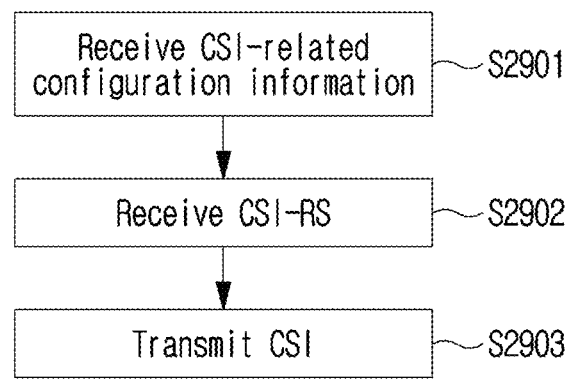
FIG. 29 is a diagram which illustrates an operation of a terminal for transmitting channel state information according to an embodiment of the present disclosure.

FIG. 29 is a diagram which illustrates an operation of a terminal for transmitting channel state information according to an embodiment of the present disclosure.

FIG. 29 illustrates an operation of a terminal based on the proposal 1 to proposal 4. An example in FIG. 29 is for convenience of a description, and it does not limit a scope of the present disclosure. Some step(s) illustrated in FIG. 29 may be omitted according to a situation and/or a configuration. In addition, in FIG. 29, a terminal is just one example, and may be implemented by a device illustrated in the following FIG. 31 and FIG. 32. For example, a processor 102/202 in FIG. 31 may be controlled to transmit and receive a channel/signal/data/information, etc. by using a transceiver 106/206 and may be controlled to store a channel/signal/data/information, etc. which will be transmitted or received in a memory 104/204.

A terminal receives configuration information related to the CSI from a base station (S2901).

Configuration information related to the CSI may include configuration/indication values for CSI computation/acquisition/reporting considering multi-TRP transmission based on the above-described proposal (e.g., proposal 1/proposal 2/proposal 3/proposal 4, etc.).

For example, as in the proposal 1, a plurality of resource groups (a plurality of resources when only 1 resource in a group is configured) may be configured in one resource set (or resource setting) based on the configuration (i.e., configuration information). In addition, the number of TRPs to which resources in one resource set correspond (i.e., the number of TRPs (a value of M, M may be equal to or greater than 1), etc.) may be configured based on the configuration (i.e., configuration information). In addition, N resource groups may be configured based on the configuration (i.e., configuration information). In addition, a resource candidate and/or a combination of resource candidates among the M resources may be configured based on the configuration (i.e., configuration information). In addition, specific TRP(s) and/or specific TRP combination(s) and/or specific resource combination(s) which may be used for CSI computation may be configured based on the configuration (i.e., configuration information). In addition, the number of CSI which should be reported by UE (i.e., the number of CSI sets (a value of N), etc.) may be configured based on the configuration (i.e., configuration information). In addition, the configuration (i.e., configuration information) may include information on quantity of CSI which should be reported by UE. In addition, the configuration (i.e., configuration information) may include information on a CSI-IM (interference measurement) resource set for interference measurement.

For example, as in the proposal 2, a plurality of resource sets may be configured in one resource setting based on the configuration (i.e., configuration information). In addition, the number of TRPs to which resource sets in one resource setting correspond (i.e., the number of TRPs (a value of M, M may be equal to or greater than 1), etc.) may be configured based on the configuration (i.e., configuration information). In addition, N resource sets may be configured based on the configuration (i.e., configuration information). In addition, a resource set candidate and/or a combination of resource set candidates among the M resource sets may be configured based on the configuration (i.e., configuration information). In addition, specific TRP(s) and/or specific TRP combination(s) and/or specific resource set combination(s) which may be used for CSI computation may be configured based on the configuration (i.e., configuration information). In addition, the number of CSI which should be reported by UE (i.e., the number of CSI sets (a value of N), etc.) may be configured based on the configuration (i.e., configuration information). In addition, the configuration (i.e., configuration information) may include information on quantity of CSI which should be reported by UE. In addition, the configuration (i.e., configuration information) may include information on a CSI-IM (interference measurement) resource set for interference measurement.

In addition, besides, the configuration (i.e., configuration information) may include information necessary for performing an operation in the above-described proposal 1 to proposal 4.

A terminal receives a CSI-RS (CSI-reference signal) from the base station (S2902).

A terminal may receive a CSI-RS in a CSI-RS resource configured based on configuration information received in the step S2901.

Here, a CSI-RS is one example, and may be replaced with a RS for channel state measurement (e.g., an SSB/a CSI-RS/a TRS/a PT-RS).

A terminal transmits CSI to the base station based on the configuration information and the CSI-RS (S2903).

Here, a terminal may perform CSI measurement considering multi-TRP transmission and report measured CSI to a base station.

For example, the above-described proposals (e.g., proposal 1/proposal 2/proposal 3/proposal 4, etc.) may be based when a terminal performs CSI measurement.

For example, when a case in which only one resource is configured in each resource group is assumed based on the proposal 1, M (M is a natural number) CSI-RS resources may be selected from a CSI-RS resource set configured by the configuration information. N (N≤M, N is a natural number) CSI-RS resources for reporting the CSI may be selected from the M CSI-RS resources. In addition, by configuration information in step S2901, a CSI-RS resource candidate and/or a combination of CSI-RS resource candidates among the M CSI-RS resources may be configured and the N CSI-RS resources may be selected from the CSI-RS resource candidate and/or the combination of CSI-RS resource candidates. Here, the CSI may include N CSI sets generated based on the N CSI-RS resources. Each of the N CSI sets may be generated based on any one CSI-RS resource of the N CSI-RS resources for channel measurement and remaining N−1 CSI-RS resources for interference measurement.

In another example, based on the proposal 1, one resource set may include M (M is a natural number) CSI-RS resource groups (here, each CSI-RS resource group may correspond to a separate TRP) and N CSI-RS resource groups may be determined from M CSI-RS resource groups by the configuration information or a pre-determined rule. Here, the CSI may include N CSI sets generated based on a CSI-RS resource combination in the N CSI-RS resource groups. A n-th (1≤n≤N) CSI set among N CSI sets may be generated based on a specific CSI-RS resource for channel measurement in a n-th (1≤n≤N) CSI-RS resource group and a CSI-RS resource in remaining CSI-RS groups for interference measurement except for the n-th CSI-RS resource group. In other words, for generating a n-th (1≤n≤N) CSI set, a specific CSI-RS resource in a n-th (1≤n≤N) CSI-RS resource group may be used for channel measurement and a specific CSI-RS resource in remaining CSI-RS groups except for the n-th CSI-RS resource group may be used for interference measurement.

In addition, CSI may include N CSI sets generated based on a single CSI-RS resource in N (N≤M, N is a natural number) different CSI-RS resource groups among the M CSI-RS resource groups. In other words, CSI may include one or more CSI sets for a single TRP.

In addition, for the N CSI-RS resources (or resource groups) or CSI-RS resource combinations in N CSI-RS resource groups, a reference signal in a QCL (quasi co-location) type for a different spatial Rx parameter may be configured.

In addition, the configuration information may include information on a CSI-IM (interference measurement) resource (or resource set) for interference measurement and a CSI-RS resource combination in the N CSI-RS resources or N CSI-RS resource groups may be mapped to the same CSI-IM resource.

In addition, a layer indicator (LI) may be independently derived/reported for the N CSI sets by the CSI. In other words, a LI may be independently reported per N CSI-RS resource combinations (or per CSI-RS resource group). Here, the number of the derived/reported LIs may be determined based on the maximum number of ports of a phase tracking reference signal (PTRS) configured in the terminal.

In addition, when the number of CSI processing units (CPU) necessary for computing the CSI is computed (counted), a CSI set based on a single CSI resource and a CSI set based on a CSI-RS resource combination may be separately considered. For example, the CSI may include a first CSI set based on a single CSI resource in the CSI-RS resource set and/or a second CSI set based on a CSI-RS resource combination in the CSI-RS resource set. In this case, the number of CSI processing units necessary for computing the second CSI set and the number of CPUs necessary for computing the first CSI set may be separately determined. In addition, when a CSI-RS resource set includes M (M is a natural number) CSI-RS resource groups, the number of CPUs necessary for computing the second CSI set may be determined based on the number of CSI-RS resources included in a CSI-RS resource group or based on the number of CSI-RS resource combinations which may be combined from the M CSI-RS resource groups (or two times the number of combinable CSI-RS resource combinations). In addition, based on N' CSI-RS resource combinations in the N (N≤M, N is a natural number) CSI-RS resource groups being configured from the M CSI-RS resource groups, the number of CPUs necessary for computing a second CSI set may be determined based on the number of N' CSI-RS resource combinations in the N CSI-RS resource groups (or two times the number of N' CSI-RS resource combinations in N CSI-RS resource groups).

In addition, when CSI reporting based on the CSI-RS resource combination (i.e., CSI reporting for multi-TRP transmission) collides with CSI reporting based on a single CSI-RS resource (i.e., CSI reporting for single TRP transmission), CSI reporting based on the CSI-RS resource combination may be preferentially transmitted. Alternatively, conversely, CSI reporting based on a single CSI-RS resource may be preferentially transmitted. In addition, a priority for transmission may be determined based on information included in CSI based on the CSI-RS resource combination and information included in CSI based on a single CSI-RS resource. Here, such a priority rule may be configured by a configuration in the step S2901.

In addition, as in the proposal 3, CSI computation time for CSI reporting based on the CSI-RS resource combination may be determined by adding additional time based on a parameter value related to CSI computation time configured for CSI reporting based on the single CSI-RS resource.

In addition, as in the proposal 4, for deriving the CSI, it may be assumed that there is a resource element for a port of 2 or more PTRSs in a CSI reference resource.

Figure 30:
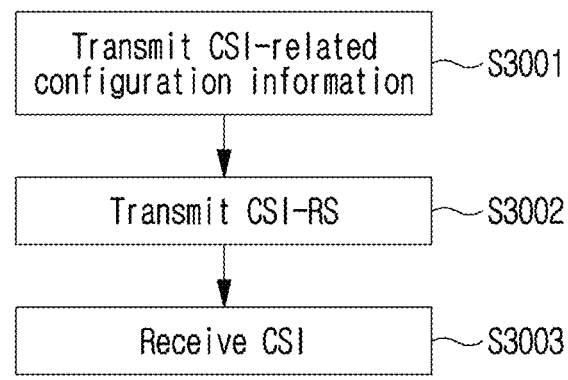
FIG. 30 is a diagram which illustrates an operation of a base station for receiving channel state information according to an embodiment of the present disclosure.

FIG. 30 is a diagram which illustrates an operation of a base station for receiving channel state information according to an embodiment of the present disclosure.

FIG. 30 illustrates an operation of a base station based on the proposal 1 to proposal 4. An example in FIG. 30 is for convenience of a description, and it does not limit a scope of the present disclosure. Some step(s) illustrated in FIG. 30 may be omitted according to a situation and/or a configuration. In addition, in FIG. 30, a base station is just one example, and may be implemented by a device illustrated in the following FIG. 31 and FIG. 32. For example, a processor 102/202 in FIG. 31 may be controlled to transmit and receive a channel/signal/data/information, etc. by using a transceiver 106/206 and may be controlled to store a channel/signal/data/information, etc. which will be transmitted or received in a memory 104/204.

A base station transmits configuration information related to the CSI to a terminal (S3001).

Configuration information related to the CSI may include configuration/indication values for CSI computation/acquisition/reporting considering multi-TRP transmission based on the above-described proposal (e.g., proposal 1/proposal 2/proposal 3/proposal 4, etc.).

For example, as in the proposal 1, a plurality of resource groups (a plurality of resources when only 1 resource in a group is configured) may be configured in one resource set (or resource setting) based on the configuration (i.e., configuration information). In addition, the number of TRPs to which resources in one resource set correspond (i.e., the number of TRPs (a value of M, M may be equal to or greater than 1), etc.) may be configured based on the configuration (i.e., configuration information). In addition, N resource groups may be configured based on the configuration (i.e., configuration information). In addition, a resource candidate and/or a combination of resource candidates among the M resources may be configured based on the configuration (i.e., configuration information). In addition, specific TRP(s) and/or specific TRP combination(s) and/or specific resource combination(s) which may be used for CSI computation may be configured based on the configuration (i.e., configuration information). In addition, the number of CSI which should be reported by UE (i.e., the number of CSI sets (a value of N), etc.) may be configured based on the configuration (i.e., configuration information). In addition, the configuration (i.e., configuration information) may include information on quantity of CSI which should be reported by UE. In addition, the configuration (i.e., configuration information) may include information on a CSI-IM (interference measurement) resource set for interference measurement.

For example, as in the proposal 2, a plurality of resource sets may be configured in one resource setting based on the configuration (i.e., configuration information). In addition, the number of TRPs to which resource sets in one resource setting correspond (i.e., the number of TRPs (a value of M, M may be equal to or greater than 1), etc.) may be configured based on the configuration (i.e., configuration information). In addition, N resource sets may be configured based on the configuration (i.e., configuration information). In addition, a resource set candidate and/or a combination of resource set candidates among the M resource sets may be configured based on the configuration (i.e., configuration information). In addition, specific TRP(s) and/or specific TRP combination(s) and/or specific resource set combination(s) which may be used for CSI computation may be configured based on the configuration (i.e., configuration information). In addition, the number of CSI which should be reported by UE (i.e., the number of CSI sets (a value of N), etc.) may be configured based on the configuration (i.e., configuration information). In addition, the configuration (i.e., configuration information) may include information on quantity of CSI which should be reported by UE. In addition, the configuration (i.e., configuration information) may include information on a CSI-IM (interference measurement) resource set for interference measurement.

In addition, besides, the configuration (i.e., configuration information) may include information necessary for performing an operation in the above-described proposal 1 to proposal 4.

A base station transmits a CSI-RS (CSI-reference signal) to a terminal (S3002).

A base station may transmit a CSI-RS in a CSI-RS resource configured based on configuration information transmitted in the step S3001.

Here, a CSI-RS is one example, and may be replaced with a RS for channel state measurement (e.g., SSB/CSI-RS/TRS/PT-RS).

CSI is received from the terminal (S3003).

Here, a base station may receive CSI measured by a terminal in consideration of multi-TEP transmission from a terminal.

For example, the above-described proposals (e.g., proposal 1/proposal 2/proposal 3/proposal 4, etc.) may be based when a terminal performs CSI measurement.

For example, when a case in which only one resource is configured in each resource group is assumed based on the proposal 1, M (M is a natural number) CSI-RS resources may be selected from a CSI-RS resource set configured by the configuration information. N (N≤M, N is a natural number) CSI-RS resources for reporting the CSI may be selected from the M CSI-RS resources. In addition, by configuration information in step S3001, a CSI-RS resource candidate and/or a combination of CSI-RS resource candidates among the M CSI-RS resources may be configured and the N CSI-RS resources may be selected from the CSI-RS resource candidate and/or the combination of CSI-RS resource candidates. Here, the CSI may include N CSI sets generated based on the N CSI-RS resources. Each of the N CSI sets may be generated based on any one CSI-RS resource of the N CSI-RS resources for channel measurement and remaining N−1 CSI-RS resources for interference measurement.

In another example, based on the proposal 1, one resource set may include M (M is a natural number) CSI-RS resource groups (here, each CSI-RS resource group may correspond to a separate TRP) and N CSI-RS resource groups may be determined from M CSI-RS resource groups by the configuration information or a pre-determined rule. Here, the CSI may include N CSI sets generated based on a CSI-RS resource combination in the N CSI-RS resource groups. A n-th (1≤n≤N) CSI set among N CSI sets may be generated based on a specific CSI-RS resource for channel measurement in a n-th (1≤n≤N) CSI-RS resource group and a CSI-RS resource in remaining CSI-RS resource groups for interference measurement except for the n-th CSI-RS resource group. In other words, for generating a n-th (1≤n≤N) CSI set, a specific CSI-RS resource in a n-th (1≤n≤N) CSI-RS resource group may be used for channel measurement and a specific CSI-RS resource in remaining CSI-RS resource groups except for the n-th CSI-RS resource group may be used for interference measurement.

In addition, CSI may include N CSI sets generated based on a single CSI-RS resource in N (N≤M, N is a natural number) different CSI-RS resource groups among the M CSI-RS resource groups. In other words, CSI may include one or more CSI sets for a single TRP.

In addition, for the N CSI-RS resources (or resource groups) or CSI-RS resource combinations in N CSI-RS resource groups, a reference signal in a QCL (quasi co-location) type for a different spatial Rx parameter may be configured.

In addition, the configuration information may include information on a CSI-IM (interference measurement) resource (or resource set) for interference measurement and a CSI-RS resource combination in the N CSI-RS resources or N CSI-RS resource groups may be mapped to the same CSI-IM resources.

In addition, a layer indicator (LI) may be independently derived/reported for the N CSI sets by the CSI. In other words, a LI may be independently reported per N CSI-RS resource combinations (or per CSI-RS resource group). Here, the number of the derived/reported LIs may be determined based on the maximum number of ports of a phase tracking reference signal (PTRS) configured in the terminal.

In addition, when the number of CSI processing units (CPU) necessary for computing the CSI is computed (counted), a CSI set based on a single CSI resource and a CSI set based on a CSI-RS resource combination may be separately considered. For example, the CSI may include a first CSI set based on a single CSI resource in the CSI-RS resource set and/or a second CSI set based on a CSI-RS resource combination in the CSI-RS resource set. In this case, the number of CSI processing units (CPU) necessary for computing the second CSI set and the number of CPUs necessary for computing the first CSI set may be separately determined. In addition, when a CSI-RS resource set includes M (M is a natural number) CSI-RS resource groups, the number of CPUs necessary for computing the second CSI set may be determined based on the number of CSI-RS resources included in a CSI-RS resource group or based on the number of CSI-RS resource combinations which may be combined from the M CSI-RS resource groups (or two times the number of combinable CSI-RS resource combinations). In addition, based on N' CSI-RS resource combinations in the N (N≤M, N is a natural number) CSI-RS resource groups being configured from the M CSI-RS resource groups, the number of CPUs necessary for computing a second CSI set may be determined based on the number of N' CSI-RS resource combinations in the N CSI-RS resource groups (or two times the number of N' CSI-RS resource combinations in N CSI-RS resource groups).

In addition, when CSI reporting based on the CSI-RS resource combination (i.e., CSI reporting for multi-TRP transmission) collides with CSI reporting based on a single CSI-RS resource (i.e., CSI reporting for single TRP transmission), CSI reporting based on the CSI-RS resource combination may be preferentially transmitted. Here, such a priority rule may be configured by a configuration in the step S3001.

In addition, as in the proposal 3, CSI computation time for CSI reporting based on the CSI-RS resource combination may be determined by adding additional time based on a parameter value related to CSI computation time configured for CSI reporting based on the single CSI-RS resource.

In addition, as in the proposal 4, for deriving the CSI, it may be assumed that there is a resource element for a port of 2 or more PTRSs in a CSI reference resource.

General Device to which the Present Disclosure May be Applied

FIG. 31 is a diagram which illustrates a block diagram of a wireless communication device according to an embodiment of the present disclosure.

In reference to FIG. 31, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

FIG. 32 illustrates a vehicle device according to an embodiment of the present disclosure.

In reference to FIG. 32, a vehicle 100 may include a communication unit 110, a control unit 120, a memory unit 130, an input and output unit 140a and a positioning unit 140b.

A communication unit 110 may transmit and receive a signal (e.g., data, a control signal, etc.) with external devices of other vehicle, or a base station, etc. A control unit 120 may perform a variety of operations by controlling elements of a vehicle 100. A control unit 120 may control a memory unit 130 and/or a communication unit 110 and may be configured to implement descriptions, functions, procedures, proposals, methods and/or operation flow charts included in the present disclosure. A memory unit 130 may store data/a parameter/a program/a code/a command supporting a variety of functions of a vehicle 100. An input and output unit 140a may output an AR/VR object based on information in a memory unit 130. An input and output unit 140a may include HUD. A positioning unit 140b may obtain position information of a vehicle 100. Position information may include absolute position information, position information in a driving lane, acceleration information, position information with a surrounding vehicle, etc. of a vehicle 100. A positioning unit 140b may include a GPS and a variety of sensors.

In an example, a communication unit 110 of a vehicle 100 may receive map information, traffic information, etc. from an external server and store them in a memory unit 130. A positioning unit 140b may obtain vehicle position information through a GPS and a variety of sensors and store it in a memory unit 130. A control unit 120 may generate a virtual object based on map information, traffic information and vehicle position information, etc. and an input and output unit 140a may indicate a generated virtual object on a window in a vehicle 1410, 1420. In addition, a control unit 120 may determine whether a vehicle 100 normally operates in a driving lane based on vehicle position information. When a vehicle 100 is abnormally out of a driving lane, a control unit 120 may indicate a warning on a window in a vehicle through an input and output unit 140a. In addition, a control unit 120 may send a warning message on abnormal driving to surrounding vehicles through a communication unit 110. According to a situation, a control unit 120 may transmit position information of a vehicle and information on a driving/vehicle problem to a relative agency through a communication unit 110.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of transmitting channel state information (CSI) in a wireless communication system, the method performed by a terminal comprising:
receiving configuration information related to the CSI from a base station, wherein the configuration information includes information on a CSI-RS resource set;
receiving a CSI-reference signal (CSI-RS) from the base station; and
transmitting the CSI to the base station based on the configuration information and the CSI-RS,
wherein the CSI-RS resource set includes M (M is a natural number) CSI-RS resource groups,
wherein the CSI includes N first CSI sets generated based on a single CSI-RS resource in N different (N≤M, N is a natural number) CSI-RS resource groups among the M CSI-RS resource groups.

2. The method of claim 1, wherein one or more CSI entries included in the N first CSI sets are independently determined for each first CSI set,
wherein the one or more CSI entries includes at least one of a rank indicator (RI), a precoding matrix indicator (PMI), a layer indicator (LI), a channel quality indicator (CQI) and/or a CSI-RS resource indicator (CRI).

3. The method of claim 1, wherein the N CSI-RS resource groups are configured by the configuration information.

4. The method of claim 1, wherein K(K≤M, K is a natural number) CSI-RS resource groups for reporting the CSI are determined from the M CSI-RS resource groups,
wherein the CSI includes K second CSI sets generated based on a CSI-RS resource combination in the K CSI-RS resource groups.

5. The method of claim 4, wherein, when a report on the first CSI set based on the single CSI-RS resource and a report on the second CSI set based on the CSI-RS resource combination collide, the report on the second CSI set based on the CSI-RS resource combination is transmitted with priority.

6. The method of claim 4, wherein, when a report on the first CSI set based on the single CSI-RS resource and a report on the second CSI set based on the CSI-RS resource combination collide, the report on the first CSI set based on the single CSI-RS resource is transmitted with priority.

7. The method of claim 4, wherein, when a report on the first CSI set based on the single CSI-RS resource and a report on the second CSI set based on the CSI-RS resource combination collide, priority for transmission is determined based on information included in the first CSI group and information included in the second CSI set.

8. The method of claim 6, the report on the first CSI set including L1 (layer 1)-SINR (signal to interference and noise ratio) or L1-RSRP (reference signal received power) is transmitted with priority over the report on the second CSI set that does not include the L1-SINR and the L1-RSRP.

9. A terminal of transmitting channel state information (CSI) in a wireless communication system, the terminal comprising:
at least one transceiver for transmitting and receiving a wireless signal; and
at least one processor for controlling the at least one transceiver,
wherein the at least one processor configured to:
receive configuration information related to the CSI from a base station, wherein the configuration information includes information on a CSI-RS resource set;
receive a CSI-reference signal (CSI-RS) from the base station; and
transmit the CSI to the base station based on the configuration information and the CSI-RS,
wherein the CSI-RS resource set includes M (M is a natural number) CSI-RS resource groups,
wherein the CSI includes N first CSI sets generated based on a single CSI-RS resource in N different (N≤M, N is a natural number) CSI-RS resource groups among the M CSI-RS resource groups.

10. The terminal of claim 9, wherein one or more CSI entries included in the N first CSI sets are independently determined for each first CSI set,
wherein the one or more CSI entries includes at least one of a rank indicator (RI), a precoding matrix indicator (PMI), a layer indicator (LI), a channel quality indicator (CQI) and/or a CSI-RS resource indicator (CRI).

11. The terminal of claim 9, wherein the N CSI-RS resource groups are configured by the configuration information.

12. The terminal of claim 9, wherein K(K≤M, K is a natural number) CSI-RS resource groups for reporting the CSI are determined from the M CSI-RS resource groups,
wherein the CSI includes K second CSI sets generated based on a CSI-RS resource combination in the K CSI-RS resource groups.

13. The terminal of claim 12, wherein, when a report on the first CSI set based on the single CSI-RS resource and a report on the second CSI set based on the CSI-RS resource combination collide, the report on the second CSI set based on the CSI-RS resource combination is transmitted with priority.

14. The terminal of claim 12, wherein, when a report on the first CSI set based on the single CSI-RS resource and a report on the second CSI set based on the CSI-RS resource combination collide, the report on the first CSI set based on the single CSI-RS resource is transmitted with priority.

15. The terminal of claim 12, wherein, when a report on the first CSI set based on the single CSI-RS resource and a report on the second CSI set based on the CSI-RS resource combination collide, priority for transmission is determined based on information included in the first CSI group and information included in the second CSI set.

16. At least one non-transitory computer-readable medium storing at least one instruction, wherein the at least one instruction executable by at least one processor controls a device to:
  receive configuration information related to the CSI from a base station, wherein the configuration information includes information on a CSI-RS resource set;
  receive a CSI-reference signal (CSI-RS) from the base station; and
  transmit the CSI to the base station based on the configuration information and the CSI-RS,
  wherein the CSI-RS resource set includes M (M is a natural number) CSI-RS resource groups,
  wherein the CSI includes N first CSI sets generated based on a single CSI-RS resource in N different (N≤M, N is a natural number) CSI-RS resource groups among the M CSI-RS resource groups.

* * * * *